United States Patent
Xu et al.

(10) Patent No.: US 12,425,500 B2
(45) Date of Patent: Sep. 23, 2025

(54) FOLDING APPARATUS AND ELECTRONIC DEVICE

(71) Applicant: Huawei Technologies Co., Ltd., Shenzhen (CN)

(72) Inventors: Zhengyi Xu, Shanghai (CN); Chunjun Ma, Shanghai (CN); Linhui Niu, Shanghai (CN); Ting Liu, Shanghai (CN); Gangchao Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 459 days.

(21) Appl. No.: 17/919,156

(22) PCT Filed: Apr. 15, 2021

(86) PCT No.: PCT/CN2021/087515
§ 371 (c)(1),
(2) Date: Oct. 14, 2022

(87) PCT Pub. No.: WO2021/209008
PCT Pub. Date: Oct. 21, 2021

(65) Prior Publication Data
US 2023/0171334 A1    Jun. 1, 2023

(30) Foreign Application Priority Data
Apr. 15, 2020    (CN) .......................... 202010296049.1

(51) Int. Cl.
*H04M 1/02*    (2006.01)

(52) U.S. Cl.
CPC ....... *H04M 1/0216* (2013.01); *H04M 1/0268* (2013.01)

(58) Field of Classification Search
CPC .. H04M 1/0216; H04M 1/0214; H04M 1/022; H04M 1/0268
(Continued)

(56) References Cited

U.S. PATENT DOCUMENTS

| | | | |
|---|---|---|---|
| 2019/0391618 | A1 | 12/2019 | Hsu |
| 2020/0103935 | A1 | 4/2020 | Hsu |

FOREIGN PATENT DOCUMENTS

| | | | |
|---|---|---|---|
| CN | 207588933 U | * | 7/2018 |
| CN | 207869177 U | * | 9/2018 |

(Continued)

*Primary Examiner* — David Q Nguyen
(74) *Attorney, Agent, or Firm* — Slater Matsil, LLP

(57) ABSTRACT

A rotating mechanism includes a main shaft assembly, a first fixed bracket, a second fixed bracket, a first transmission arm, a first rotating arm, a second transmission arm, and a second rotating arm. One end of the first transmission arm is slidably connected to the second fixed bracket, and the other end of the first transmission arm is a rotating end and is rotatably connected to the main shaft assembly. Two ends of the first rotating arm are rotatably connected to the first transmission arm and the first fixed bracket respectively. One end of the second transmission arm is slidably connected to the first fixed bracket, and the other end of the second transmission arm is rotatably connected to the main shaft assembly. Two ends of the second rotating arm are rotatably connected to the second transmission arm and the second fixed bracket respectively.

20 Claims, 25 Drawing Sheets

(58) Field of Classification Search
USPC .................. 455/566, 575.1, 575.3, 575.4
See application file for complete search history.

(56) References Cited

FOREIGN PATENT DOCUMENTS

| | | | |
|---|---:|---|---|
| CN | 109714457 | A * | 5/2019 |
| CN | 208905052 | U * | 5/2019 |
| CN | 109936648 | A | 6/2019 |
| CN | 110138916 | A | 8/2019 |
| CN | 110445913 | A | 11/2019 |
| CN | 209731301 | U | 12/2019 |
| CN | 111614806 | A | 9/2020 |
| EP | 4089990 | A1 | 11/2022 |
| EP | 4216520 | A1 | 7/2023 |
| WO | 2020010987 | A1 | 1/2020 |

\* cited by examiner

FOLDING APPARATUS AND ELECTRONIC DEVICE

CROSS-REFERENCE TO RELATED APPLICATIONS

This application is a National Stage of International Application No. PCT/CN2021/087515, filed on Apr. 15, 2021, which claims priority to Chinese Patent Application No. 202010296049.1, filed on Apr. 15, 2020. Both of the aforementioned applications are hereby incorporated by reference in their entireties.

TECHNICAL FIELD

This application relates to the field of foldable electronic product technologies, and in particular, to a folding apparatus and an electronic device.

BACKGROUND

In recent years, flexible displays are widely applied to various foldable electronic devices because of advantages such as lightness, thinness, and non-fragility. The foldable electronic device further includes a folding apparatus configured to bear the flexible display. The folding apparatus usually includes two housings and a rotating mechanism connected between the two housings. The two housings are folded or unfolded relative to each other through deformation of the rotating mechanism, to drive folding or unfolding of the flexible display. However, when a conventional folding apparatus is folded or unfolded, because a length of a bearing surface of the conventional folding apparatus that is used to bear a flexible display is changed significantly, the flexible display tends to be stretched in a folding process and squeezed in an unfolding process. As a result, the flexible display is easily damaged, and a service life of the flexible display is shortened.

SUMMARY

An objective of this application is to provide a folding apparatus and an electronic device. The folding apparatus is configured to bear a flexible display. According to this application, when the folding apparatus is folded or unfolded, a risk that the flexible display is stretched or squeezed is low, so that reliability of the flexible display is high, and a service life of the flexible display is long.

According to a first aspect, this application provides a folding apparatus. The folding apparatus may be applied to an electronic device, and is configured to bear a flexible display of the electronic device. The folding apparatus includes a first housing, a rotating mechanism, and a second housing that are connected sequentially. The rotating mechanism can deform, so that the first housing and the second housing are folded or unfolded relative to each other.

The rotating mechanism includes a main shaft assembly, a first fixed bracket, a second fixed bracket, a first transmission arm, a first rotating arm, a second transmission arm, and a second rotating arm. The first fixed bracket is fastened to the first housing, and the second fixed bracket is fastened to the second housing. The first transmission arm includes a sliding end and a rotating end. The sliding end of the first transmission arm is slidably connected to the second fixed bracket, the rotating end of the first transmission arm is rotatably connected to the main shaft assembly, one end of the first rotating arm is rotatably connected to the rotating end of the first transmission arm, and the other end of the first rotating arm is rotatably connected to the first fixed bracket. The second transmission arm includes a sliding end and a rotating end. The sliding end of the second transmission arm is slidably connected to the first fixed bracket, the rotating end of the second transmission arm is rotatably connected to the main shaft assembly, one end of the second rotating arm is rotatably connected to the rotating end of the second transmission arm, and the other end of the second rotating arm is rotatably connected to the second fixed bracket.

In this application, the rotating end of the first transmission arm is rotatably connected to the main shaft assembly, the sliding end of the first transmission arm is slidably connected to the second fixed bracket, and the second fixed bracket is fastened to the second housing, and the rotating end of the second transmission arm is rotatably connected to the main shaft assembly, the sliding end of the second transmission arm is slidably connected to the first fixed bracket, and the first fixed bracket is fastened to the first housing. Therefore, when the first housing and the second housing are rotated relative to each other, the first housing drives the first fixed bracket to rotate relative to the main shaft assembly, the second transmission arm rotates relative to the main shaft assembly with the first fixed bracket, and the second transmission arm slides relative to the first fixed bracket, and the second housing drives the second fixed bracket to rotate relative to the main shaft assembly, the first transmission arm rotates relative to the main shaft assembly with the second fixed bracket, and the first transmission arm slides relative to the second fixed bracket. In this way, the folding apparatus can be freely switched between a flattened state and a closed state. The first housing and the second housing can be unfolded relative to each other to a flattened state, so that the flexible display is in a flattened form, to implement large-screen display. The first housing and the second housing can also be folded relative to each other to a closed state, so that the electronic device is easy to place and carry. In addition, when the first housing and the second housing are folded relative to each other to the closed state by using the rotating mechanism, the first housing and the second housing can be completely closed, and there is no gap between the first housing and the second housing or a gap between the first housing and the second housing is small. Therefore, appearance integrity of the folding apparatus is implemented, and self-shielding in appearance is implemented. Appearance integrity of the electronic device to which the folding apparatus is applied is implemented, so that product reliability and user experience are improved.

When the first housing and the second housing are unfolded relative to each other to the flattened state, the first transmission arm rotates into the main shaft assembly, so that the first rotating arm extends out of the main shaft assembly, and the first rotating arm pushes the first housing away from the main shaft assembly by using the first fixed bracket, and the second transmission arm rotates into the main shaft assembly, so that the second rotating arm extends out of the main shaft assembly, and the second rotating arm pushes the second housing away from the main shaft assembly by using the second fixed bracket. When the first housing and the second housing are folded relative to each other to the closed state, the first transmission arm rotates out of the main shaft assembly, so that the first rotating arm extends into the main shaft assembly, and the first rotating arm pulls the first housing close to the main shaft assembly by using the first fixed bracket, and the second transmission arm rotates out of the main shaft assembly, so that the second rotating arm extends into the main shaft assembly, and the second rotating arm pulls the second housing close to the main shaft assembly by using the second fixed bracket. Therefore, when the first housing and the second housing are unfolded relative to each other, the rotating mechanism enables the first fixed bracket to drive the first housing to move away from the main shaft assembly, and enables the second fixed bracket to drive the second housing to move away from the main shaft assembly. When the first housing and the second housing are folded relative to each other, the rotating mechanism enables the first fixed bracket to drive the first housing to move toward the main shaft assembly, and enables the second fixed bracket to drive the second housing to move toward the main shaft assembly. In other words, the rotating mechanism can implement pulling-in of the housing when the folding apparatus is switched from the flattened state to the closed state and pushing-out of the housing when the folding apparatus is switched from the closed state to the flattened state, so that the folding apparatus can implement deformation by using the flexible display as a neutral surface when being unfolded or folded. In this way, a risk of stretching or squeezing the flexible display is reduced, and the flexible display maintains a constant length, to protect the flexible display and improve reliability of the flexible display, so that the flexible display and the electronic device have long service lives.

In addition, because a first end of the first rotating arm is rotatably connected to the first fixed bracket, and a second end of the first rotating arm is rotatably connected to the rotating end of the first transmission arm, when the first housing and the second housing rotate relative to each other, the rotating end of the first transmission arm drives the second end of the first rotating arm to rotate around a first rotation center, to form a first-level link motion, and the first end of the first rotating arm rotates around the second end of the first rotating arm, to form a second-level link motion. Therefore, a link motion of the first rotating arm is equivalent to a two-link motion. The second end of the first rotating arm is rotatably connected to the rotating end of the first transmission arm, and the second end of the first rotating arm and the rotating end of the first transmission arm rotate around a fixed point synchronously. Therefore, a rotation angle of the first-level link motion of the first rotating arm and a rotation angle of the first transmission arm are equal in value and opposite in direction. Therefore, the first rotating arm and the first transmission arm form an interlocked structure, the first rotating arm and the first transmission arm form a first-level hinge between the first fixed bracket and the second fixed bracket, and a degree of freedom of movement of the first rotating arm is reduced to 1, so that the first rotating arm and the first transmission arm have little gap and do not shake during movement of the rotating mechanism. In this way, stretching-resistance strength and reliability of the rotating mechanism is improved.

Because a first end of the second rotating arm is rotatably connected to the second fixed bracket, and a second end of the second rotating arm is rotatably connected to the rotating end of the second transmission arm, when the first housing and the second housing rotate relative to each other, the rotating end of the second transmission arm drives the second end of the second rotating arm to rotate around a second rotation center, to form a first-level link motion, and the first end of the second rotating arm rotates around the second end of the second rotating arm, to form a second-level link motion. Therefore, a link motion of the second rotating arm is equivalent to a two-link motion. The second end of the second rotating arm is rotatably connected to the rotating end of the second transmission arm, and the second end of the second rotating arm and the rotating end of the second transmission arm rotate around a fixed point synchronously. Therefore, a rotation angle of the first-level link motion of the second rotating arm and a rotation angle of the second transmission arm are equal in value and opposite in direction. Therefore, the second rotating arm and the second transmission arm form an interlocked structure, the second rotating arm and the second transmission arm form a first-level hinge between the first fixed bracket and the second fixed bracket, and a degree of freedom of movement of the second rotating arm is reduced to 1, so that the second rotating arm and the second transmission arm have little gap and do not shake during movement of the rotating mechanism. In this way, stretching-resistance strength and reliability of the rotating mechanism is improved.

In a possible implementation, the main shaft assembly includes a main inner shaft and a main outer shaft that is fastened the main inner shaft. When the first housing and the second housing are folded relative to each other to the closed state, the main inner shaft is located between the main outer shaft and each of the first fixed bracket and the second fixed bracket. The first transmission arm rotates around the first rotation center, the first rotation center is close to the main inner shaft and away from the main outer shaft, and the first rotation center is close to the second fixed bracket and away from the first fixed bracket. The second transmission arm rotates around the second rotation center, the second rotation center is close to the main inner shaft and away from the main outer shaft, and the second rotation center is close to the first fixed bracket and away from the second fixed bracket.

In this implementation, locations of the first rotation center and the second rotation center are set, so that the rotating mechanism can more easily implement pulling-in of the housing when the folding apparatus is switched from the flattened state to the closed state and pushing-out of the housing when the folding apparatus is switched from the closed state to the flattened state, to implement deformation by using the flexible display as a neutral surface.

In addition, a plurality of three-dimensional space structures are disposed on both the main inner shaft and the main outer shaft. These structures are designed, so that after the main inner shaft and the main outer shaft are assembled, the main inner shaft and the main outer shaft can jointly form a plurality of movement spaces, and mechanical parts of the rotating mechanism are movably disposed in the plurality of movement spaces of the main shaft assembly, to implement connection to the main shaft assembly. A split design of the main inner shaft and the main outer shaft helps reduce manufacturing difficulty of the main shaft assembly, and improve manufacturing precision and a product yield of the main shaft assembly.

In a possible implementation, the main inner shaft and the main outer shaft jointly enclose a plurality of arc-shaped grooves, the rotating end of the first transmission arm is arc-shaped and disposed in one of the arc-shaped grooves, and the rotating end of the second transmission arm is arc-shaped and disposed in another arc-shaped groove.

In this implementation, the first transmission arm is connected to the main shaft assembly by using a virtual shaft, and the second transmission arm is connected to the main shaft assembly by using a virtual shaft. A rotatable connection has a simple structure and occupies a small space. This helps reduce a thickness of the rotating mechanism, so that the folding apparatus and the electronic device are more light and thin.

In a possible implementation, the rotating end of the first transmission arm may further include a limiting projection, and the limiting projection is formed at an end part of the rotating end. The limiting projection is configured to cooperate with a projection of the main shaft assembly having a limiting function, to prevent the first transmission arm from being accidentally detached from the main shaft assembly. The rotating end of the first transmission arm may further include a limiting bulge, and the limiting bulge is formed on an inner side and/or an outer side of the rotating end. The limiting bulge is configured to cooperate with a limiting groove of the main shaft assembly, so that mutual limiting of the first transmission arm and the main shaft assembly is implemented in an axial direction of the main shaft assembly.

In a possible implementation, there is a first sliding slot, a first recessed area, and a second recessed area on the second fixed bracket, both the first recessed area and the second recessed area communicate with the first sliding slot, and the first recessed area is located between the main shaft assembly and the second recessed area. The rotating mechanism further includes a first limiting component, the first limiting component is disposed at the sliding end of the first transmission arm, and the sliding end of the first transmission arm is disposed in the first sliding slot. When the first housing and the second housing are unfolded relative to each other to the flattened state, the first limiting component is partially clamped into the first recessed area. When the first housing and the second housing are folded relative to each other to the closed state, the first limiting component is partially clamped into the second recessed area.

In this implementation, the first limiting component is configured to limit a relative position relationship between the first transmission arm and the second fixed bracket, so that the first transmission arm and the second fixed bracket can maintain a preset relative position relationship when no large external force is applied, the rotating mechanism can stay at a preset angle, and the rotating mechanism can maintain the flattened state or the closed state. In this way, user experience of the folding apparatus and the electronic device is improved.

In a possible implementation, there may be a recessed guiding space on a side wall of the first sliding slot. The sliding end of the first transmission arm is disposed in the first sliding slot, so that the sliding end of the first transmission arm is slidably connected to the second fixed bracket. The sliding end of the first transmission arm includes a first flange on a circumferential side. The first flange is disposed in the guiding space of the first sliding slot. In this implementation, the guiding space of the first sliding slot cooperates with the first flange of the first transmission arm, so that the sliding end of the first transmission arm can be guided in a sliding direction of the first sliding slot. In this way, a relative sliding action between the first transmission arm and the second fixed bracket is easier to implement and control precision is higher.

In a possible implementation, there is a first accommodating slot at the sliding end of the first transmission arm, and the first limiting component is disposed in the first accommodating slot. The first limiting component includes a first bracket and a first elastic part. The first bracket includes a control part and an abutting part, one end of the first elastic part is disposed on the control part of the first bracket, the other end of the first elastic part abuts against a slot wall of the first accommodating slot, and the abutting part of the first bracket is clamped to the second fixed bracket. Because the first elastic part of the first limiting component can deform under an external force, the first limiting component can smoothly move between the first recessed area and the second recessed area relative to the second fixed bracket, to improve reliability of limiting between the first transmission arm and the second fixed bracket.

In some implementations, the first limiting component may further include a first cushioning part, and the first cushioning part is disposed on the abutting part of the first bracket. The first cushioning part may be made of a material (for example, rubber) with low rigidity, so that when subject to an external force, the first cushioning part can absorb an impact force through deformation, to implement cushioning. In the first limiting component, the first cushioning part is disposed to cushion stress between the abutting part and the second fixed bracket, to improve reliability of a limiting structure.

In a possible implementation, the rotating mechanism may further include a second limiting component. The second limiting component is disposed at the sliding end of the second transmission arm, and the second limiting component is clamped to the first fixed bracket. In this implementation, the second limiting component is configured to limit a relative position relationship between the second transmission arm and the first fixed bracket, so that the second transmission arm and the first fixed bracket can maintain a preset relative position relationship when no large external force is applied, the rotating mechanism can stay at a preset angle, and the rotating mechanism can maintain the flattened state or the closed state. In this way, user experience of the folding apparatus and the electronic device is improved.

In a possible implementation, the rotating mechanism further includes a first supporting plate and a second supporting plate. The first supporting plate is fixedly connected to the sliding end of the second transmission arm, and the second supporting plate is fixedly connected to the sliding end of the first transmission arm. When the first housing and the second housing are unfolded relative to each other to the flattened state, the first supporting plate is flush with the second supporting plate, the first supporting plate is laid between the first fixed bracket and the main shaft assembly, and the second supporting plate is laid between the second fixed bracket and the main shaft assembly. When the first housing and the second housing are folded relative to each other to the closed state, the first supporting plate is stacked on a side that is of the first fixed bracket and that is away from the second fixed bracket, and the second supporting plate is stacked on a side that is of the second fixed bracket and that is away from the first fixed bracket.

In this implementation, when the first housing and the second housing are unfolded relative to each other to the flattened state, the first supporting plate, the main shaft assembly, and the second supporting plate can jointly form a complete planar support for a bending part of the flexible display. When the first housing and second housing are folded relative to each other to the closed state, the first supporting plate and the second supporting plate can slide and be accommodated relative to the first housing and the second housing respectively, so that the main shaft assembly is exposed to form a complete support for the bending part of the flexible display. In other words, when the folding apparatus is in the flattened state or the closed state, the rotating mechanism can completely support the bending part of the flexible display, so that the flexible display is not easily damaged due to an external force touch, thereby helping protect the flexible display and improving user experience.

In a possible implementation, the main shaft assembly has a supporting surface. When the first housing and the second housing are folded relative to each other to the closed state, the supporting surface of the main shaft assembly is exposed relative to the first supporting plate and the second supporting plate. The supporting surface of the main shaft assembly is arc-shaped.

In this implementation, when the first housing and the second housing are folded relative to each other to a closed state, the main shaft assembly can provide a complete-semicircle or nearly-semicircle support effect for the bending part of the flexible display, which is consistent with an ideal closed form of the bending part of the flexible display, so that more optimized support can be provided for the flexible display in the closed form.

In a possible implementation, the rotating mechanism further includes a first shielding plate and a second shielding plate. The first shielding plate is fixedly connected to the sliding end of the first transmission arm, and the second shielding plate is fixedly connected to the sliding end of the second transmission arm. The first shielding plate is located on a side that is of the first transmission arm and that faces away from the first supporting plate, and the second shielding plate is located on a side that is of the second transmission arm and that faces away from the second supporting plate.

When the first housing and the second housing are unfolded relative to each other to the flattened state, the first shielding plate is flush with the second shielding plate, the first shielding plate is laid between the first fixed bracket and the main shaft assembly, and the second shielding plate is laid between the second fixed bracket and the main shaft assembly. When the first housing and the second housing are folded relative to each other to the closed state, the first shielding plate is located between the first fixed bracket and the first housing, and the second shielding plate is located between the second fixed bracket and the second housing.

In this implementation, when the first housing and the second housing are unfolded relative to each other to the flattened state, the first shielding plate is flush with the second shielding plate, the first shielding plate is laid between the first fixed bracket and the main shaft assembly, and can shield a gap between the first fixed bracket and the main shaft assembly, and the second shielding plate is laid between the second fixed bracket and the main shaft assembly, and can shield a gap between the second fixed bracket and the main shaft assembly. Therefore, the folding apparatus can implement self-shielding. In this way, appearance integrity is improved, a risk that dust, sundries, and the like enter the rotating mechanism from outside can also be reduced, to ensure reliability of the folding apparatus. When the first housing and the second housing are folded relative to each other to the closed state, the first shielding plate can be accommodated between the first fixed bracket and the first housing, and the second shielding plate can be accommodated between the second fixed bracket and the second housing, so that avoidance is achieved. In this way, the folding apparatus can be smoothly folded to the closed form, and mechanism reliability is high.

In addition, the first supporting plate and the first shielding plate are fastened to the sliding end of the first transmission arm, and the first supporting plate and the first shielding plate move with the sliding end of the first transmission arm, and the second supporting plate and the second shielding plate are fastened to the sliding end of the second transmission arm, and the second supporting plate and the second shielding plate move with the sliding end of the second transmission arm. Therefore, when the folding apparatus is switched from the closed state to the flattened state or when the folding apparatus is switched from the flattened state to the closed state, the first supporting plate and the second supporting plate gradually approach the main shaft assembly or move away from the main shaft assembly, so that the folding apparatus can completely support the flexible display in various forms. In this way, reliability of the flexible display and the electronic device is improved and service lives of the flexible display and the electronic device are increased. When the folding apparatus is switched from the closed state to the flattened state or when the folding apparatus is switched from the flattened state to the closed state, the first shielding plate and the second shielding plate gradually approach the main shaft assembly or move away from the main shaft assembly, so that the folding apparatus in the various forms can adapt to forms of the rotating mechanism, to implement self-shielding. In this way, mechanism reliability is high.

The first supporting plate, the first shielding plate, and the second transmission arm are assembled into one component, and the second supporting plate, the second shielding plate, and the first transmission arm are assembled into one component. Therefore, the second transmission arm can directly control motion tracks of the first supporting plate and the first shielding plate, and the first transmission arm can directly control motion tracks of the second supporting plate and the second shielding plate. In this way, precision is high in controlling movement processes of the first supporting plate, the second supporting plate, the first shielding plate, and the second shielding plate, and hysteresis is small, to implement accurately extending or retracting when the folding apparatus is rotated, so as to meet a requirement of supporting the flexible display and a self-shielding requirement of the rotating mechanism.

In a possible implementation, the main shaft assembly has a shielding surface. When the first housing and the second housing are unfolded relative to each other to the flattened state, the shielding surface of the main shaft assembly is exposed relative to the first shielding plate and the second shielding plate. Therefore, the first shielding plate, the main shaft assembly, and the second shielding plate can jointly shield a gap between the first housing and the second housing, so that the rotating mechanism can implement self-shielding in the flattened state.

In a possible implementation, the main shaft assembly further includes a shielding plate, and the shielding plate is fastened on a side that is of the main inner shaft and that faces away from the main outer shaft. The shielding surface of the main shaft assembly is formed by the shielding plate, and is disposed to face away from the main outer shaft. In some implementations, the shielding plate and the main inner shaft may be fastened to each other in an assembled manner. In some implementations, the shielding plate and the main inner shaft may be alternatively an integrally-formed mechanical part.

In a possible implementation, the first fixed bracket includes a first connecting block. The first connecting block may be in a claw shape, and there is a rotation hole on the first connecting block. The first rotating arm includes a first end in a claw shape, and there is a rotation hole on the first end of the first rotating arm. The first end of the first rotating arm is connected to the first connecting block in a staggered manner, and a rotating shaft passes through the rotation hole of the first connecting block and the rotation hole of the first end of the first rotating arm, so that the first end of the first rotating arm is rotatably connected to the first connecting block. In this way, the first rotating arm is rotatably connected to the first fixed bracket. The first end of the first rotating arm is connected to the first connecting block in the staggered manner, so that mutual limiting of the first end of the first rotating arm and the first connecting block can be implemented in the axial direction of the main shaft assembly, to improve connection reliability of the rotating mechanism.

The first connecting block includes a stop block. When the first housing and the second housing are unfolded relative to each other to the flattened state, an end part of the first end of the first rotating arm abuts against the stop block, so that the first rotating arm stays at a predetermined location, to avoid stretching the flexible display due to over-flipping of the first housing and the second housing, to protect the flexible display.

In some implementations, the first rotating arm further includes a second end in a claw shape, the second end of the first rotating arm and the first end are disposed back to back, and there is a rotation hole on the second end of the first rotating arm. An end part of the rotating end of the first transmission arm is in a claw shape, and there is a rotation hole on the end part of the rotating end of the first transmission arm. The second end of the first rotating arm is connected to the end part of the rotating end of the first transmission arm in a staggered manner, and a rotating shaft passes through the rotation hole of the second end of the first rotating arm and the rotation hole of the rotating end of the first transmission arm, so that the second end of the first rotating arm is rotatably connected to the rotating end of the first transmission arm. In this way, the first rotating arm is rotatably connected to the first transmission arm. The second end of the first rotating arm is connected to the end part of the rotating end of the first transmission arm in the staggered manner, so that mutual limiting of the second end of the first rotating arm and the end part of the rotating end of the first transmission arm can be implemented in the axial direction of the main shaft assembly, to improve connection reliability of the rotating mechanism.

In a possible implementation, the rotating mechanism further includes a first synchronous swing arm and a second synchronous swing arm. The first synchronous swing arm includes a rotating end and a movable end, the rotating end of the first synchronous swing arm is rotatably connected to the main shaft assembly, the movable end of the first synchronous swing arm is movably connected to the first fixed bracket, and when the first housing and the second housing are folded or unfolded relative to each other, the movable end of the first synchronous swing arm slides and rotates relative to the first fixed bracket. The second synchronous swing arm includes a rotating end and a movable end, the rotating end of the second synchronous swing arm is rotatably connected to the main shaft assembly, the rotating end of the second synchronous swing arm is engaged with the rotating end of the first synchronous swing arm, the movable end of the second synchronous swing arm is movably connected to the second fixed bracket, and when the first housing and the second housing are folded or unfolded relative to each other, the movable end of the second synchronous swing arm slides and rotates relative to the second fixed bracket.

In this implementation, the rotating end of the first synchronous swing arm and the rotating end of the second synchronous swing arm are engaged with each other, and both the rotating end of the first synchronous swing arm and the rotating end of the second synchronous swing arm are rotatably connected to the main shaft assembly, the movable end of the first synchronous swing arm is movably connected to the first fixed bracket, and the movable end of the second synchronous swing arm is movably connected to the second fixed bracket. Therefore, when the first housing and the second housing are unfolded or folded relative to each other, the first synchronous swing arm and the second synchronous swing arm can control rotation angles of the first fixed bracket and the second fixed bracket to be consistent relative to the main shaft assembly, so that rotation actions of the first housing and the second housing are synchronous and consistent. Symmetry of folding actions and unfolding actions of the folding apparatus is high. This helps improve user experience.

The first synchronous swing arm is rotatably connected to the main shaft assembly, and slidably and rotatably connected to the first fixed bracket, so that a link-slider structure is formed. The second synchronous swing arm is rotatably connected to the main shaft assembly, and slidably and rotatably connected to the second fixed bracket, so that a link-slider structure is formed. The two link-slider structures that are engaged with each other can effectively control the rotation actions of the first housing and the second housing to be synchronous and consistent.

In a possible implementation, the rotating end of the first synchronous swing arm includes a first rotating body, a first rotating shaft, and a first gear, the first rotating shaft is fastened to a front facet and/or a back facet of the first rotating body, the first gear is fastened to a circumferential side facet of the first rotating body, and the first rotating shaft is rotatably connected to the main shaft assembly. The rotating end of the second synchronous swing arm includes a second rotating body, a second rotating shaft, and a second gear, the second rotating shaft is fastened to a front facet and/or a back facet of the second rotating body, the second gear is fastened to a circumferential side facet of the second rotating body, the second rotating shaft is rotatably connected to the main shaft assembly, and the second gear is engaged with the first gear.

In this implementation, the rotating end of the first synchronous swing arm and the rotating end of the second synchronous swing arm are directly engaged with each other by using the first gear and the second gear, so that a synchronization assembly jointly formed by the first synchronous swing arm and the second synchronous swing arm has a simple structure, a movement process is easy to control, and accuracy is high.

In a possible implementation, the rotating mechanism further includes a first connector and a second connector, the first connector is slidably disposed on the first fixed bracket, the movable end of the first synchronous swing arm is rotatably connected to the first connector, the second connector is slidably disposed on the second fixed bracket, and the movable end of the second synchronous swing arm is rotatably connected to the second connector.

In a possible implementation, the rotating mechanism further includes a third fixed bracket, a fourth fixed bracket, a third transmission arm, a fourth transmission arm, and a gear drive assembly. The third fixed bracket is fastened to the first housing, and the fourth fixed bracket is fastened to the second housing. The third transmission arm includes a sliding end and a rotating end, the sliding end of the third transmission arm is slidably connected to the first fixed bracket, and the rotating end of the third transmission arm is rotatably connected to the main shaft assembly. The fourth transmission arm includes a sliding end and a rotating end, the sliding end of the fourth transmission arm is slidably connected to the second fixed bracket, the rotating end of the fourth transmission arm is rotatably connected to the main shaft assembly, and the rotating end of the fourth transmission arm is engaged with the rotating end of the third transmission arm by using the gear drive assembly.

In this implementation, in the rotating mechanism, interaction strength between the rotating mechanism, and the first housing and the second housing are increased by disposing the third fixed bracket, the fourth fixed bracket, the third transmission arm, the fourth transmission arm, and the gear drive assembly, so that folding and unfolding the folding apparatus are easier. In addition, the gear drive assembly is disposed, so that actions of the third transmission arm and the fourth transmission arm are associated with each other, and the third transmission arm and the fourth transmission arm form an interlocked structure, so that a degree of freedom of the mechanism is limited, and structural strength and reliability of the mechanism are increased.

In a possible implementation, a rotation center around which the third transmission arm rotates relative to the main shaft assembly and a rotation center around which the second transmission arm rotates relative to the main shaft assembly are collinear. A rotation center around which the fourth transmission arm rotates relative to the main shaft assembly and a rotation center around which the first transmission arm rotates relative to the main shaft assembly are collinear.

In this implementation, the rotation centers around which the third transmission arm and the second transmission arm rotate relative to the main shaft assembly are collinear, and the third transmission arm is slidably connected to the third fixed bracket, and the rotation centers around which the fourth transmission arm and the first transmission arm rotate relative to the main shaft assembly are collinear, and the fourth transmission arm is slidably connected to the fourth fixed bracket. In this way, movement of the third transmission arm can be synchronized with movement of the second transmission arm, and movement of the fourth transmission arm can be synchronized with movement of the first transmission arm, so that a structure design and a connection relationship of the rotating mechanism can be simplified, and reliability of the rotating structure is improved.

In some implementations, the rotating end of the third transmission arm includes a third gear, and the rotating end of the fourth transmission arm includes a fourth gear. The gear drive assembly includes a first gear shaft and a second gear shaft. The first gear shaft includes a middle rotating shaft and two end gears that are respectively fastened to two sides of the middle rotating shaft. The second gear shaft includes a middle rotating shaft and two end gears that are respectively fastened to two sides of the middle rotating shaft. One end gear of the first gear shaft is engaged with the third gear of the third transmission arm. The two end gears of the second gear shaft are engaged with the two end gears of the first gear shaft respectively. One end gear of the second gear shaft is engaged with the fourth gear of the fourth transmission arm. The middle rotating shaft of the first gear shaft is rotatably connected to the main shaft assembly, and the middle rotating shaft of the second gear shaft is rotatably connected to the main shaft assembly.

According to a second aspect, this application further provides an electronic device, including a flexible display and the folding apparatus according to any one of the foregoing implementations. The flexible display includes a first non-bending part, a bending part, and a second non-bending part that are sequentially arranged, the first non-bending part is fastened to a first housing, the second non-bending part is fastened to a second housing, and when the first housing and the second housing are folded or unfolded relative to each other, the bending part deforms.

In this application, the flexible display can be unfolded or folded with the folding apparatus. When the electronic device is in a flattened state, the flexible display is in a flattened form, and can perform full-screen display, so that the electronic device has a large display area, to improve viewing experience of a user. When the electronic device is in a closed state, a planar size of the electronic device is small, so that it is convenient for a user to carry and place the electronic device.

In the electronic device, the rotating mechanism of the folding apparatus is optimized, so that the folding apparatus can be rotated by using the flexible display as a neutral surface, to reduce a risk of pulling or squeezing the flexible display to protect the flexible display, and improve reliability of the flexible display, so that the flexible display and the electronic device have long service lives.

DETAILED DESCRIPTION OF ILLUSTRATIVE EMBODIMENTS

The following describes embodiments of this application with reference to the accompanying drawings in the embodiments of this application.

Embodiments of this application provide a folding apparatus and an electronic device. The electronic device includes the folding apparatus and a flexible display fastened to the folding apparatus. The folding apparatus may be unfolded to a flattened state, or may be folded to a closed state, or may be in an intermediate state between the flattened state and the closed state. The flexible display is unfolded and folded with the folding apparatus. In the electronic device, a rotating mechanism of the folding apparatus is optimized, so that the folding apparatus can be rotated by using the flexible display as a neutral surface. In this way, a risk of pulling or squeezing the flexible display is reduced, to protect the flexible display, and improve reliability of the flexible display, so that the flexible display and the electronic device have long service lives.

Figure 1:
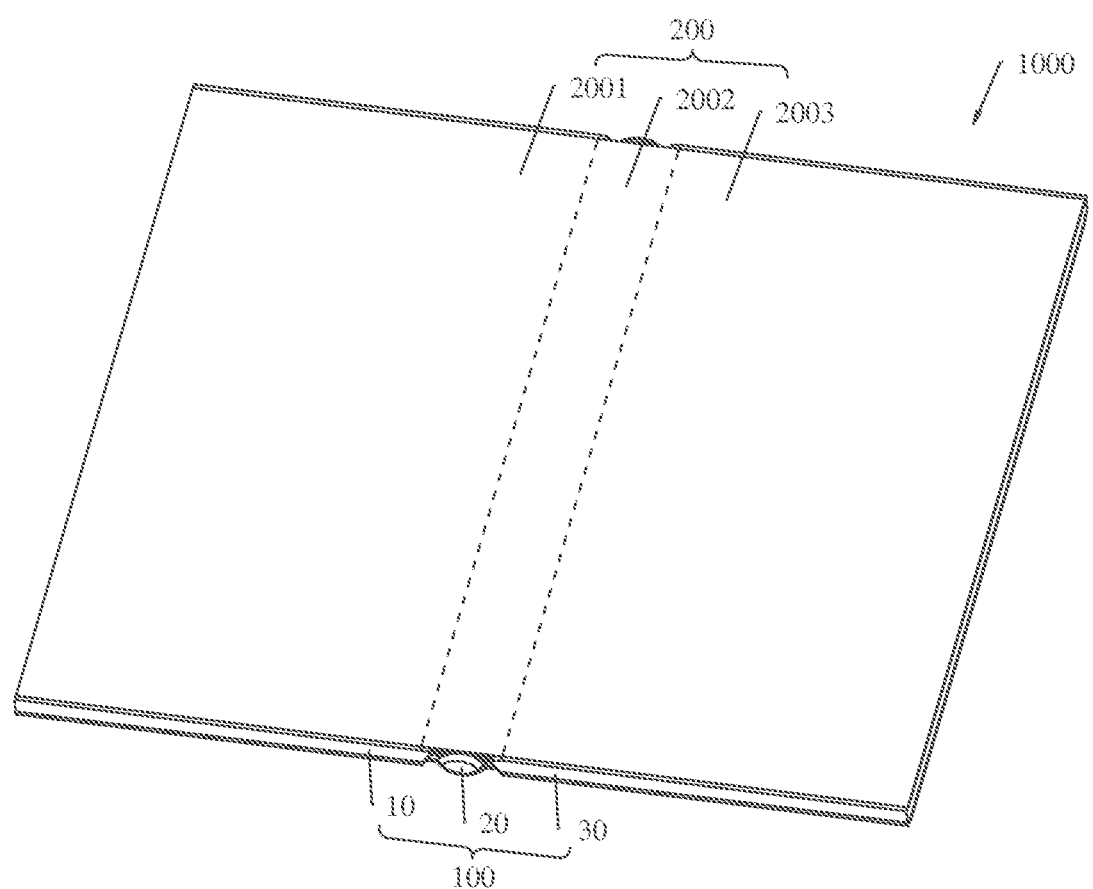
FIG. 1 is a schematic diagram of a structure in which an electronic device is in a flattened state according to an embodiment of this application.
Figure 2:
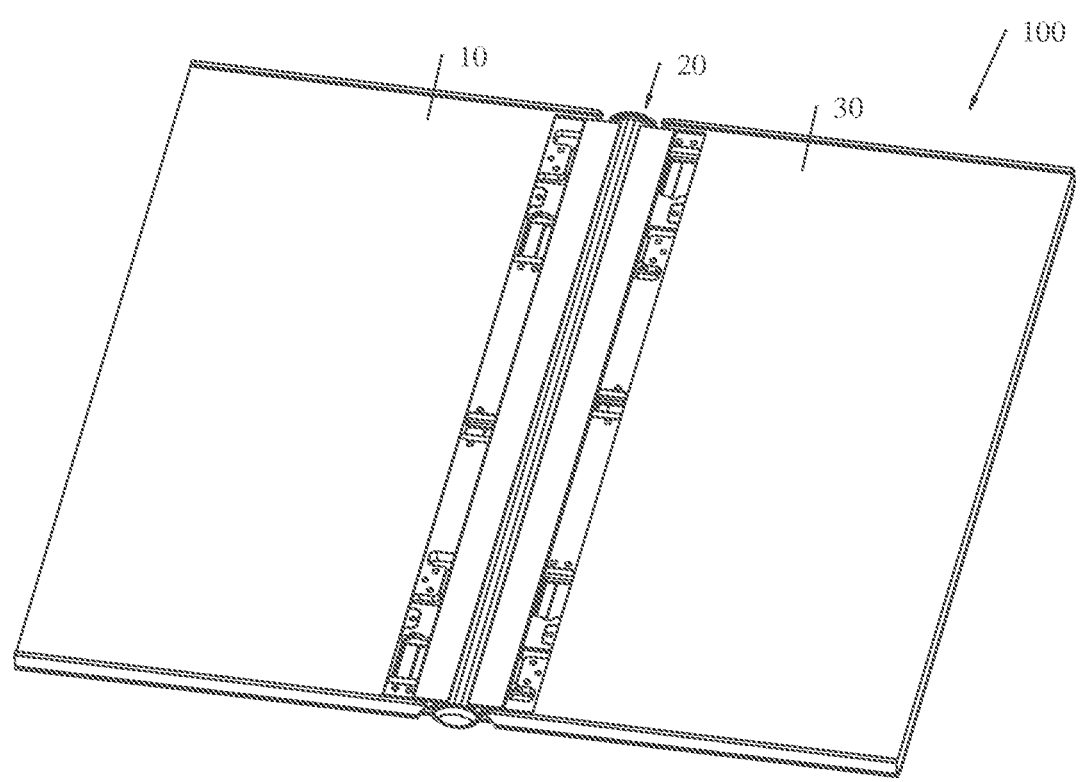
FIG. 2 is a schematic diagram of a structure of a folding apparatus of the electronic device shown in FIG. 1.
Figure 3:
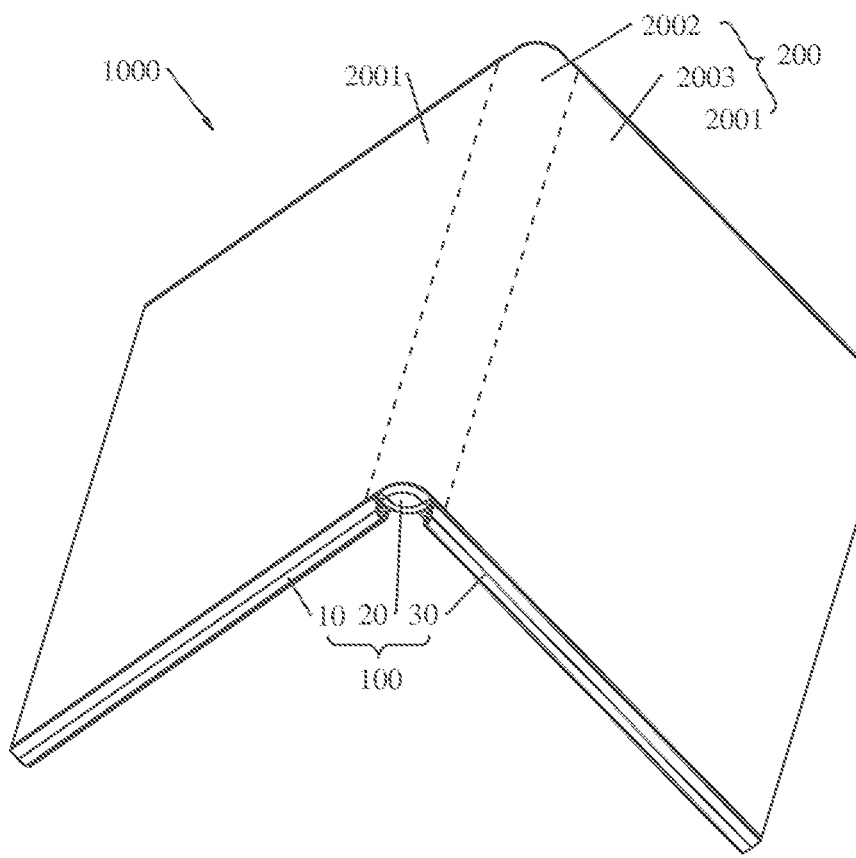
FIG. 3 is a schematic diagram of a structure in which the electronic device shown in FIG. 1 is in an intermediate state.
Figure 4:
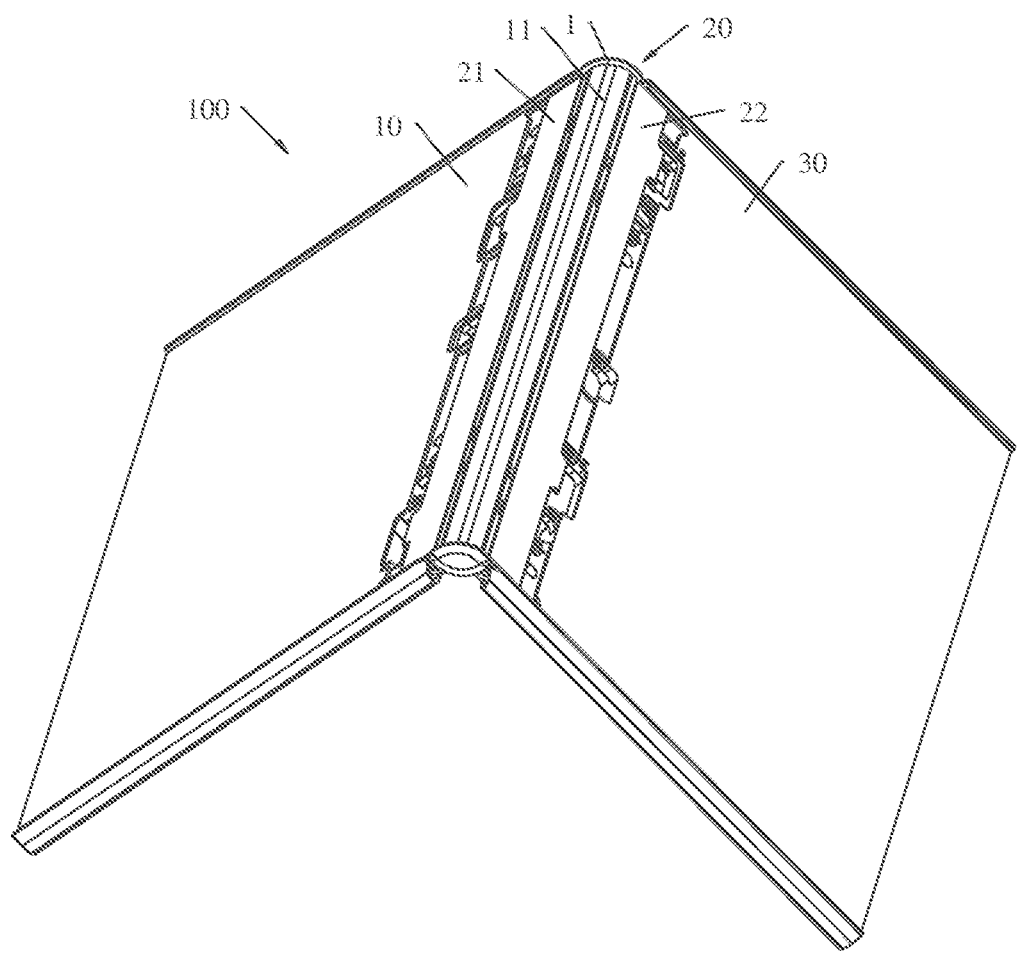
FIG. 4 is a schematic diagram of a structure of a folding apparatus of the electronic device shown in FIG. 3.
Figure 5:
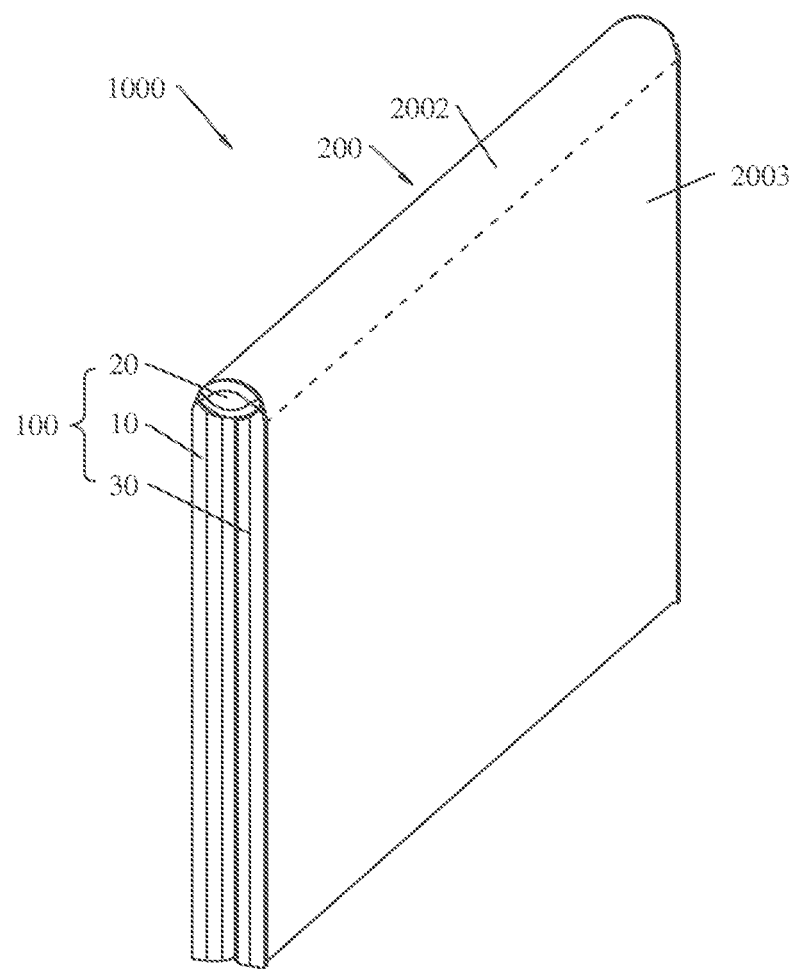
FIG. 5 is a schematic diagram of a structure in which the electronic device shown in FIG. 1 is in a closed state.
Figure 6:
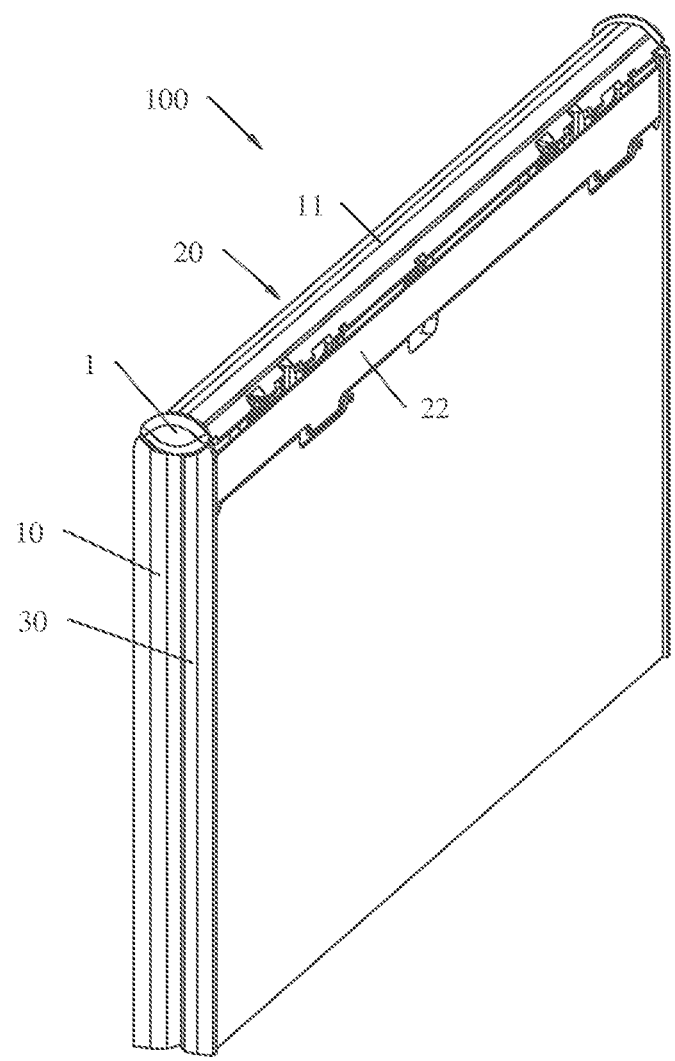
FIG. 6 is a schematic diagram of a structure of a folding apparatus of the electronic device shown in FIG. 5.

FIG. 1 is a schematic diagram of a structure in which an electronic device 1000 is in a flattened state according to an embodiment of this application. FIG. 2 is a schematic diagram of a structure of a folding apparatus 100 of the electronic device 1000 shown in FIG. 1. FIG. 3 is a schematic diagram of a structure in which the electronic device 1000 shown in FIG. 1 is in an intermediate state. FIG. 4 is a schematic diagram of a structure of the folding apparatus 100 of the electronic device 1000 shown in FIG. 3. FIG. 5 is a schematic diagram of a structure in which the electronic device 1000 shown in FIG. 1 is in a closed state. FIG. 6 is a schematic diagram of a structure of a folding apparatus 100 of the electronic device 1000 shown in FIG. 5. The electronic device 1000 may be a product such as a mobile phone, a tablet computer, or a notebook computer. This embodiment is described by using an example in which the electronic device 1000 is a mobile phone.

The electronic device 1000 includes the folding apparatus 100 and a flexible display 200. The folding apparatus 100 includes a first housing 10, a rotating mechanism 20, and a second housing 30 that are sequentially connected. The first housing 10 may include a left middle frame and a left back housing, and the second housing 30 may include a right middle frame and a right back housing. The rotating mechanism 20 can deform, so that the first housing 10 and the second housing 30 are folded or unfolded relative to each other. As shown in FIG. 1 and FIG. 2, the first housing 10 and the second housing 30 can be unfolded relative to each other to a flattened state, so that the electronic device 1000 is in a flattened state. For example, when the first housing 10 and the second housing 30 are in the flattened state, an included angle between the first housing 10 and the second housing 30 may be approximately 180° (a slight deviation is allowed, for example, the included angle is 165°, 177°, or 185°). As shown in FIG. 3 and FIG. 4, the first housing 10 and the second housing 30 can be rotated (unfolded or folded) relative to each other to an intermediate state, so that the electronic device 1000 is in an intermediate state. As shown in FIG. 5 and FIG. 6, the first housing 10 and the second housing 30 can be folded relative to each other to a closed state, so that the electronic device 1000 is in a closed state. For example, when the first housing 10 and the second housing 30 are in the closed state, the first housing 10 and the second housing 30 can be completely closed to be parallel to each other (a slight deviation is also allowed). The intermediate state shown in FIG. 3 and FIG. 4 may be any state between the flattened state and the closed state. Therefore, the electronic device 1000 may be switched between the flattened state and the closed state through deformation of the rotating mechanism 20.

In some embodiments, the flexible display 200 is configured to display an image. For example, the flexible display 200 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, or a quantum dot light-emitting diode (quantum dot light-emitting diodes, QLED) display.

The flexible display 200 includes a first non-bending part 2001, a bending part 2002, and a second non-bending part 2003 that are sequentially arranged. The flexible display 200 is fastened to the folding apparatus 100. For example, the flexible display 200 may be bonded to the folding apparatus 100 by using an adhesive layer. The first non-bending part 2001 of the flexible display 200 is fastened to the first housing 10, and the second non-bending part 2003 is fastened to the second housing 30. When the first housing 10 and the second housing 30 are folded or unfolded relative to each other, the bending part 2002 deforms. As shown in FIG. 1, when the first housing 10 and the second housing 30 are in the flattened state, the flexible display 200 is in a flattened form. As shown in FIG. 3, when the first housing 10 and the second housing 30 are in the intermediate state, the flexible display 200 is in an intermediate form between the flattened form and a closed form. As shown in FIG. 5, when the first housing 10 and the second housing 30 are in the closed state, the flexible display 200 is in the closed form. When the electronic device 1000 is in the closed state, the flexible display 200 is located on an outer side of the folding apparatus 100, and the flexible display 200 may be approximately U-shaped.

In this embodiment, the flexible display 200 can be unfolded or folded with the folding apparatus 100. When the electronic device 1000 is in the flattened state, the flexible display 200 is in the flattened form, and can perform full-screen display, so that the electronic device 1000 has a large display area, to improve viewing experience of a user. When the electronic device 1000 is in the closed state, a planar size of the electronic device 1000 is small (with a small width), so that it is convenient for a user to carry and place the electronic device 1000.

It may be understood that this embodiment is described by using an example in which "a rotation center of the electronic device 1000 is parallel to a width direction of the electronic device 1000". In this case, the electronic device 1000 can rotate leftward and rightward, and folding and unfolding of the electronic device 1000 affect a width of the electronic device 1000. In some other embodiments, a rotation center of the electronic device 1000 may alternatively be parallel to a length direction of the electronic device 1000. In this case, the electronic device 1000 can rotate up and down, and folding and unfolding of the electronic device 1000 affect a length of the electronic device 1000.

Figure 7:
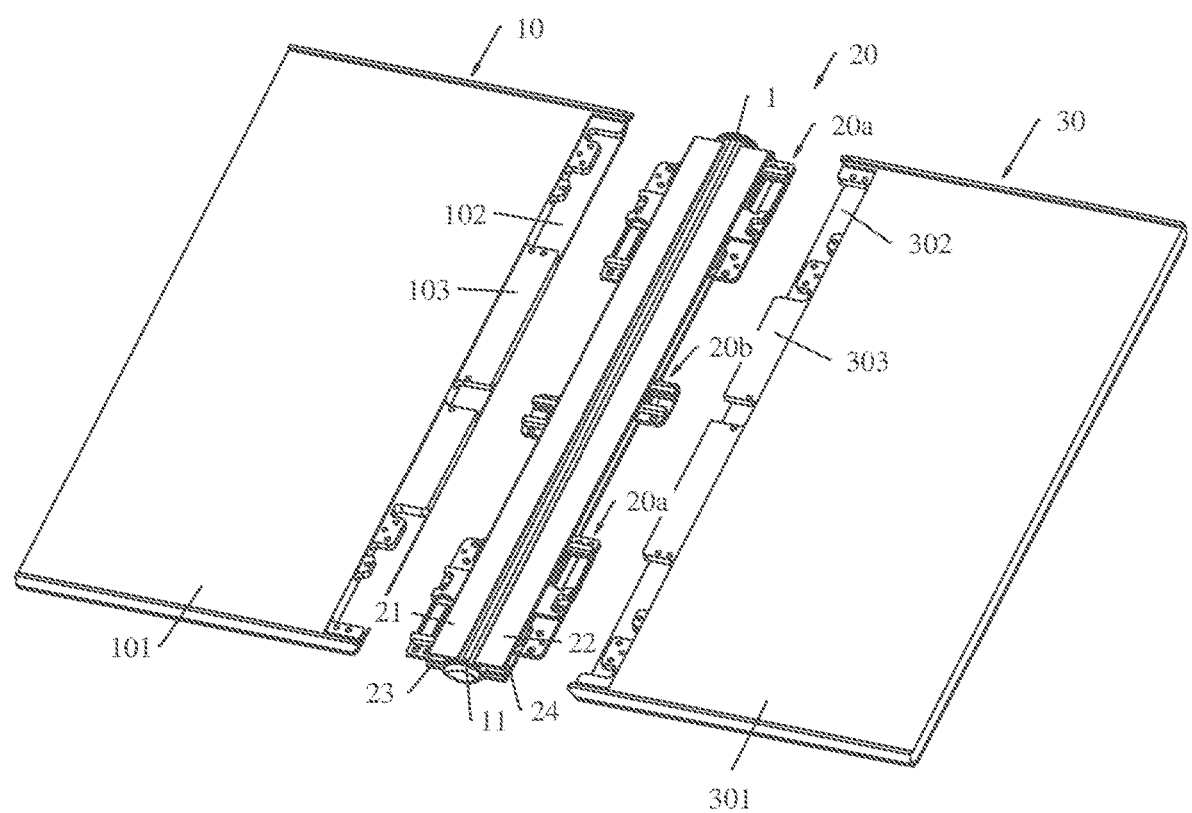
FIG. 7 is a schematic diagram of a partially-exploded structure of the folding apparatus shown in FIG. 2.
Figure 8:
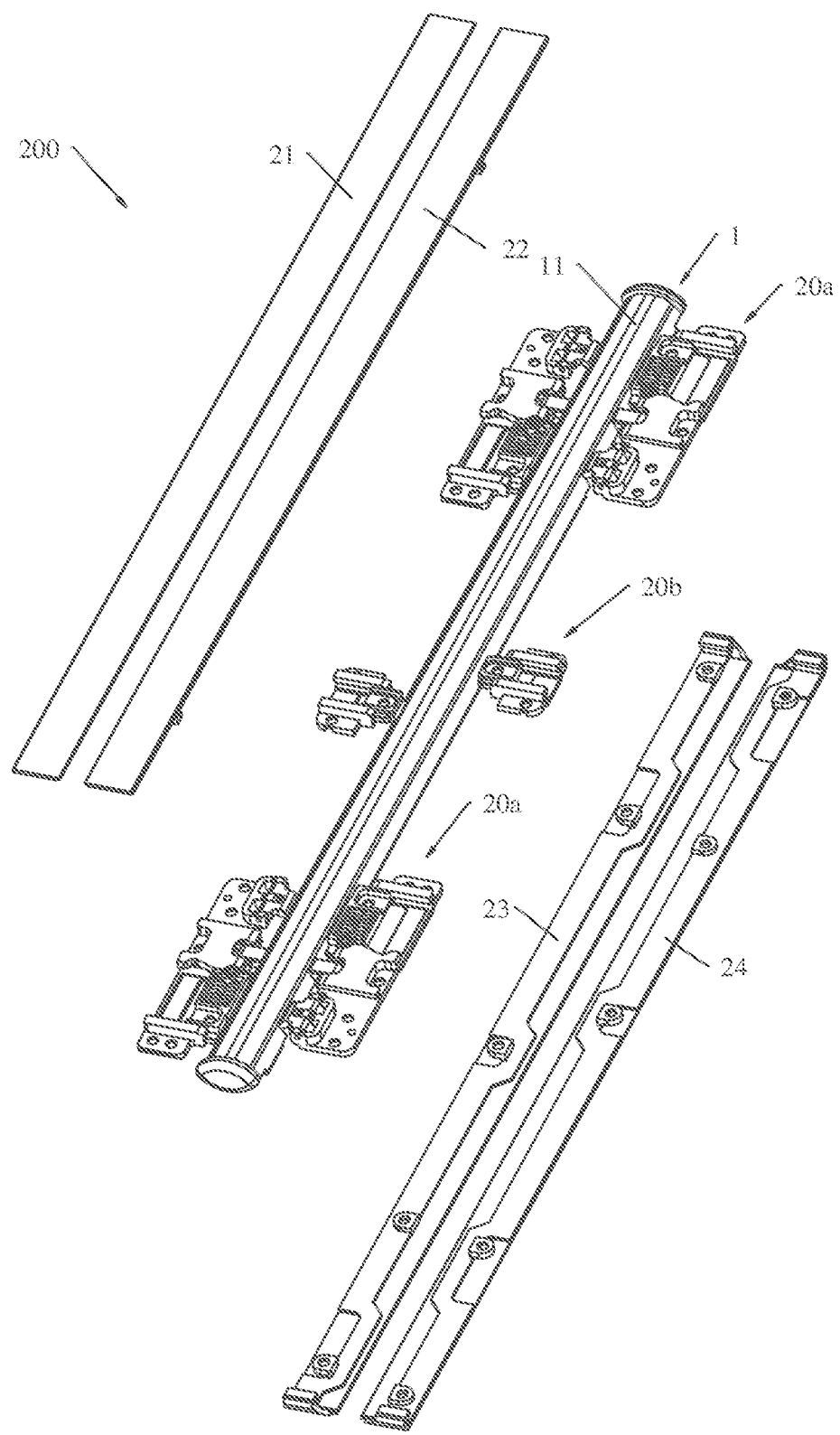
FIG. 8 is a schematic diagram of a partially-exploded structure of a rotating mechanism shown in FIG. 7.

FIG. 7 is a schematic diagram of a partially-exploded structure of the folding apparatus 100 shown in FIG. 2, and FIG. 8 is a schematic diagram of a partially-exploded structure of a rotating mechanism 20 shown in FIG. 7. Fasteners in the folding apparatus 100 are not shown in the accompanying drawings of this application, to simplify the drawings and show a main structure of the folding apparatus 100 more clearly.

In some embodiments, the rotating mechanism 20 of the folding apparatus 100 includes a main shaft assembly 1, an end connecting assembly 20a, a middle connecting assembly 20b, a first supporting plate 21, a second supporting plate 22, a first shielding plate 23, and a second shielding plate 24.

The main shaft assembly 1 is located between the first housing 10 and the second housing 30. The end connecting assembly 20a is connected to the first housing 10, the main shaft assembly 1, and the second housing 30. There are two end connecting assemblies 20a, and the two end connecting assemblies 20a are spaced in an axial direction of the main shaft assembly 1, for example, may be respectively connected to the top and the bottom of the main shaft assembly 1. The middle connecting assembly 20b is connected to the first housing 10, the main shaft assembly 1, and the second housing 30. The middle connecting assembly 20b is located between the two end connecting assemblies 20a. The first supporting plate 21 and the second supporting plate 22 are located on one side of a plurality of connecting assemblies (that is, the two end connecting assemblies 20a and the middle connecting assembly 20b), and the first shielding plate 23 and the second shielding plate 24 are located on the other side of the plurality of connecting assemblies (the assemblies 20a and the assembly 20b).

The first supporting plate 21 is located on a side that is of the main shaft assembly 1 and that faces the first housing 10, and the first supporting plate 21 is connected to the end connecting assemblies 20a. In some embodiments, the first supporting plate 21 may alternatively be connected to the middle connecting assembly 20b. The second supporting plate 22 is located on a side that is of the main shaft assembly 1 and that faces the second housing 30, and the second supporting plate 22 is connected to the end connecting assemblies 20a. In some embodiments, the second supporting plate 22 may alternatively be connected to the middle connecting assembly 20b.

The first housing 10 has a first supporting surface 101, and the first supporting surface 101 is configured to support the flexible display 200. The second housing 30 has a second supporting surface 301, and the second supporting surface 301 is configured to support the flexible display 200. When the first housing 10 and the second housing 30 are unfolded relative to each other to the flattened state, the first supporting surface 101 is flush with the second supporting surface 301, to better support the flexible display 200, so that the flexible display 200 is flatter, improving user experience.

The main shaft assembly 1 has a supporting surface 11. When the first housing 10 and the second housing 30 are unfolded relative to each other to the flattened state, the supporting surface 11 of the main shaft assembly 1 is partially exposed relative to the first supporting plate 21 and the second supporting plate 22. The first supporting plate 21, the main shaft assembly 1, and the second supporting plate 22 can jointly support the bending part 2002 of the flexible display 200, so that the flexible display 200 is flatter and is not easily damaged due to an external force touch, improving reliability of the flexible display 200. As shown in FIG. 4, when the first housing 10 and the second housing 30 are in the intermediate state, the supporting surface 11 of the main shaft assembly 1 is partially exposed relative to the first supporting plate 21 and the second supporting plate 22, an exposed area of the supporting surface 11 of the main shaft assembly 1 is larger than an exposed area main shaft assembly in the flattened state, and the supporting surface 11 of the main shaft assembly 1, the first supporting plate 21, and the second supporting plate 22 jointly support the bending part 2002 of the flexible display 200. As shown in FIG. 6, when the first housing 10 and the second housing 30 are folded relative to each other to the closed state, the supporting surface 11 of the main shaft assembly 1 is completely exposed relative to the first supporting plate 21 and the second supporting plate 22, and the supporting surface 11 of the main shaft assembly 1 supports the bending part 2002 of the flexible display 200.

For example, the supporting surface 11 of the main shaft assembly 1 is arc-shaped. In this case, when the first housing 10 and the second housing 30 are folded relative to each other to a closed state, the main shaft assembly 1 can provide complete-semicircle or nearly-semicircle support effect for the bending part 2002 of the flexible display 200, and this is consistent with an ideal closed form of the bending part 2002 of the flexible display 200, so that more optimized support can be provided for the flexible display 200 in the closed form. It may be understood that, in this embodiment of this application, there are two cases in which the supporting surface 11 of the main shaft assembly 1 is arc-shaped. One is that the supporting surface 11 of the main shaft assembly 1 is standard-arc-shaped, and the other is that the entire supporting surface 11 of the main shaft assembly 1 is approximately arc-shaped.

In some embodiments, the supporting surface 11 of the main shaft assembly 1 is standard-arc-shaped, and a central angle of the supporting surface 11 may be within a range of 150° to 180°, to better support the flexible display 200. In some other embodiments, a middle region of the supporting surface 11 of the main shaft assembly 1 is planar, and regions on two sides of the supporting surface 11 are arc-surface shaped. In this case, the entire supporting surface 11 is approximately arc-shaped, and can implement semicircular or approximately-semicircular support for the flexible display 200 in the closed state. The middle region of the supporting surface 11 can implement planar support for the flexible display 200 in the flattened state with the first supporting plate 21 and the second supporting plate 22. In some other embodiments, the supporting surface 11 of the main shaft assembly 1 may alternatively have another shape. For example, the supporting surface 11 of the main shaft assembly 1 is set to a semi-ellipse shape, to reduce a width of the folding apparatus 100 in the closed state, so that it is more convenient to carry and place the electronic device. A shape of the supporting surface 11 of the main shaft assembly 1 is not strictly limited in this embodiment of this application.

Figure 9:
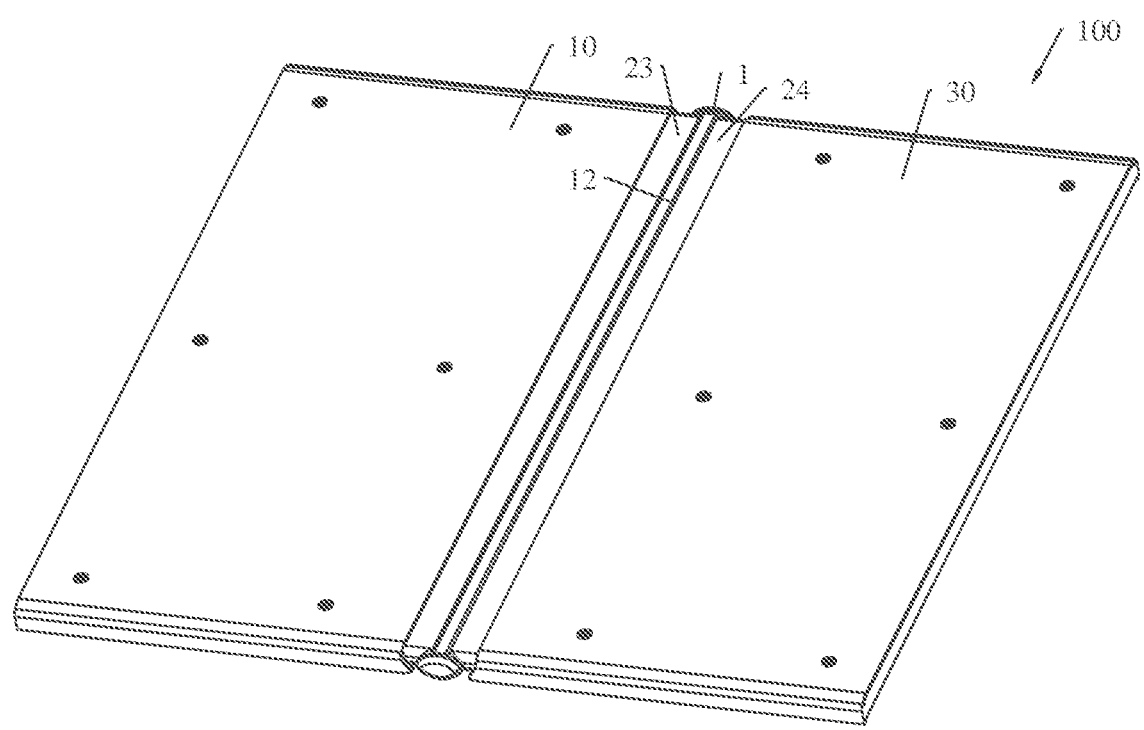
FIG. 9 is a schematic diagram of a structure of the folding apparatus shown in FIG. 2 from another angle.

Refer to FIG. 8 and FIG. 9. FIG. 9 is a schematic diagram of a structure of the folding apparatus 100 shown in FIG. 2 from another angle. A view angle of the folding apparatus 100 shown in FIG. 9 is a view angle obtained after the folding apparatus 100 shown in FIG. 2 is turned over.

In some embodiments, the first shielding plate 23 is located on the side that is of the main shaft assembly 1 and that faces the first housing 10, and the first shielding plate 23 is connected to the end connecting assemblies 20a. In some embodiments, the first shielding plate 23 may alternatively be connected to the middle connecting assembly 20b. The second shielding plate 24 is located on the side that is of the main shaft assembly 1 and that faces the second housing 30, and the second shielding plate 24 is connected to the end connecting assemblies 20a. In some embodiments, the second shielding plate 24 may alternatively be connected to the middle connecting assembly 20b.

The main shaft assembly 1 has a shielding surface 12. As shown in FIG. 9, when the first housing 10 and the second housing 30 are unfolded relative to each other to the flattened state, the shielding surface 12 of the main shaft assembly 1 is exposed relative to the first shielding plate 23 and the second shielding plate 24. The first shielding plate 23 is located between the first housing 10 and the main shaft assembly 1, and can shield a gap between the first housing 10 and the main shaft assembly 1. The second shielding plate 24 is located between the second housing 30 and the main shaft assembly 1, and can shield a gap between the second housing 30 and the main shaft assembly 1. Therefore, the first shielding plate 23, the main shaft assembly 1, and the second shielding plate 24 can jointly shield a gap between the first housing 10 and the second housing 30, so that the rotating mechanism 20 can implement self-shielding in the flattened state. In this way, appearance integrity is improved, and a risk that dust, sundries, and the like enter the rotating mechanism 20 from outside can also be reduced, to ensure reliability of the folding apparatus 100.

Figure 10:
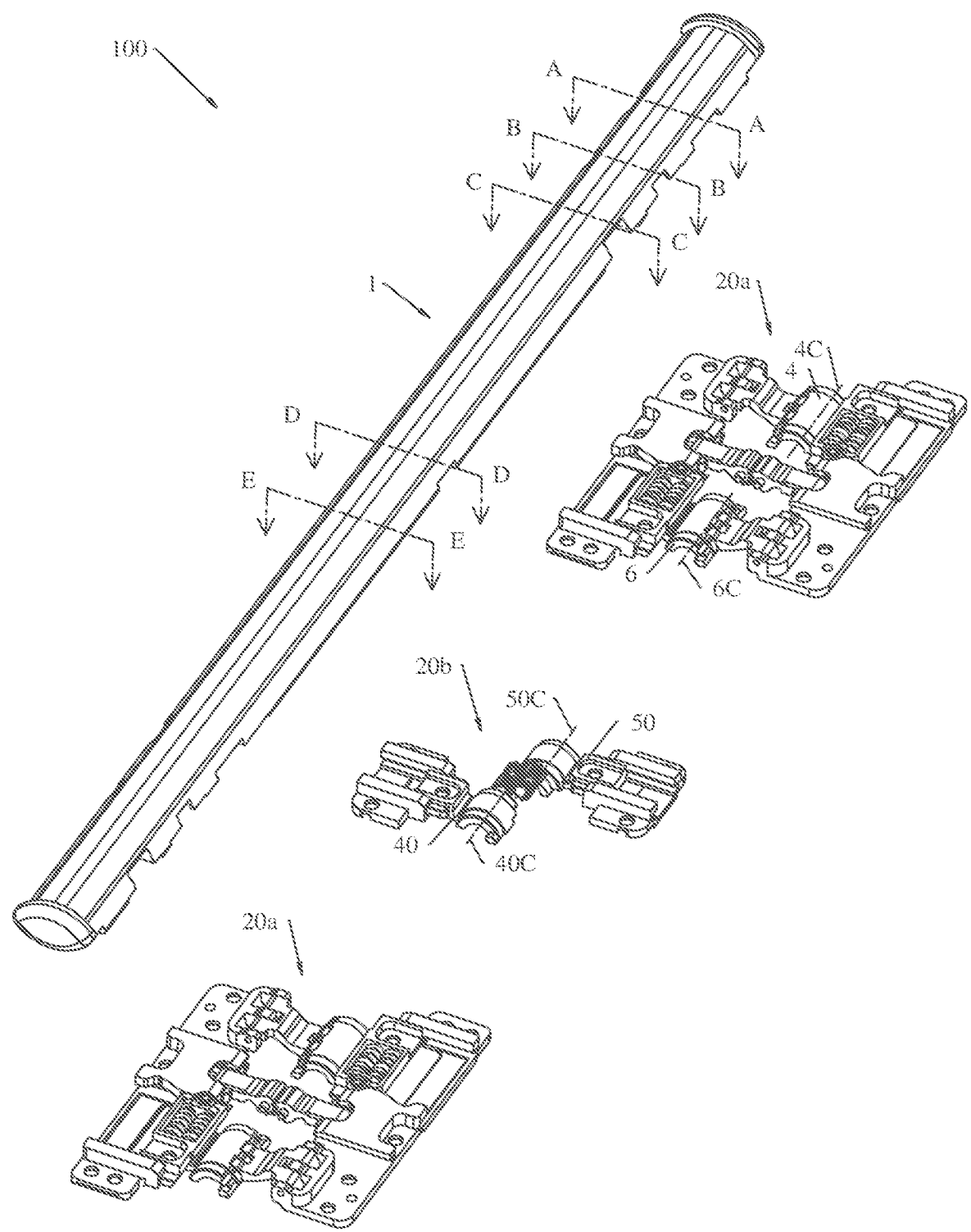
FIG. 10 is a schematic diagram of a partially-exploded partial structure of the folding apparatus shown in FIG. 2.

FIG. 10 is a schematic diagram of a partially-exploded partial structure of the folding apparatus 100 shown in FIG. 2.

In some embodiments, a plurality of movement spaces communicating with the outside of the main shaft assembly 1 are formed inside the main shaft assembly 1, and the plurality of connecting assemblies (the assemblies 20a and the assembly 20b) of the rotating mechanism 20 are movably disposed in these movement spaces to connect to the main shaft assembly 1. A rotation center of the entire rotating mechanism 20 is parallel to the axial direction of the main shaft assembly 1, and the main shaft assembly 1 extends in the axial direction of the main shaft assembly 1.

In some embodiments, structures of the two end connecting assemblies 20a are the same, so that an overall structure of the rotating mechanism 20 is simple and processing costs are low. A structure of the middle connecting assembly 20b is simpler than the structure of the end connecting assembly 20a. In the rotating mechanism 20, the two end connecting assemblies 20a implement primary connection and control functions, and the middle connecting assembly 20b implements secondary connection and control functions. In some other embodiments, structures of the two end connecting assemblies 20a may alternatively be different. In some other embodiments, the rotating mechanism 20 may not be provided with the middle connecting assembly 20b. In some other embodiments, alternatively, in the rotating mechanism 20, a middle connecting assembly may be set to a primary connecting assembly (for example, for a structure of the connecting assembly, refer to the structure of the end connecting assembly 20a in FIG. 1), and an end connecting assembly may be set to a secondary connecting assembly (for example, for a structure of the connecting assembly, refer to the structure of the middle connecting assembly 20b in FIG. 10). In some other embodiments, only one end connecting assembly 20a may be disposed, and the end connecting assembly 20a is connected to the middle of the main shaft assembly 1, the middle of the first housing 10, and the middle of the second housing 30. It may be understood that the structure of the rotating mechanism 20 may have a plurality of combination and variation manners. This is not strictly limited in this embodiment of this application.

Figure 11:
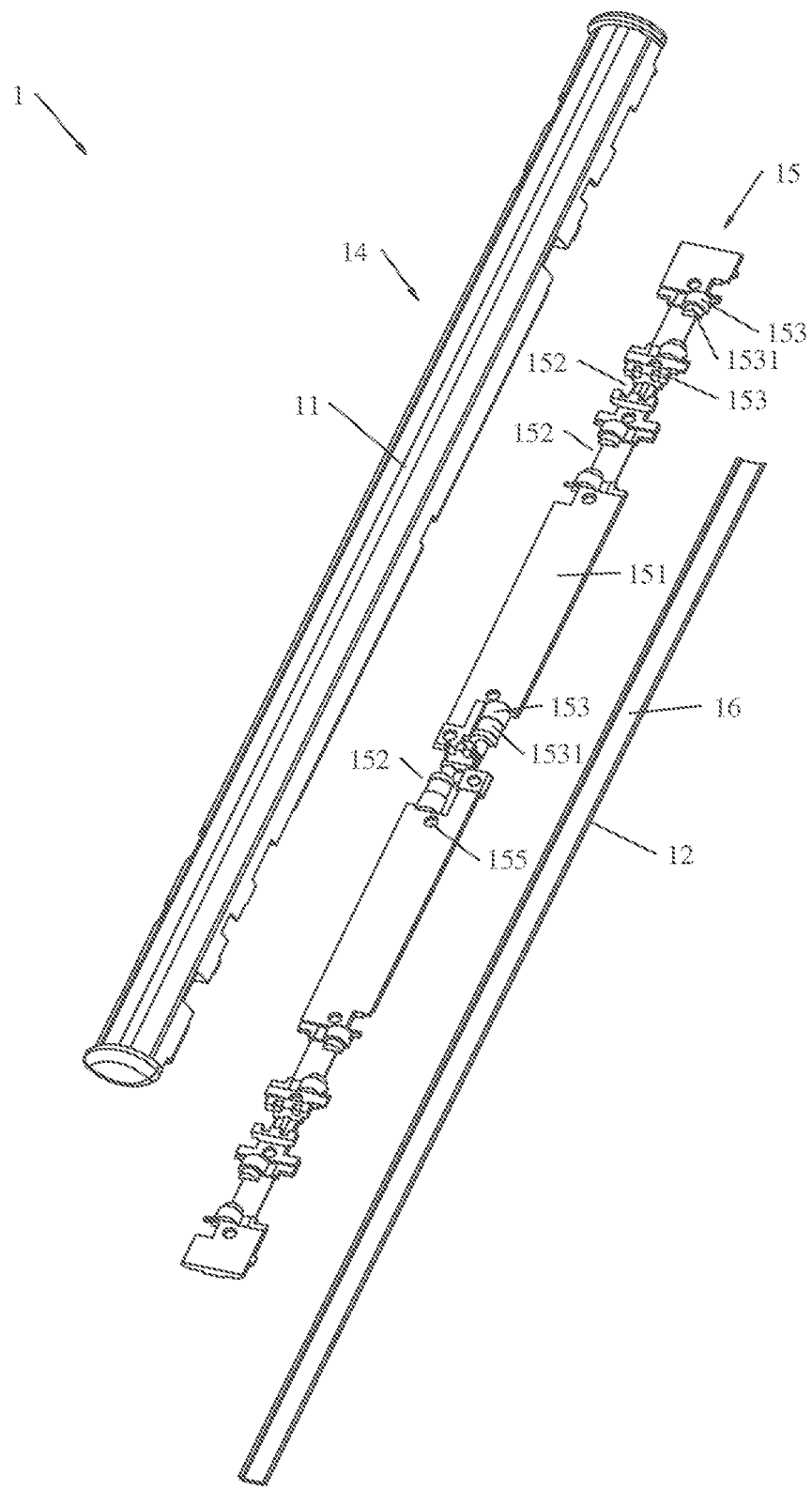
FIG. 11 is a schematic diagram of an exploded structure of a main shaft assembly shown in FIG. 10.
Figure 12:
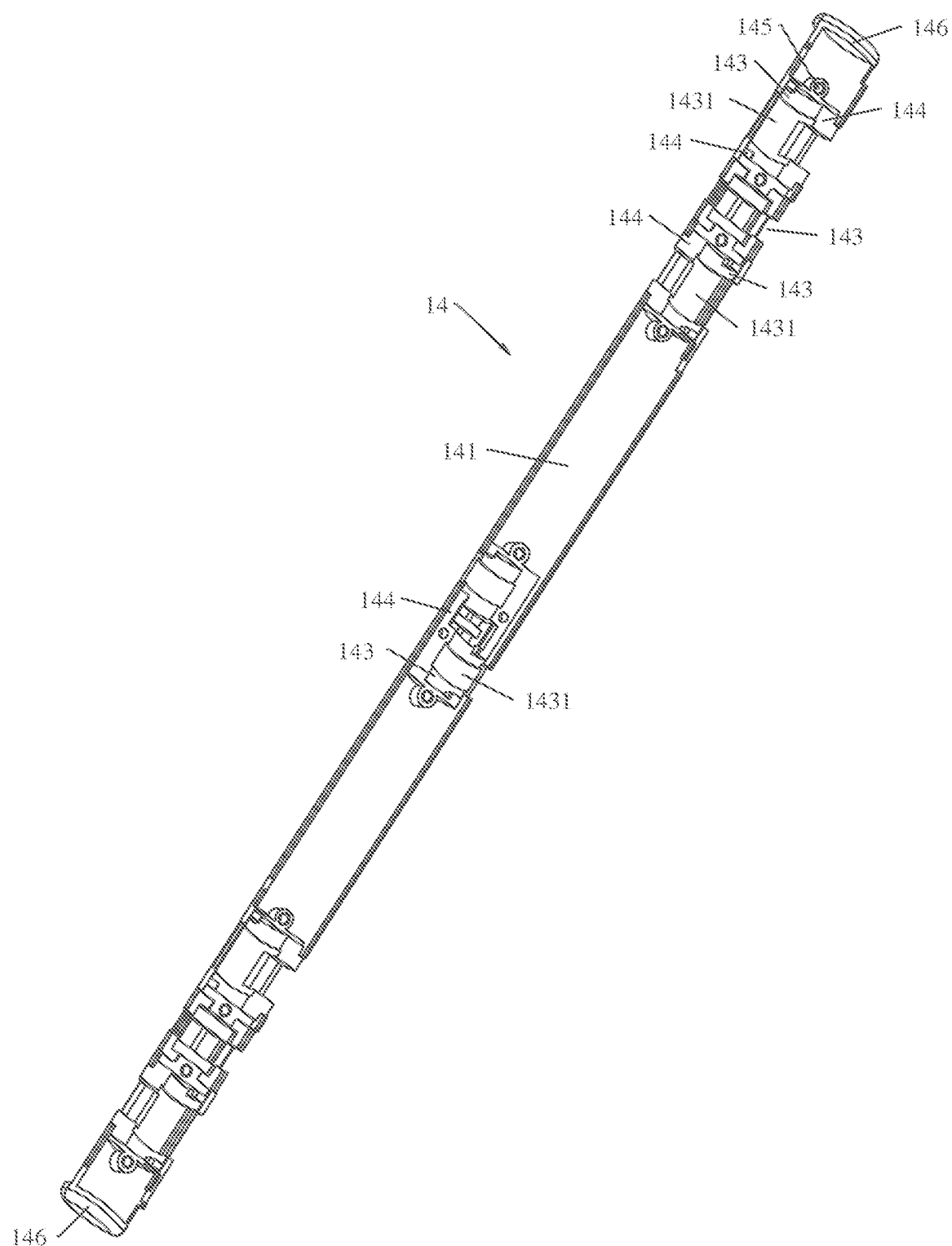
FIG. 12 is a schematic diagram of a structure of a main outer shaft shown in FIG. 11 from another angle.

FIG. 11 is a schematic diagram of an exploded structure of the main shaft assembly 1 shown in FIG. 10. FIG. 12 is a schematic diagram of a structure of a main outer shaft 14 shown in FIG. 11 from another angle.

In some embodiments, the main shaft assembly 1 includes the main outer shaft 14, a main inner shaft 15, and a shielding plate 16. The main outer shaft 14 is fastened on one side of the main inner shaft 15, and the shielding plate 16 is fastened on the other side of the main inner shaft 15. The supporting surface 11 of the main shaft assembly 1 is formed on the main outer shaft 14, and is disposed to face away from the main inner shaft 15. The shielding surface 12 of the main shaft assembly 1 is formed on the shielding plate 16, and is disposed to face away from the main outer shaft 14. In some embodiments, the shielding plate 16 and the main inner shaft 15 may be fastened to each other in an assembled manner. In some other embodiments, the shielding plate 16 and the main inner shaft 15 may be alternatively an integrally-formed mechanical part.

A plurality of three-dimensional space structures are disposed on both the main inner shaft 15 and the main outer shaft 14. These structures are designed, so that after the main inner shaft 15 and the main outer shaft 14 are assembled, the main inner shaft 15 and the main outer shaft 14 can jointly form a plurality of movement spaces, and mechanical parts of the plurality of connecting assemblies (the assemblies 20*a* and the assembly 20*b*) are movably disposed in the plurality of movement spaces of the main shaft assembly 1, to implement connection to the main shaft assembly 1. A split design of the main inner shaft 15 and the main outer shaft 14 helps reduce manufacturing difficulty of the main shaft assembly 1, and improve manufacturing precision and a product yield of the main shaft assembly 1.

In some embodiments, as shown in FIG. 11, the main inner shaft 15 includes a main inner shaft body 151, a plurality of grooves 152, a plurality of projections 153, and a plurality of fastening holes 155. The main inner shaft body 151 is approximately plate-shaped. The plurality of projections 153 are formed on the main inner shaft body 151, the plurality of grooves 152 are formed on the main inner shaft body 151 and/or the plurality of projections 153, and the projections 153 and the grooves 152 are combined with each other to form a plurality of three-dimensional space structures. The plurality of fastening holes 155 are formed on the main inner shaft body 151. In embodiments of this application, "A and/or B" includes three cases: "A", "B", and "A and B". Some grooves 152, some projections 153, and some fastening holes 155 are schematically marked in FIG. 11.

As shown in FIG. 12, the main outer shaft 14 includes a main outer shaft body 141, a plurality of grooves 143, a plurality of projections 144, two end stoppers 146, and a plurality of fastening holes 145. The main outer shaft body 141 is approximately in an arc plate shape, and the two end stoppers 146 are fastened at two ends of the main outer shaft body 141. The plurality of projections 144 are formed on the main outer shaft body 141, the plurality of grooves 143 are formed on the main outer shaft body 141 and/or the plurality of projections 144, and the projections 144 and the grooves 143 are combined with each other to form a plurality of three-dimensional space structures. The plurality of fastening holes 145 are formed on the plurality of projections 144. Some grooves 143, some projections 144, and some fastening holes 145 are schematically marked in FIG. 12.

After the main outer shaft 14 and the main inner shaft 15 are fastened to each other, the main outer shaft body 141, the two end stoppers 146, and the main inner shaft body 151 jointly enclose an internal space of the main shaft assembly 1. The two end stoppers 146 are exposed. The plurality of fastening holes 145 of the main outer shaft 14 are aligned with the plurality of fastening holes 155 of the main inner shaft 15, and the main inner shaft 15 and the main outer shaft 14 are fastened by using fasteners (not shown in the figure). The fastener includes but is not limited to a screw, a bolt, a rivet, a dowel pin, and the like. The plurality of three-dimensional space structures of the main outer shaft 14 and the plurality of three-dimensional space structures of the main inner shaft 15 jointly form the plurality of movement spaces of the main shaft assembly 1. For example, some of the plurality of movement spaces are the same in structure, and some of the plurality of movement spaces are different in structure. The movement spaces with different structures are used to cooperate with mechanical parts with different structures, so that connection structures between the main shaft assembly 1 and the plurality of connecting assemblies (the assemblies 20*a* and the assembly 20*b*) are more flexible and diversified. The movement spaces with a same structure are used to cooperate with mechanical parts with a same structure, which helps reduce design difficulty and costs of the main shaft assembly 1 and the connecting assemblies.

In some embodiments, as shown in FIG. 11, some projections 153 of the main inner shaft 15 have limiting grooves 1531, configured to limit, in the axial direction of the main shaft assembly 1, a mechanical part disposed in a corresponding movement space, to improve reliability of a connection structure. Some limiting grooves 1531 are schematically marked in FIG. 11. As shown in FIG. 12, limiting grooves 1431 are disposed on groove walls of some grooves 143 of the main outer shaft 14, configured to limit, in the axial direction of the main shaft assembly 1, a mechanical part disposed in a corresponding movement space, to improve reliability of a connection structure. Some limiting grooves 1431 are schematically marked in FIG. 12. It may be understood that when one limiting groove (1531/1431) is disposed in a same movement space, a mechanical part can be limited in the axial direction of the main shaft assembly 1. Certainly, in some embodiments, two limiting grooves (1531 and 1431) may alternatively be disposed in a same movement space, to improve limiting stability.

In some embodiments, as shown in FIG. 12, some projections 144 of the main outer shaft 14 have a limiting function. These projections 144 are located in the movement spaces of the main shaft assembly 1, and are configured to limit the mechanical part of the connecting assembly, to prevent the mechanical part from accidentally detaching from the main shaft assembly 1, so as to improve reliability of connection and motion between the connecting assembly and the main shaft assembly 1, so that reliability of the rotating mechanism 20 and the folding apparatus 100 are higher. It may be understood that, in the main shaft assembly 1, a projection may alternatively be disposed on the main inner shaft 15 for a limiting function.

Figure 13:
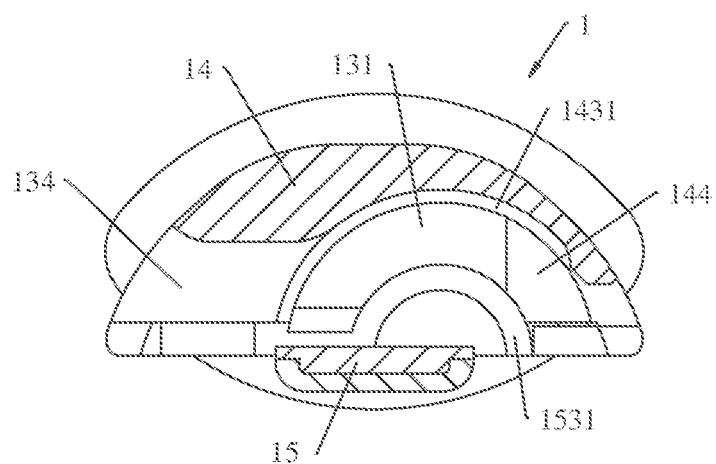
FIG. 13 is a schematic diagram of a structure in which a main shaft assembly shown in FIG. 10 is cut along a line A-A.
Figure 14:
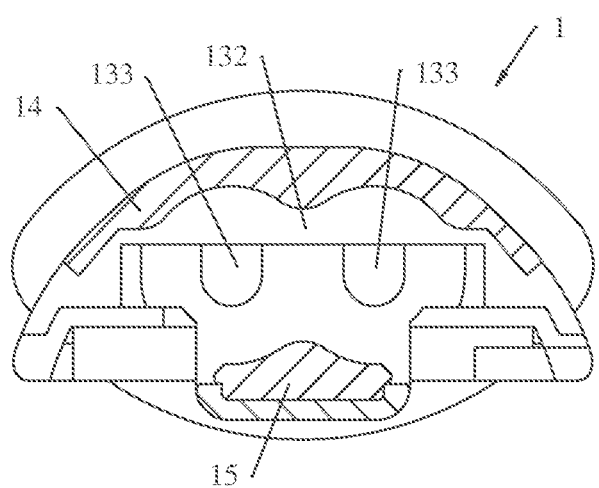
FIG. 14 is a schematic diagram of a structure in which a main shaft assembly shown in FIG. 10 is cut along a line B-B.
Figure 15:
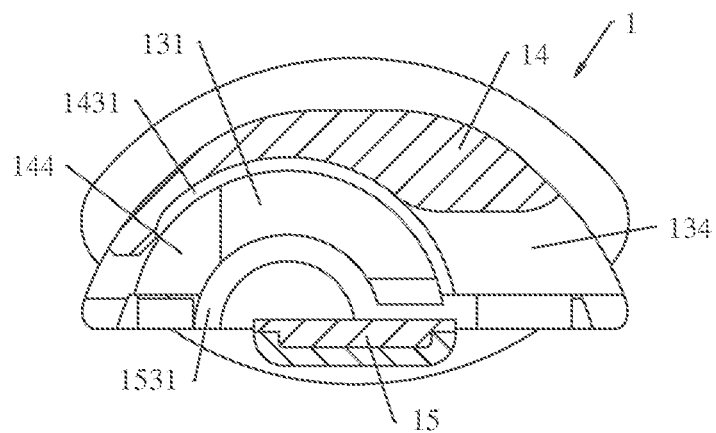
FIG. 15 is a schematic diagram of a structure in which a main shaft assembly shown in FIG. 10 is cut along a line C-C.
Figure 16:
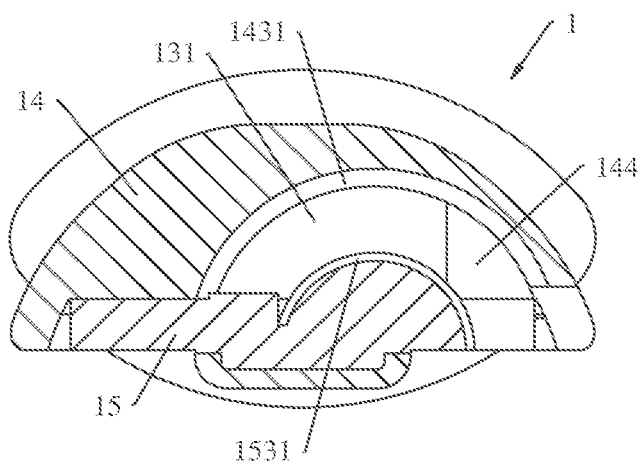
FIG. 16 is a schematic diagram of a structure in which a main shaft assembly shown in FIG. 10 is cut along a line D-D.
Figure 17:
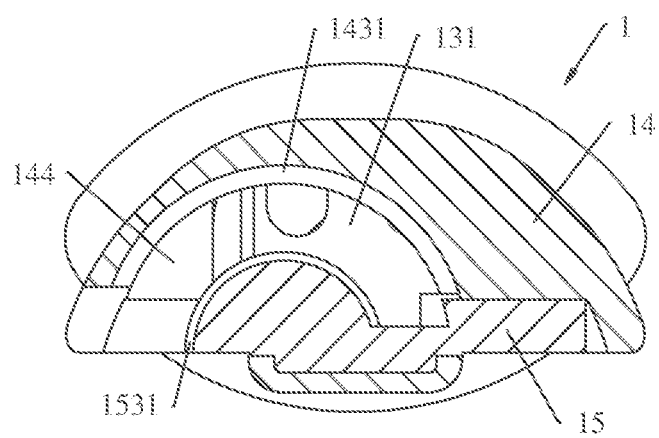
FIG. 17 is a schematic diagram of a structure in which a main shaft assembly shown in FIG. 10 is cut along a line E-E.

FIG. 13 is a schematic diagram of a structure in which the main shaft assembly 1 shown in FIG. 10 is cut along a line A-A, FIG. 14 is a schematic diagram of a structure in which the main shaft assembly 1 shown in FIG. 10 is cut along a line B-B, FIG. 15 is a schematic diagram of a structure in which the main shaft assembly 1 shown in FIG. 10 is cut along a line C-C, FIG. 16 is a schematic diagram of a structure in which the main shaft assembly 1 shown in FIG. 10 is cut along a line D-D, and FIG. 17 is a schematic diagram of a structure in which the main shaft assembly 1 shown in FIG. 10 is cut along a line E-E.

For example, in this embodiment, the main shaft assembly 1 forms a plurality of movement spaces, and the plurality of movement spaces are used to cooperate with different mechanical parts of connecting assemblies.

As shown in FIG. 13, the main outer shaft 14 and the main inner shaft 15 jointly enclose an arc-shaped groove 131 and a communicating hole 134. A circle center of the arc-shaped groove 131 is close to the main inner shaft 15 and is away from the main outer shaft 14. One end of the arc-shaped groove 131 is connected to an external space on one side of the main shaft assembly 1. The communicating hole 134 connects the other end of the arc-shaped groove 131 to an external space on the other side of the main shaft assembly 1. The arc-shaped groove 131 and the communicating hole 134 jointly form a movement space. In some embodiments, the movement space may further include two limiting grooves (1531 and 1431) communicating with the arc-shaped groove 131. One of the two limiting grooves is formed on the main outer shaft 14, and the other is formed on the main inner shaft 15. In some embodiments, the main outer shaft 14 may further include a projection 144 having a limiting function, and the projection 144 extends into the arc-shaped groove 131 to limit a mechanical part disposed in the arc-shaped groove 131.

As shown in FIG. 14, the main outer shaft 14 and the main inner shaft 15 jointly enclose an M-shaped groove 132, two ends of the M-shaped groove 132 are respectively connected to the external space on the two sides of the main shaft assembly 1, two spaced recessed grooves 133 are formed on a side wall of the M-shaped groove 132, and the M-shaped groove 132 and the two recessed grooves 133 jointly form a movement space.

As shown in FIG. 15, the main outer shaft 14 and the main inner shaft 15 jointly enclose an arc-shaped groove 131 and a communicating hole 134. A circle center of the arc-shaped groove 131 is close to the main inner shaft 15 and is away from the main outer shaft 14. One end of the arc-shaped groove 131 is connected to an external space on one side of the main shaft assembly 1. The communicating hole 134 connects the other end of the arc-shaped groove 131 to an external space on the other side of the main shaft assembly 1. The arc-shaped groove 131 and the communicating hole 134 jointly form a movement space. In some embodiments, the movement space may further include two limiting grooves (1531 and 1431) communicating with the arc-shaped groove 131. One of the two limiting grooves is formed on the main outer shaft 14, and the other is formed on the main inner shaft 15. In some embodiments, the main outer shaft 14 may further include a projection 144 having a limiting function, and the projection 144 extends into the arc-shaped groove 131 to limit a mechanical part disposed in the arc-shaped groove 131.

The movement space shown in FIG. 13 and the movement space shown in FIG. 15 are disposed in pairs, and locations of the arc-shaped groove 131 and the communicating hole 134 of the movement space shown in FIG. 13 are opposite to locations of the arc-shaped groove 131 and the communicating hole 134 of the movement space shown in FIG. 15.

As shown in FIG. 16, the main outer shaft 14 and the main inner shaft 15 jointly enclose an arc-shaped groove 131, and a circle center of the arc-shaped groove 131 is close to the main outer shaft 14 and away from the main inner shaft 15, to form a movement space. In some embodiments, the movement space may further include two limiting grooves (1531 and 1431) communicating with the arc-shaped groove 131. One of the two limiting grooves is formed on the main outer shaft 14, and the other is formed on the main inner shaft 15. In some embodiments, the main outer shaft 14 may further include a projection 144 having a limiting function, and the projection 144 extends into the arc-shaped groove 131 to limit a mechanical part disposed in the arc-shaped groove 131.

As shown in FIG. 17, the main outer shaft 14 and the main inner shaft 15 jointly enclose an arc-shaped groove 131, and a circle center of the arc-shaped groove 131 is close to the main outer shaft 14 and away from the main inner shaft 15, to form a movement space. In some embodiments, the movement space may further include two limiting grooves (1531 and 1431) communicating with the arc-shaped groove 131. One of the two limiting grooves is formed on the main outer shaft 14, and the other is formed on the main inner shaft 15. In some embodiments, the main outer shaft 14 may further include a projection 144 having a limiting function, and the projection 144 extends into the arc-shaped groove 131 to limit a mechanical part disposed in the arc-shaped groove 131.

The movement space shown in FIG. 16 and the movement space shown in FIG. 17 are disposed in pairs, and a location of the movement space shown in FIG. 16 is opposite to a location of the movement space shown in FIG. 17.

As shown in FIG. 13 and FIG. 15 to FIG. 17, the main outer shaft 14 and the main inner shaft 15 jointly form a plurality of arc-shaped grooves 131. The plurality of arc-shaped grooves 131 are located in different movement spaces, and are configured to cooperate with different mechanical parts.

It may be understood that the main shaft assembly 1 in this embodiment of this application may alternatively have another structure. This is not strictly limited in this application.

Figure 18:
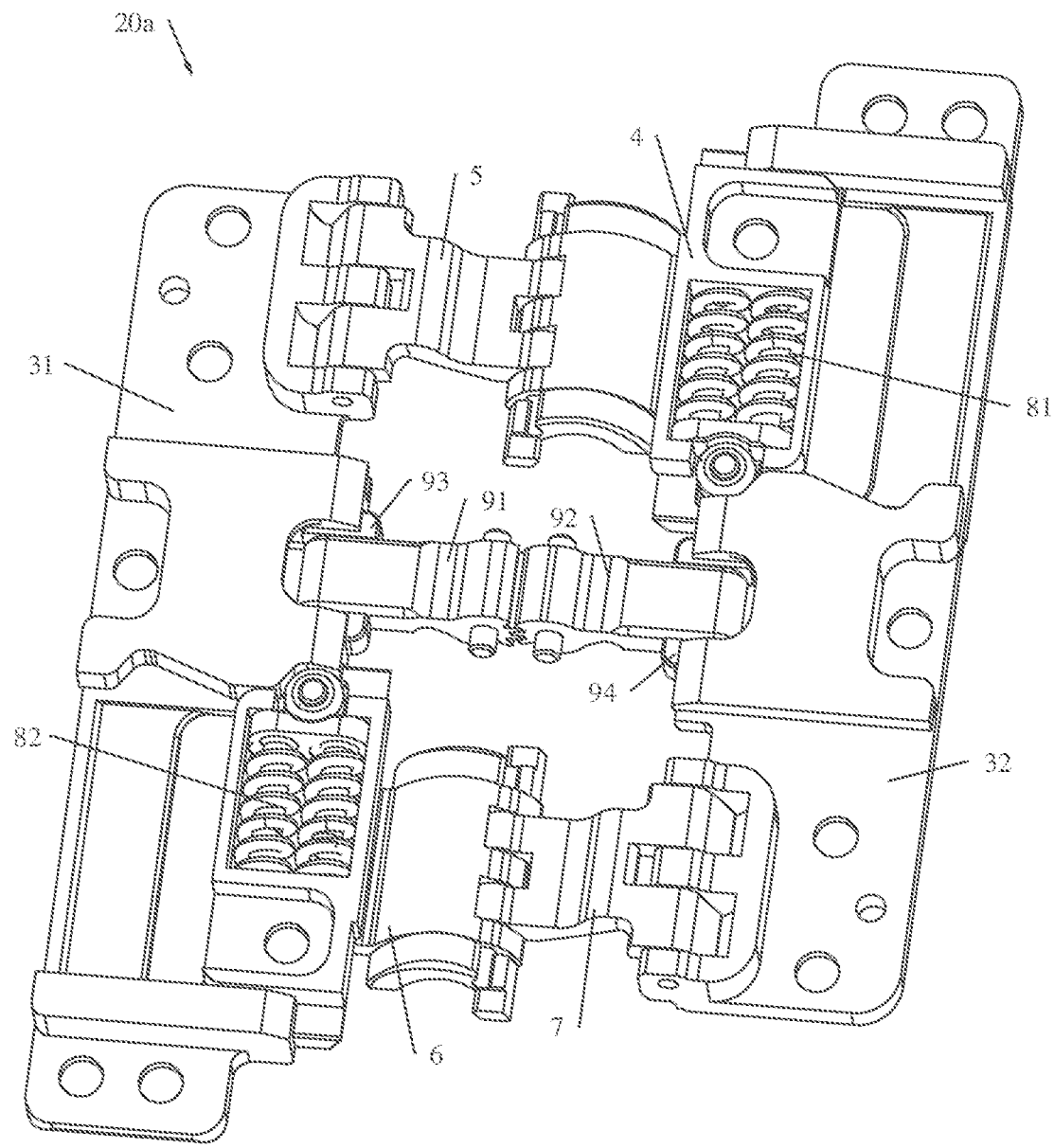
FIG. 18 is a schematic diagram of a structure of an end connecting assembly shown in FIG. 10 from another angle.
Figure 19:
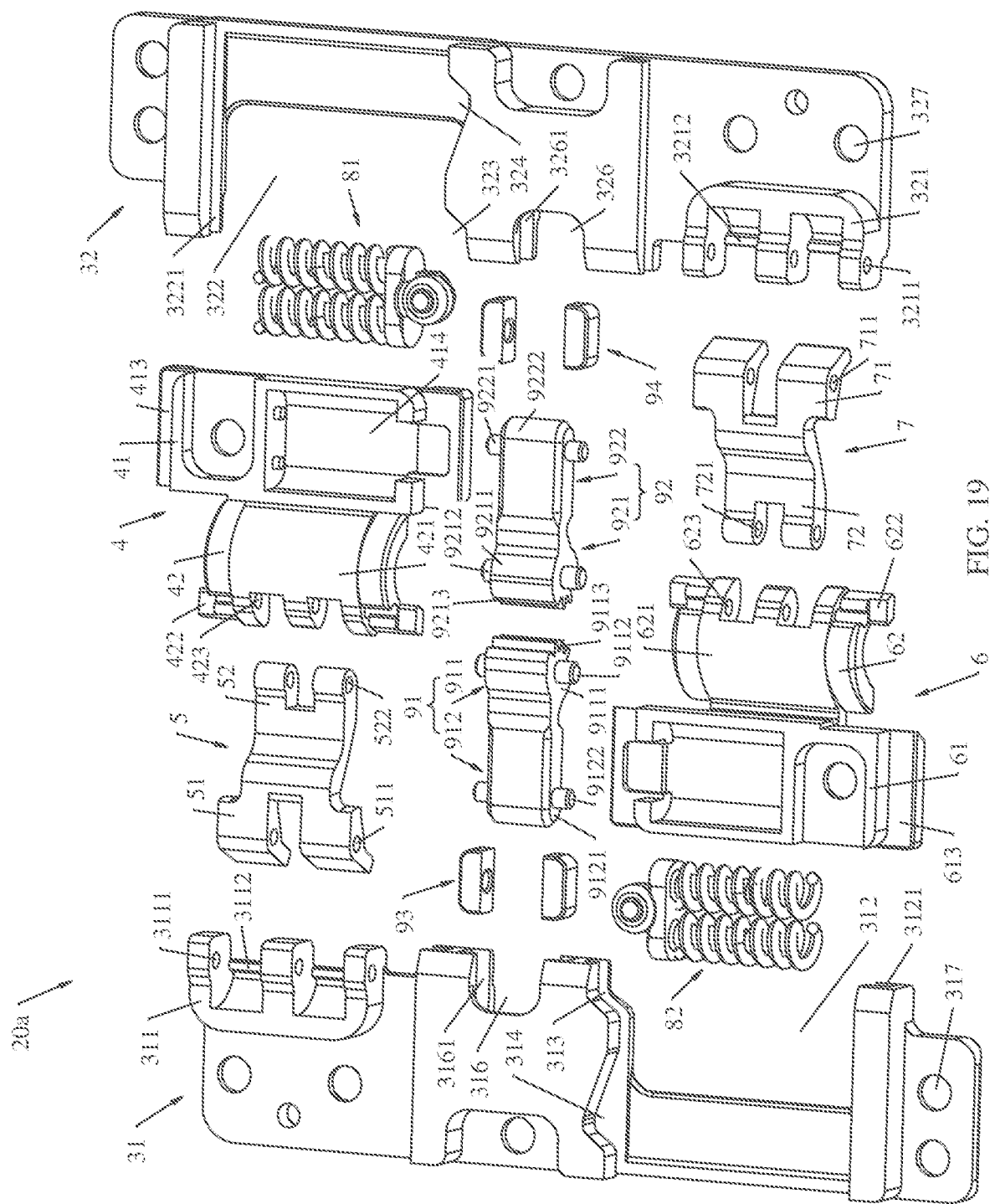
FIG. 19 is a schematic diagram of a partially-exploded structure of the end connecting assembly shown in FIG. 18.

FIG. 18 is a schematic diagram of a structure of the end connecting assembly 20*a* shown in FIG. 10 from another angle, and FIG. 19 is a schematic diagram of a partially-exploded structure of the end connecting assembly 20*a* shown in FIG. 18.

In some embodiments, the end connecting assembly 20*a* of the rotating mechanism 20 includes a first fixed bracket 31, a second fixed bracket 32, a first transmission arm 4, a first rotating arm 5, a second transmission arm 6, and a second rotating arm 7. For example, the first transmission arm 4 includes a sliding end 41 and a rotating end 42, the sliding end 41 of the first transmission arm 4 is slidably connected to the second fixed bracket 32, one end of the first rotating arm 5 is rotatably connected to the rotating end 42 of the first transmission arm 4, and the other end of the first rotating arm 5 is rotatably connected to the first fixed bracket 31. The second transmission arm 6 includes a sliding end 61 and a rotating end 62, the sliding end 61 of the second transmission arm 6 is slidably connected to the first fixed bracket 31, one end of the second rotating arm 7 is rotatably connected to the rotating end 62 of the second transmission arm 6, and the other end of the second rotating arm 7 is rotatably connected to the second fixed bracket 32.

In some embodiments, as shown in FIG. 18 and FIG. 19, the first fixed bracket 31 includes a first connecting block 311. The first connecting block 311 may be in a claw shape, and there is a rotation hole 3111 on the first connecting block 311. The first rotating arm 5 includes a first end 51 in a claw shape, and there is a rotation hole 511 on the first end 51 of the first rotating arm 5. The first end 51 of the first rotating arm 5 is connected to the first connecting block 311 in a staggered manner, and a rotating shaft (not shown in the figure) passes through the rotation hole 3111 of the first connecting block 311 and the rotation hole 5111 of the first end 51 of the first rotating arm 5, so that the first end 51 of the first rotating arm 5 is rotatably connected to the first connecting block 311. In this way, the first rotating arm 5 is rotatably connected to the first fixed bracket 31. The first end 51 of the first rotating arm 5 is connected to the first connecting block 311 in the staggered manner, so that mutual limiting of the first end 51 of the first rotating arm 5 and the first connecting block 311 can be implemented in the axial direction of the main shaft assembly 1, to improve connection reliability of the rotating mechanism 20. The rotating shaft in this embodiment of this application may be a pin.

For example, the first connecting block 311 includes a stop block 3112. When the first housing 10 and the second housing 30 are unfolded relative to each other to the flattened state, an end part of the first end 51 of the first rotating arm 5 abuts against the stop block 3112, so that the first rotating arm 5 stays at a predetermined location, to avoid stretching the flexible display 200 due to over-flipping of the first housing 10 and the second housing 30, to protect the flexible display 200.

It may be understood that the first connecting block 311 of the first fixed bracket 31 and the first end 51 of the first rotating arm 5 may alternatively have other structures, provided that a rotatable connection relationship between the first connecting block 311 of the first fixed bracket 31 and the first end 51 of the first rotating arm 5 can be satisfied. This is not strictly limited in this embodiment of this application.

In some embodiments, as shown in FIG. 18 and FIG. 19, the first rotating arm 5 further includes a second end 52 in a claw shape, the second end 52 of the first rotating arm 5 and the first end 51 are disposed back to back, and there is a rotation hole 522 on the second end 52 of the first rotating arm 5. An end part of the rotating end 42 of the first transmission arm 4 is in a claw shape, and there is a rotation hole 423 on the end part of the rotating end 42 of the first transmission arm 4. The second end 52 of the first rotating arm 5 is connected to the end part of the rotating end 42 of the first transmission arm 4 in a staggered manner, and a rotating shaft (not shown in the figure) passes through the rotation hole 522 of the second end 52 of the first rotating arm 5 and the rotation hole 423 of the rotating end 42 of the first transmission arm 4, so that the second end 52 of the first rotating arm 5 is rotatably connected to the rotating end 42 of the first transmission arm 4. In this way, the first rotating arm 5 is rotatably connected to the first transmission arm 4. The second end 52 of the first rotating arm 5 is connected to the end part of the rotating end 42 of the first transmission arm 4 in the staggered manner, so that mutual limiting of the second end 52 of the first rotating arm 5 and the end part of the rotating end 42 of the first transmission arm 4 can be implemented in the axial direction of the main shaft assembly 1, to improve connection reliability of the rotating mechanism 20. It may be understood that the second end 52 of the first rotating arm 5 and the rotating end 42 of the first transmission arm 4 may alternatively have other structures, provided that a rotatable connection relationship between the second end 52 of the first rotating arm 5 and the rotating end 42 of the first transmission arm 4 can be satisfied. This is not strictly limited in this embodiment of this application.

In some embodiments, as shown in FIG. 19, the rotating end 42 of the first transmission arm 4 is arc-shaped. The rotating end 42 of the first transmission arm 4 may be disposed in one of the arc-shaped grooves 131 of the main shaft assembly 1, so that the first transmission arm 4 is rotatably connected to the main shaft assembly 1. For example, the rotating end 42 of the first transmission arm 4 is disposed in the arc-shaped groove 131 (refer to FIG. 13) of the movement space of the main shaft assembly 1. In this case, a rotation center around which the first transmission arm 4 rotates relative to the main shaft assembly 1 is close to the main inner shaft 15 and away from the main outer shaft 14.

In this embodiment, the first transmission arm 4 is connected to the main shaft assembly 1 by using a virtual shaft. The rotatable connection has a simple structure and occupies a small space. This helps reduce a thickness of the rotating mechanism 20, so that the folding apparatus 100 and the electronic device 1000 are more light and thin. In some other embodiments, the first transmission arm 4 may alternatively be connected to the main shaft assembly 1 by using a physical shaft. This is not strictly limited in this embodiment of this application.

In some embodiments, as shown in FIG. 19, the rotating end 42 of the first transmission arm 4 may further include a limiting projection 422, and the limiting projection 422 is formed at the end part of the rotating end 42. The limiting projection 422 is configured to cooperate with the projection 144 (refer to FIG. 13) of the main shaft assembly having a limiting function, to prevent the first transmission arm 4 from being accidentally detached from the main shaft assembly 1. The rotating end 42 of the first transmission arm 4 may further include a limiting bulge 421, and the limiting bulge 421 is formed on an inner side and/or an outer side of the rotating end 42. The limiting bulge 421 is configured to cooperate with the limiting groove 1531 and/or the limiting groove 1431 (refer to FIG. 13) of the main shaft assembly 1, so that mutual limiting of the first transmission arm 4 and the main shaft assembly 1 is implemented in the axial direction of the main shaft assembly 1.

In some embodiments, as shown in FIG. 18 and FIG. 19, there is a first sliding slot 322 on the second fixed bracket 32. There may be a recessed guiding space 3221 on a side wall of the first sliding slot 322. The sliding end 41 of the first transmission arm 4 is disposed in the first sliding slot 322, so that the sliding end 41 of the first transmission arm 4 is slidably connected to the second fixed bracket 32. The sliding end 41 of the first transmission arm 4 includes a first flange 413 on a circumferential side. The first flange 413 is disposed in the guiding space 3221 of the first sliding slot 322. In this embodiment, the guiding space 3221 of the first sliding slot 322 cooperates with the first flange 413 of the first transmission arm 4, so that the sliding end 41 of the first transmission arm 4 can be guided in a sliding direction of the first sliding slot 322. In this way, a relative sliding action between the first transmission arm 4 and the second fixed bracket 32 is easier to implement and control precision is higher.

In some embodiments, as shown in FIG. 18 and FIG. 19, the rotating mechanism 20 may further include a first limiting component 81. The first limiting component 81 is disposed at the sliding end 41 of the first transmission arm 4, and the first limiting component 81 is clamped to the second fixed bracket 32. In this embodiment, the first limiting component 81 is configured to limit a relative position relationship between the first transmission arm 4 and the second fixed bracket 32, so that the first transmission arm 4 and the second fixed bracket 32 can maintain a preset relative position relationship when no large external force is applied, the rotating mechanism 20 can stay at a preset angle, and the rotating mechanism can maintain the flattened state or the closed state. In this way, user experience of the folding apparatus 100 and the electronic device 1000 is improved.

For example, the second fixed bracket 32 further includes a first recessed area 323 and a second recessed area 324, and both the first recessed area 323 and the second recessed area 324 communicate with the first sliding slot 322. The first recessed area 323 is located on a side that is of the second recessed area 324 and that is close to the first fixed bracket 31. Refer to FIG. 8. The first recessed area 323 is located between the main shaft assembly 1 and the second recessed area 324. When the first housing 10 and the second housing 30 are unfolded relative to each other to the flattened state, the first limiting component 81 is partially clamped into the first recessed area 323. When the first housing 10 and the second housing 30 are folded relative to each other to the closed state, the first limiting component 81 is partially clamped into the second recessed area 324.

Figure 20:
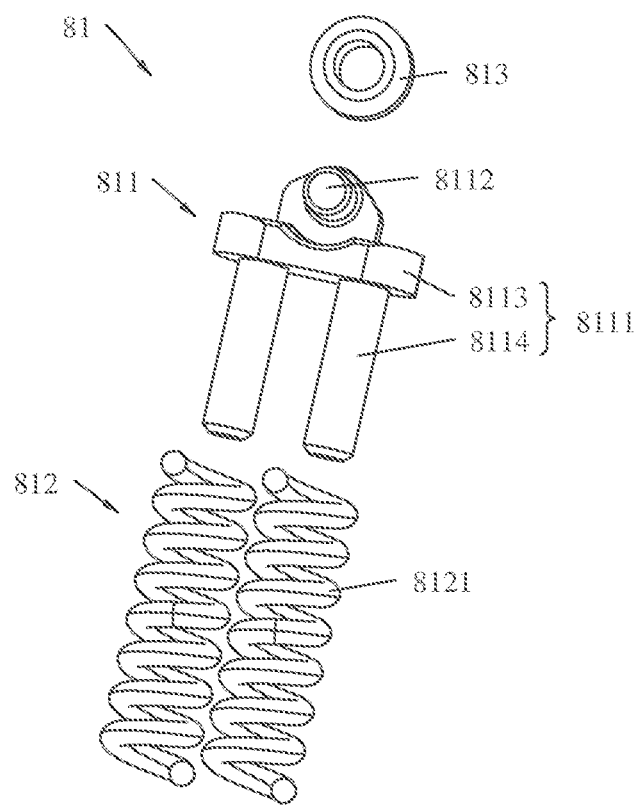
FIG. 20 is a schematic diagram of an exploded structure of a first limiting component shown in FIG. 19.

Refer to FIG. 18 to FIG. 20. FIG. 20 is a schematic diagram of an exploded structure of the first limiting component 81 shown in FIG. 19.

In some embodiments, the first limiting component 81 includes a first bracket 811 and a first elastic part 812. The first bracket 811 is a rigid structure and is not easy to deform under an external force. The first bracket 811 includes a control part 8111 and an abutting part 8112. The abutting part 8112 is configured to abut against an external mechanical part to limit the mechanical part. The control part 8111 is configured to control a location of the abutting part 8112. For example, the control part 8111 includes a substrate 8113 and a plurality of guide columns 8114, and the plurality of guide columns 8114 are fastened on one side of the substrate 8113 and spaced from each other. The abutting part 8112 is fastened on the other side of the substrate 8113. The first elastic part 812 is an elastic structure and is easy to deform under an external force. One end of the first elastic part 812 is disposed on the control part 8111 of the first bracket 811. For example, the first elastic part 812 may include a plurality of springs 8121, and the plurality of springs 8121 are sleeved on the plurality of guide columns 8114 in a one-to-one correspondence.

One end of the first elastic part 812 is disposed on the control part 8111 of the first bracket 811. There is a first accommodating slot 414 at the sliding end 41 of the first transmission arm 4, and the first limiting component 81 is disposed in the first accommodating slot 414. The other end (that is, one end away from the control part 8111) of the first elastic part 812 abuts against a slot wall of the first accommodating slot 414, and the first elastic part 812 is in a compressed state. The abutting part 8112 of the first bracket 811 partially extends out of the first accommodating slot 414 and is clamped to the second fixed bracket 32. Because the first elastic part 812 of the first limiting component 81 can deform under an external force, the first limiting component 81 can smoothly move between the first recessed area 323 and the second recessed area 324 relative to the second fixed bracket 32, to improve reliability of limiting between the first transmission arm 4 and the second fixed bracket 32.

As shown in FIG. 20, in some embodiments, the first limiting component 81 may further include a first cushioning part 813, and the first cushioning part 813 is disposed on the abutting part 8112 of the first bracket 811. The first cushioning part 813 may be made of a material (for example, rubber) with low rigidity, so that when subject to an external force, the first cushioning part 813 can absorb an impact force through deformation, to implement cushioning. In the first limiting component 81, the first cushioning part 813 is disposed to cushion stress between the abutting part 8112 and a mechanical part (that is, the second fixed bracket 32), to improve reliability of a limiting structure.

In some embodiments, as shown in FIG. 18 and FIG. 19, the second fixed bracket 32 includes a second connecting block 321. The second connecting block 321 may be in a claw shape, and there is a rotation hole 3211 on the second connecting block 321. The second rotating arm 7 includes a first end 71 in a claw shape, and there is a rotation hole 711 on the first end 71 of the second rotating arm 7. The first end 71 of the second rotating arm 7 is connected to the second connecting block 321 in a staggered manner, and a rotating shaft (not shown in the figure) passes through the rotation hole 3211 of the second connecting block 321 and the rotation hole 711 of the first end 71 of the second rotating arm 7, so that the first end 71 of the second rotating arm 7 is rotatably connected to the second connecting block 321. In this way, the second rotating arm 7 is rotatably connected to the second fixed bracket 32. The first end 71 of the second rotating arm 7 is connected to the second connecting block 321 in the staggered manner, so that mutual limiting of the first end 71 of the second rotating arm 7 and the second connecting block 321 can be implemented in the axial direction of the main shaft assembly 1, to improve connection reliability of the rotating mechanism 20.

For example, the second connecting block 321 includes a stop block 3212. When the first housing 10 and the second housing 30 are unfolded relative to each other to the flattened state, an end part of the first end 71 of the second rotating arm 7 abuts against the stop block 3212, so that the second rotating arm 7 stays at a predetermined location, to avoid stretching the flexible display 200 due to over-flipping of the first housing 10 and the second housing 30, to protect the flexible display 200.

It may be understood that the second connecting block 321 of the second fixed bracket 32 and the first end 71 of the second rotating arm 7 may alternatively have other structures, provided that a rotatable connection relationship between the second connecting block 321 of the second fixed bracket 32 and the first end 71 of the second rotating arm 7 can be satisfied. This is not strictly limited in this embodiment of this application.

In some embodiments, as shown in FIG. 18 and FIG. 19, the second rotating arm 7 further includes a second end 72 in a claw shape, the second end 72 of the second rotating arm 7 and the first end 51 are disposed back to back, and there is a rotation hole 721 on the second end 72 of the second rotating arm 7. An end part of the rotating end 62 of the second transmission arm 6 is in a claw shape, and there is a rotation hole 623 on the end part of the rotating end 62 of the second transmission arm 6. The second end 72 of the second rotating arm 7 is connected to the end part of the rotating end 62 of the second transmission arm 6 in a staggered manner, and a rotating shaft (not shown in the figure) passes through the rotation hole 721 of the second end 72 of the second rotating arm 7 and the rotation hole 623 of the rotating end 62 of the second transmission arm 6, so that the second end 72 of the second rotating arm 7 is rotatably connected to the rotating end 62 of the second transmission arm 6. In this way, the second rotating arm 7 is rotatably connected to the second transmission arm 6. The second end 72 of the second rotating arm 7 is connected to the end part of the rotating end 62 of the second transmission arm 6 in the staggered manner, so that mutual limiting of the second end 72 of the second rotating arm 7 and the end part of the rotating end 62 of the second transmission arm 6 can be implemented in the axial direction of the main shaft assembly 1, to improve connection reliability of the rotating mechanism 20. It may be understood that the second end 72 of the second rotating arm 7 and the rotating end 62 of the second transmission arm 6 may alternatively have other structures, provided that a rotatable connection relationship between the second end 72 of the second rotating arm 7 and the rotating end 62 of the second transmission arm 6 can be satisfied. This is not strictly limited in this embodiment of this application.

In some embodiments, as shown in FIG. 19, the rotating end 62 of the second transmission arm 6 is arc-shaped. The rotating end 62 of the second transmission arm 6 may be disposed in one of the arc-shaped grooves 131 of the main shaft assembly 1, so that the second transmission arm 6 is rotatably connected to the main shaft assembly 1. For example, the rotating end 62 of the second transmission arm 6 is disposed in the arc-shaped groove 131 (refer to FIG. 15) of the movement space of the main shaft assembly 1. In this case, a rotation center around which the second transmission arm 6 rotates relative to the main shaft assembly 1 is close to the main inner shaft 15 and away from the main outer shaft 14.

In this embodiment, the second transmission arm 6 is connected to the main shaft assembly 1 by using a virtual shaft. The rotatable connection has a simple structure and occupies a small space. This helps reduce a thickness of the rotating mechanism 20, so that the folding apparatus 100 and the electronic device 1000 are more light and thin. In some other embodiments, the second transmission arm 6 may alternatively be connected to the main shaft assembly 1 by using a physical shaft. This is not strictly limited in this embodiment of this application.

In some embodiments, as shown in FIG. 19, the rotating end 62 of the second transmission arm 6 may further include a limiting projection 622, and the limiting projection 622 is formed at the end part of the rotating end 62. The limiting projection 622 is configured to cooperate with the projection 144 (refer to FIG. 15) of the main shaft assembly 1 that has a limiting function, to prevent the second transmission arm 6 from being accidentally detached from the main shaft assembly 1. The rotating end 62 of the second transmission arm 6 may further include a limiting bulge 621, and the limiting bulge 621 is formed on an inner side and/or an outer side of the rotating end 62. The limiting bulge 421 is configured to cooperate with the limiting groove 1431 and/or the limiting groove 1531 (refer to FIG. 15) of the main shaft assembly 1, so that mutual limiting of the second transmission arm 6 and the main shaft assembly 1 is implemented in the axial direction of the main shaft assembly 1.

In some embodiments, as shown in FIG. 18 and FIG. 19, there is a second sliding slot 312 on the first fixed bracket 31. There may be a recessed guiding space 3121 on a side wall of the second sliding slot 312. The sliding end 61 of the second transmission arm 6 is disposed in the second sliding slot 312, so that the sliding end 61 of the second transmission arm 6 is slidably connected to the first fixed bracket 31. The sliding end 61 of the second transmission arm 6 includes a second flange 613 on a circumferential side. The second flange 613 is disposed in the guiding space 3121 of the second sliding slot 312. In this embodiment, the guiding space 3121 of the second sliding slot 312 cooperates with the second flange 613 of the second transmission arm 6, so that the sliding end 61 of the second transmission arm 6 can be guided in a sliding direction of the second sliding slot 312. In this way, a relative sliding action between the second transmission arm 6 and the first fixed bracket 31 is easier to implement and control precision is higher.

In some embodiments, as shown in FIG. 18 and FIG. 19, the rotating mechanism 20 may further include a second limiting component 82. The second limiting component 82 is disposed at the sliding end 61 of the second transmission arm 6, and the second limiting component 82 is clamped to the first fixed bracket 31. In this embodiment, the second limiting component 82 is configured to limit a relative position relationship between the second transmission arm 6 and the first fixed bracket 31, so that the second transmission arm 6 and the first fixed bracket 31 can maintain a preset relative position relationship when no large external force is applied, the rotating mechanism 20 can stay at a preset angle, and the rotating mechanism can maintain the flattened state or the closed state. In this way, user experience of the folding apparatus 100 and the electronic device 1000 is improved.

For example, the first fixed bracket 31 further includes a third recessed area 313 and a fourth recessed area 314, and both the third recessed area 313 and the fourth recessed area 314 communicate with the second sliding slot 312. The third recessed area 313 is located on a side that is of the fourth recessed area 314 and that is close to the second fixed bracket 32. Refer to FIG. 8. The third recessed area 313 is located between the main shaft assembly 1 and the fourth recessed area 314. When the first housing 10 and the second housing 30 are unfolded relative to each other to the flattened state, the second limiting component 82 is partially clamped into the third recessed area 313. When the first housing 10 and the second housing 30 are folded relative to each other to the closed state, the second limiting component 82 is partially clamped into the fourth recessed area 314.

For example, a structure of the second limiting component 82 is the same as a structure of the first limiting component 81, to reduce material types of the rotating mechanism 20, and reduce design difficulty and costs of the rotating mechanism 20. A specific structure of the second limiting component 82 is not described in this embodiment of this application. In some other embodiments, a structure of the second limiting component 82 may alternatively be different from a structure of the first limiting component 81.

In some embodiments, as shown in FIG. 18 and FIG. 19, the rotating mechanism 20 may further include a first synchronous swing arm 91 and a second synchronous swing arm 92. The first synchronous swing arm 91 includes a rotating end 911 and a movable end 912. The rotating end 911 of the first synchronous swing arm 91 is rotatably connected to the main shaft assembly 1, and the movable end 912 of the first synchronous swing arm 91 is movably connected to the first fixed bracket 31. When the first housing 10 and the second housing 30 are folded or unfolded relative to each other, the movable end 912 of the first synchronous swing arm 91 slides and rotates relative to the first fixed bracket 31.

For example, the rotating end 911 of the first synchronous swing arm 91 includes a first rotating body 9111, a first rotating shaft 9112, and a first gear 9113. The first rotating body 9111 includes a front facet and a back facet that are disposed back to back, and a circumferential side facet connected between the front facet and the back facet. The first gear 9113 is fastened to the circumferential side facet of the first rotating body 9111. The first rotating shaft 9112 is fastened to the front facet and/or the back facet of the first rotating body 9111. In some embodiments, the first rotating shaft 9112 consists of two parts, and the two parts are respectively fastened to the front facet and the back facet of the first rotating body 9111, so that the first synchronous swing arm 91 has improved balance and stability when being rotatably connected to another structure by using the first rotating shaft 9112. In some other embodiments, the first rotating shaft 9112 consists of one part, and the first rotating shaft 9112 is fastened to the front facet or the back facet of the first rotating body 9111, to lower a requirement for accommodating space of the first synchronous swing arm 91. The first rotating shaft 9112 is configured to be rotatably connected to the main shaft assembly 1. The first synchronous swing arm 91 may be disposed in the movement space (as shown in FIG. 14) of the main shaft assembly 1, and the first rotating shaft 9112 is disposed in one of the recessed grooves 133 of the M-shaped groove 132. In this embodiment, the rotating end 911 of the first synchronous swing arm 91 is rotatably connected to the main shaft assembly 1 by using a physical shaft. In some other embodiments, the rotating end 911 of the first synchronous swing arm 91 may alternatively be rotatably connected to the main shaft assembly 1 by using a virtual shaft. This is not strictly limited in this embodiment of this application.

For example, the movable end 912 of the first synchronous swing arm 91 includes a third rotating body 9121 and a third rotating shaft 9122, and the third rotating shaft 9122 is fastened to a front facet and/or a back facet of the third rotating body 9121. There is further a third sliding slot 316 on the first fixed bracket 31, and there is a recessed guiding space 3161 on a slot wall of the third sliding slot 316. A guiding direction of the guiding space 3161 of the third sliding slot 316 is the same as a guiding direction of the guiding space 3121 of the second sliding slot 312. The movable end 912 of the first synchronous swing arm 91 may be disposed in the third sliding slot 316 of the first fixed bracket 31, and the third rotating shaft 9122 may be disposed in the guiding space 3161 of the third sliding slot 316. The movable end 912 of the first synchronous swing arm 91 can slide and rotate relative to the first fixed bracket 31.

In this embodiment, the guiding space 3161 of the third sliding slot 316 cooperates with the first rotating shaft 9112 of the first synchronous swing arm 91, so that the movable end 912 of the first synchronous swing arm 91 can be guided in a sliding direction of the third sliding slot 316. In this way, a relative movement action between the first synchronous swing arm 91 and the first fixed bracket 31 is easier to implement and control precision is higher.

In some embodiments, as shown in FIG. 18 and FIG. 19, the second synchronous swing arm 92 includes a rotating end 921 and a movable end 922, the rotating end 921 of the second synchronous swing arm 92 is rotatably connected to the main shaft assembly 1, the rotating end 921 of the second synchronous swing arm 92 is engaged with the rotating end 911 of the first synchronous swing arm 91, and the movable end 922 of the second synchronous swing arm 92 is movably connected to the second fixed bracket 32. When the first housing 10 and the second housing 30 are folded or unfolded relative to each other, the movable end 922 of the second synchronous swing arm 92 slides and rotates relative to the second fixed bracket 32.

In this embodiment, the rotating end 911 of the first synchronous swing arm 91 and the rotating end 921 of the second synchronous swing arm 92 are engaged with each other, and both the rotating end 911 of the first synchronous swing arm 91 and the rotating end 921 of the second synchronous swing arm 92 are rotatably connected to the main shaft assembly 1, the movable end 912 of the first synchronous swing arm 91 is movably connected to the first fixed bracket 31, and the movable end 922 of the second synchronous swing arm 92 is movably connected to the second fixed bracket 32. Therefore, when the first fixed bracket 31 and the second fixed bracket 32 are unfolded or folded relative to each other, the first synchronous swing arm 91 and the second synchronous swing arm 92 can control rotation angles of the first fixed bracket 31 and the second fixed bracket 32 to be consistent relative to the main shaft assembly 1, so that rotation actions of the first fixed bracket 31 and the second fixed bracket 32 are synchronous and consistent. Symmetry of folding actions and unfolding actions of the rotating mechanism 20 is high. This helps improve user experience.

The first synchronous swing arm 91 is rotatably connected to the main shaft assembly 1, and slidably and rotatably connected to the first fixed bracket 31, so that a link-slider structure is formed. The second synchronous swing arm 92 is rotatably connected to the main shaft assembly 1, and slidably and rotatably connected to the second fixed bracket 32, so that a link-slider structure is formed. The two link-slider structures that are engaged with each other can effectively control rotation actions of the first housing 10 and the second housing 30 to be synchronous and consistent.

In some embodiments, as shown in FIG. 18 and FIG. 19, the rotating end 921 of the second synchronous swing arm 92 includes a second rotating body 9211, a second rotating shaft 9212, and a second gear 9213. The second rotating shaft 9212 is fastened to a front facet and/or a back facet of the second rotating body 9211, and the second gear 9213 is fastened to a circumferential side facet of the second rotating body 9211. The rotating end 921 of the second synchronous swing arm 92 may be disposed in the movement space (as shown in FIG. 14) of the main shaft assembly 1, and the second rotating shaft 9212 is disposed in the other recessed groove 133 of the M-shaped groove 132. The second rotating shaft 9212 is rotatably connected to the main shaft assembly 1, and the second gear 9213 is engaged with the first gear 9113.

In this embodiment, the rotating end 911 of the first synchronous swing arm 91 and the rotating end 921 of the second synchronous swing arm 92 are directly engaged with each other by using the first gear 9113 and the second gear 9213, so that a synchronization assembly jointly formed by the first synchronous swing arm 91 and the second synchronous swing arm 92 has a simple structure, a movement process is easy to control, and accuracy is high.

For example, the movable end 922 of the second synchronous swing arm 92 includes a fourth rotating body 9222 and a fourth rotating shaft 9221, and the fourth rotating shaft 9221 is fastened to a front facet and/or a back facet of the fourth rotating body 9222. There is further a fourth sliding slot 326 on the second fixed bracket 32, and there is a recessed guiding space 3261 on a slot wall of the fourth sliding slot 326. A guiding direction of the guiding space 3261 of the fourth sliding slot 326 is the same as a guiding direction of the guiding space 3221 of the first sliding slot 322. The second synchronous swing arm 92 is disposed in the fourth sliding slot 326, and the fourth rotating shaft 9221 is disposed in the guiding space 3261 of the fourth sliding slot 326. The guiding space 3261 of the fourth sliding slot 326 cooperates with the fourth rotating shaft 9221 of the second synchronous swing arm 92, so that the movable end 922 of the second synchronous swing arm 92 can be guided in a sliding direction of the fourth sliding slot 326. In this way, a relative movement action between the second synchronous swing arm 92 and the second fixed bracket 32 is easier to implement and control precision is higher.

For example, a structure of the second synchronous swing arm 92 may be approximately the same as a structure of the first synchronous swing arm 91, to reduce material types of the rotating mechanism 20, and reduce design difficulty and costs of the rotating mechanism 20. A structure difference between the second synchronous swing arm 92 and the first synchronous swing arm 91 lies in that the first gear 9113 and the second gear 9213 are arranged at different angles, to facilitate engagement of the first gear 9113 and the second gear 9213.

In some embodiments, as shown in FIG. 18 and FIG. 19, the rotating mechanism 20 may further include a first connector 93 and a second connector 94. The first connector 93 is slidably disposed on the first fixed bracket 31. The movable end 912 of the first synchronous swing arm 91 is rotatably connected to the first connector 93. The second connector 94 is slidably disposed on the second fixed bracket 32. The movable end 922 of the second synchronous swing arm 92 is rotatably connected to the second connector 94. A structure of the second connector 94 may be the same as a structure of the first connector 93, to reduce material types of the rotating mechanism 20, and reduce design difficulty and costs of the rotating mechanism 20.

It may be understood that, as shown in FIG. 19, in this embodiment, the first fixed bracket 31 is an integrally-formed mechanical part, including the first connecting block 311, the second sliding slot 312, and the third sliding slot 316. In some embodiments, the first fixed bracket 31 may include a plurality of mechanical parts, and the first connecting block 311, the second sliding slot 312, and the third sliding slot 316 are formed on different mechanical parts. This is not strictly limited in this application. As shown in FIG. 19, in this embodiment, the second fixed bracket 32 is an integrally-formed mechanical part, and includes the second connecting block 321, the first sliding slot 322, and the fourth sliding slot 326. In some embodiments, the second fixed bracket 32 may include a plurality of mechanical parts, and the second connecting block 321, the first sliding slot 322, and the fourth sliding slot 326 are formed on different mechanical parts. This is not strictly limited in this application.

As shown in FIG. 19, in some embodiments, there are a plurality of fastening holes 317 on the first fixed bracket 31, and in the rotating mechanism 20, the first fixed bracket 31 may be fastened to the first housing 10 by using a plurality of fasteners. There are a plurality of fastening holes 327 on the second fixed bracket 32, and in the rotating mechanism 20, the second fixed bracket 32 may be fastened to the second housing 30 by using a plurality of fasteners.

Figure 21:
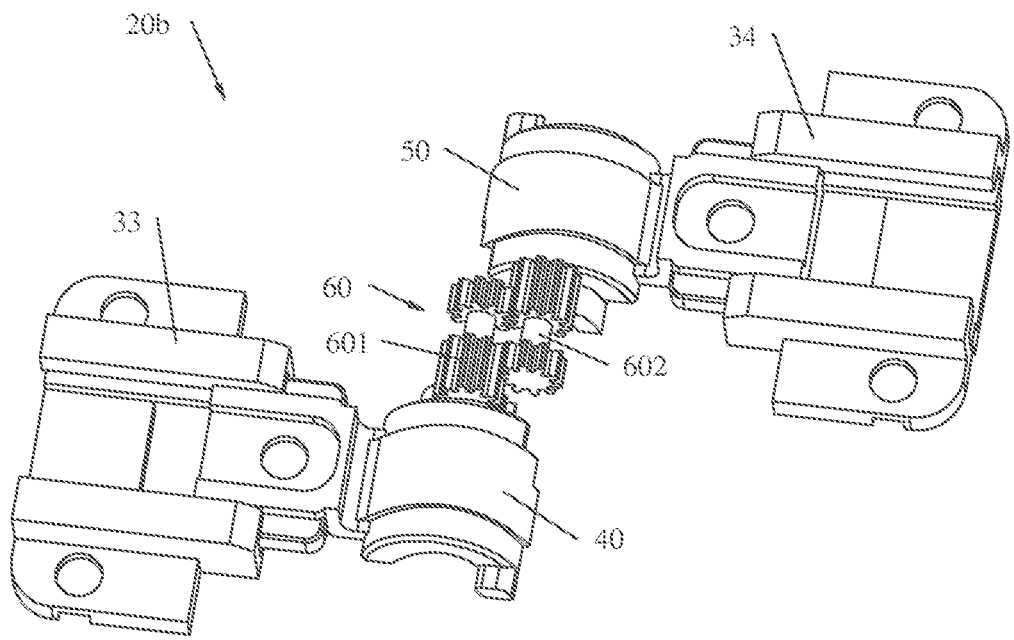
FIG. 21 is a schematic diagram of a structure of a middle connecting assembly shown in FIG. 10 from another angle.
Figure 22:
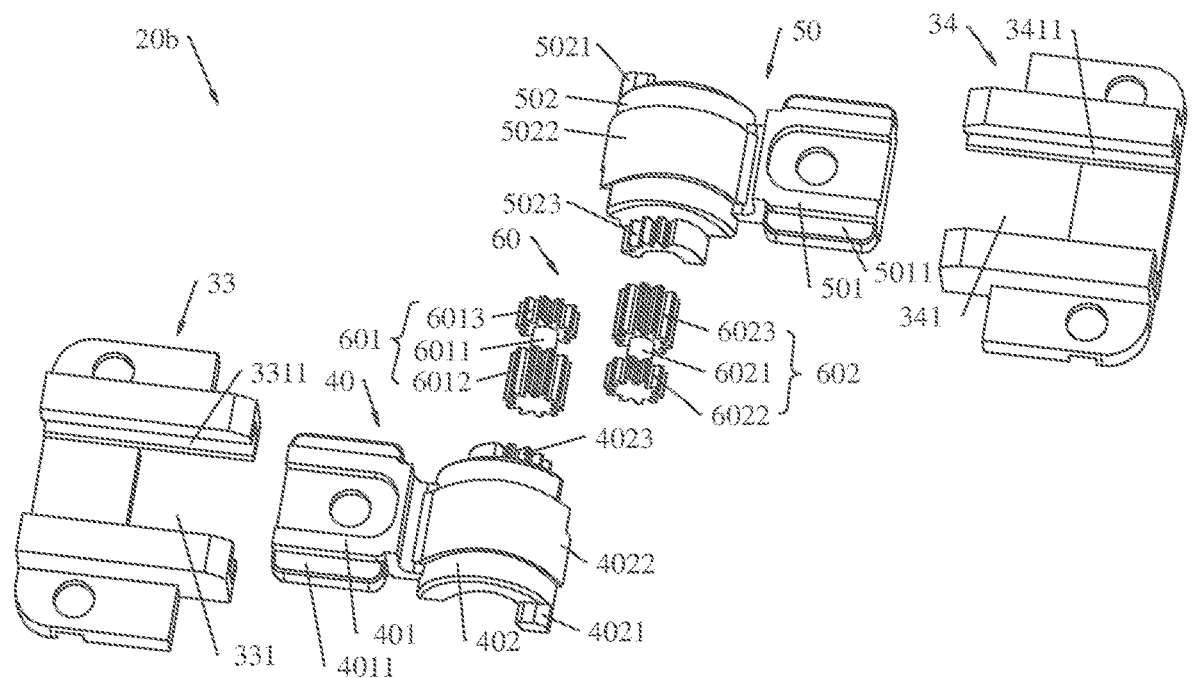
FIG. 22 is a schematic diagram of an exploded structure of the middle connecting assembly shown in FIG. 21.

FIG. 21 is a schematic diagram of a structure of the middle connecting assembly 20b shown in FIG. 10 from another angle, and FIG. 22 is a schematic diagram of an exploded structure of the middle connecting assembly 20b shown in FIG. 21.

In some embodiments, the rotating mechanism 20 further includes a third fixed bracket 33, a fourth fixed bracket 34, a third transmission arm 40, a fourth transmission arm 50, and a gear drive assembly 60. The third fixed bracket 33 is fastened to the first housing 10, and the fourth fixed bracket 34 is fastened to the second housing 30. The third transmission arm 40 includes a sliding end 401 and a rotating end 402. The sliding end 401 of the third transmission arm 40 is slidably connected to the first fixed bracket 31, and the rotating end 402 of the third transmission arm 40 is rotatably connected to the main shaft assembly 1. The fourth transmission arm 50 includes a sliding end 501 and a rotating end 502. The sliding end 501 of the fourth transmission arm 50 is slidably connected to the second fixed bracket 32, and the rotating end 502 of the fourth transmission arm 50 is rotatably connected to the main shaft assembly 1. The rotating end 502 of the fourth transmission arm 50 is engaged with the rotating end 402 of the third transmission arm 40 through the gear drive assembly 60.

In this embodiment, the middle connecting assembly 20b is disposed in the rotating mechanism 20 to increase interaction forces between the rotating mechanism 20 and the first housing 10 and between the rotating mechanism 20 and the second housing 30, so that the folding apparatus 100 is easier to fold and unfold. In addition, the gear drive assembly 60 is disposed, so that actions of the third transmission arm 40 and the fourth transmission arm 50 are associated with each other, and the third transmission arm 40 and the fourth transmission arm 50 form an interlocked structure, so that a degree of freedom of the mechanism is limited and structural strength and reliability of the middle connecting assembly 20b are increased.

In some embodiments, there is a fifth sliding slot 331 on the third fixed bracket 33, and a middle part of a slot wall of the fifth sliding slot 331 is recessed to form a guiding space 3311 of the fifth sliding slot 331. The sliding end 401 of the third transmission arm 40 has a third flange 4011. The sliding end 401 of the third transmission arm 40 is disposed in the fifth sliding slot 331, and the third flange 4011 is disposed in the guiding space 3311 of the fifth sliding slot 331. The rotating end 402 of the third transmission arm 40 is arc-shaped, and is disposed in one of the arc-shaped grooves 131 of the main shaft assembly 1. For example, the rotating end 402 of the third transmission arm 40 may be disposed in the movement space (refer to FIG. 17) of the main shaft assembly 1, and the third transmission arm 40 is rotatably connected to the main shaft assembly 1 by using a virtual shaft.

For example, the rotating end 402 of the third transmission arm 40 may further include a limiting projection 4021, and the limiting projection 4021 is formed at an end part of the rotating end 402. The limiting projection 4021 is configured to cooperate with the projection 144 (refer to FIG. 17) of the main shaft assembly 1 that has a limiting function, to prevent the third transmission arm 40 from being accidentally detached from the main shaft assembly 1. The rotating end 402 of the third transmission arm 40 may further include a limiting bulge 4022, and the limiting bulge 4022 is formed on an inner side and/or an outer side of the rotating end 402. The limiting bulge 4022 is configured to cooperate with the limiting groove 1431 and/or the limiting groove 1531 (refer to FIG. 17) of the main shaft assembly 1, so that mutual limiting of the third transmission arm 40 and the main shaft assembly 1 is implemented in the axial direction of the main shaft assembly 1.

In some embodiments, there is a sixth sliding slot 341 on the fourth fixed bracket 34, and a middle part of a slot wall of the sixth sliding slot 341 is recessed to form a guiding space 3411 of the sixth sliding slot 341. The sliding end 501 of the fourth transmission arm 50 has a fourth flange 5011. The sliding end 501 of the fourth transmission arm 50 is disposed in the sixth sliding slot 341, and the fourth flange 5011 is disposed in the guiding space 3411 of the sixth sliding slot 341. The rotating end 502 of the fourth transmission arm 50 is arc-shaped, and is disposed in one of the arc-shaped grooves 131 of the main shaft assembly 1. For example, the rotating end 502 of the fourth transmission arm 50 may be disposed in the movement space (refer to FIG. 16) of the main shaft assembly 1, and the fourth transmission arm 50 is rotatably connected to the main shaft assembly 1 by using a virtual shaft.

For example, the rotating end 502 of the fourth transmission arm 50 may further include a limiting projection 5021, and the limiting projection 5021 is formed at an end part of the rotating end 502. The limiting projection 5021 is configured to cooperate with the projection 144 (refer to FIG. 16) of the main shaft assembly having a limiting function, to prevent the fourth transmission arm 50 from being accidentally detached from the main shaft assembly 1. The rotating end 502 of the fourth transmission arm 50 may further include a limiting bulge 5022, and the limiting bulge 5022 is formed on an inner side and/or an outer side of the rotating end 502. The limiting bulge 5022 is configured to cooperate with the limiting groove 1431 and/or the limiting groove 1531 (refer to FIG. 16) of the main shaft assembly 1, so that mutual limiting of the fourth transmission arm 50 and the main shaft assembly 1 is implemented in the axial direction of the main shaft assembly 1. For example, a structure of the fourth fixed bracket 34 is the same as a structure of the third fixed bracket 33, and a structure of the fourth transmission arm 50 is the same as a structure of the third transmission arm 40.

In some embodiments, as shown in FIG. 10, the first transmission arm 4 rotates around a first rotation center 4C, that is, the first transmission arm 4 and the main shaft assembly 1 rotate around the first rotation center 4C. The second transmission arm 6 rotates around a second rotation center 6C, that is, the second transmission arm 6 and the main shaft assembly 1 rotate around the second rotation center 6C. The third transmission arm 40 rotates around a third rotation center 40C, that is, the third transmission arm 40 and the main shaft assembly 1 rotate around the third rotation center 40C. The fourth transmission arm 50 rotates around a fourth rotation center 50C, that is, the fourth transmission arm 50 and the main shaft assembly 1 rotate around the fourth rotation center 50C. The third rotation center 40C and the second rotation center 6C are collinear, and the fourth rotation center 50C and the first rotation center 4C are collinear. That is, the rotation center 40C around which the third transmission arm 40 rotates relative to the main shaft assembly 1 and the rotation center 6C around which the second transmission arm 6 rotates relative to the main shaft assembly 1 are collinear. The rotation center 50C around which the fourth transmission arm 50 rotates relative to the main shaft assembly 1 and the rotation center 4C around which the first transmission arm 4 rotates relative to the main shaft assembly 1 are collinear.

In this embodiment, the rotation centers around which the third transmission arm 40 and the second transmission arm 6 rotate relative to the main shaft assembly 1 are collinear, and the third transmission arm 40 is slidably connected to the third fixed bracket 33, and the rotation centers around which the fourth transmission arm 50 and the first transmission arm 4 rotate relative to the main shaft assembly 1 are collinear, and the fourth transmission arm 50 is slidably connected to the fourth fixed bracket 34. In this way, movement of the third transmission arm 40 can be synchronized with movement of the second transmission arm 6, and movement of the fourth transmission arm 50 can be synchronized with movement of the first transmission arm 4, so that a structure design and a connection relationship of the rotating mechanism 20 can be simplified, and reliability of the rotating structure is improved.

In some embodiments, as shown in FIG. 21 and FIG. 22, the rotating end 402 of the third transmission arm 40 includes a third gear 4023, and the rotating end 502 of the fourth transmission arm 50 includes a fourth gear 5023. The gear drive assembly 60 includes a first gear shaft 601 and a second gear shaft 602. The first gear shaft 601 includes a middle rotating shaft 6011 and two end gears (6012 and 6013) that are respectively fastened on two sides of the middle rotating shaft 6011. The second gear shaft 602 includes a middle rotating shaft 6021 and two end gears (6022 and 6023) that are respectively fastened on two sides of the middle rotating shaft 6021. One end gear 6012 of the first gear shaft 601 is engaged with the third gear 4023 of the third transmission arm 40. The two end gears (6012 and 6013) of the second gear shaft 602 are engaged with the two end gears (6022 and 6023) of the first gear shaft 601 respectively. One end gear 6023 of the second gear shaft 602 is engaged with the fourth gear 5023 of the fourth transmission arm 50. The middle rotating shaft 6011 of the first gear shaft 601 is rotatably connected to the main shaft assembly 1, and the middle rotating shaft 6021 of the second gear shaft 602 is rotatably connected to the main shaft assembly 1.

It may be understood that, in this embodiment, the third transmission arm 40 is rotatably connected to the main shaft assembly 1 by using a virtual shaft, the fourth transmission arm 50 is rotatably connected to the main shaft assembly 1 by using a virtual shaft, and the rotating end 402 of the third transmission arm 40 and the rotating end 502 of the fourth transmission arm 50 are engaged with each other by using a gear drive shaft. In some other embodiments, alternatively, the third transmission arm 40 may be rotatably connected to the main shaft assembly 1 by using a physical shaft, the fourth transmission arm 50 may be rotatably connected to the main shaft assembly 1 by using a physical shaft, both the rotating end 402 of the third transmission arm 40 and the rotating end 502 of the fourth transmission arm 50 have gears, and the two rotating ends are directly engaged with each other. Structures of the third transmission arm 40 and the fourth transmission arm 50 are not strictly limited in this application.

Figure 23:
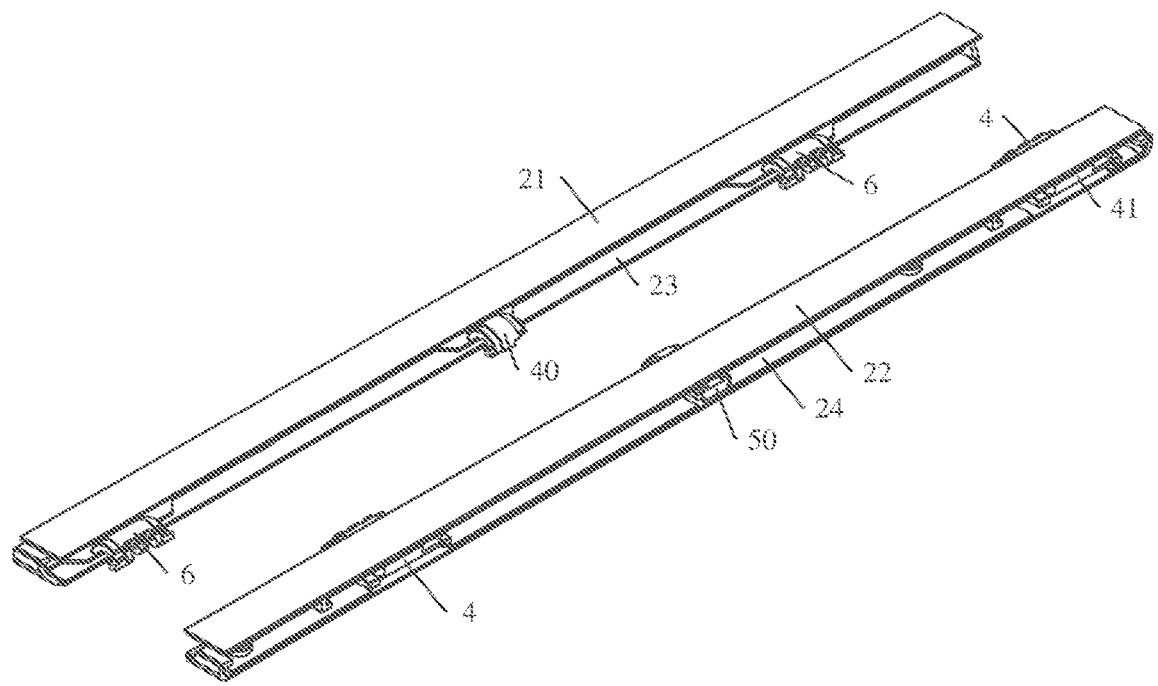
FIG. 23 is a schematic diagram of a partial structure of a rotating mechanism shown in FIG. 7.

FIG. 23 is a schematic diagram of a partial structure of the rotating mechanism 20 shown in FIG. 7.

In some embodiments, the first supporting plate 21 is fixedly connected to the sliding end 61 of the second transmission arm 6, and the second supporting plate 22 is fixedly connected to the sliding end 41 of the first transmission arm 4. The first shielding plate 23 is located on a side that is of the second transmission arm 6 and that faces away from the first supporting plate 21, and is fixedly connected to the sliding end 61 of the second transmission arm 6. The second shielding plate 24 is located on a side that is of the first transmission arm 4 and that faces away from the second supporting plate 22, and is fixedly connected to the sliding end 41 of the first transmission arm 4. In other words, both the first supporting plate 21 and the first shielding plate 23 are fastened to the sliding end 61 of the second transmission arm 6, and are respectively located on two sides of the second transmission arm 6. Both the second supporting plate 22 and the second shielding plate 24 are fastened to the sliding end 41 of the first transmission arm 4, and are respectively located on two sides of the first transmission arm 4.

In this embodiment, the first supporting plate 21, the first shielding plate 23, and the second transmission arm 6 are assembled into one component, and the second supporting plate 22, the second shielding plate 24, and the first transmission arm 4 are assembled into one component. Therefore, the second transmission arm 6 can directly control motion tracks of the first supporting plate 21 and the first shielding plate 23, and the first transmission arm 4 can directly control motion tracks of the second supporting plate 22 and the second shielding plate 24. In this way, precision is high in controlling movement processes of the first supporting plate 21, the second supporting plate 22, the first shielding plate 23, and the second shielding plate 24, and hysteresis is small, to implement accurately extending or retracting when the folding apparatus 100 is rotated, so as to meet a requirement of supporting the flexible display 200 and a self-shielding requirement of the rotating mechanism 20.

For example, both the first supporting plate 21 and the first shielding plate 23 are fastened to second transmission arms 6 of the two end connecting assemblies 20*a*, and may further be fastened to the third transmission arm 40 of the middle connecting assembly 20*b*, and both the second supporting plate 22 and the second shielding plate 24 are fastened to first transmission arms 4 of the two end connecting assemblies 20*a*, and may further be fastened to the fourth transmission arm 50 of the middle connecting assembly 20*b*. In this case, the plurality of connecting assemblies (the assemblies 20*a* and the assembly 20*b*) may jointly drive the first supporting plate 21, the first shielding plate 23, the second supporting plate 22, and the second shielding plate 24 to move, so that motion control difficulty is reduced and motion control precision is improved.

In some embodiments, sliding ends of a plurality of transmission arms can be locked and fastened to the supporting plate and the shielding plate 16 by using fasteners. The fastener includes but is not limited to a screw, a bolt, a rivet, a dowel pin, and the like. Concave-convex fitting structures may be further disposed between the sliding ends of the plurality of transmission arms and the supporting plate, and between the sliding ends of the plurality of transmission arms and the shielding plate 16, so that assembly precision and reliability are improved.

Figure 24:
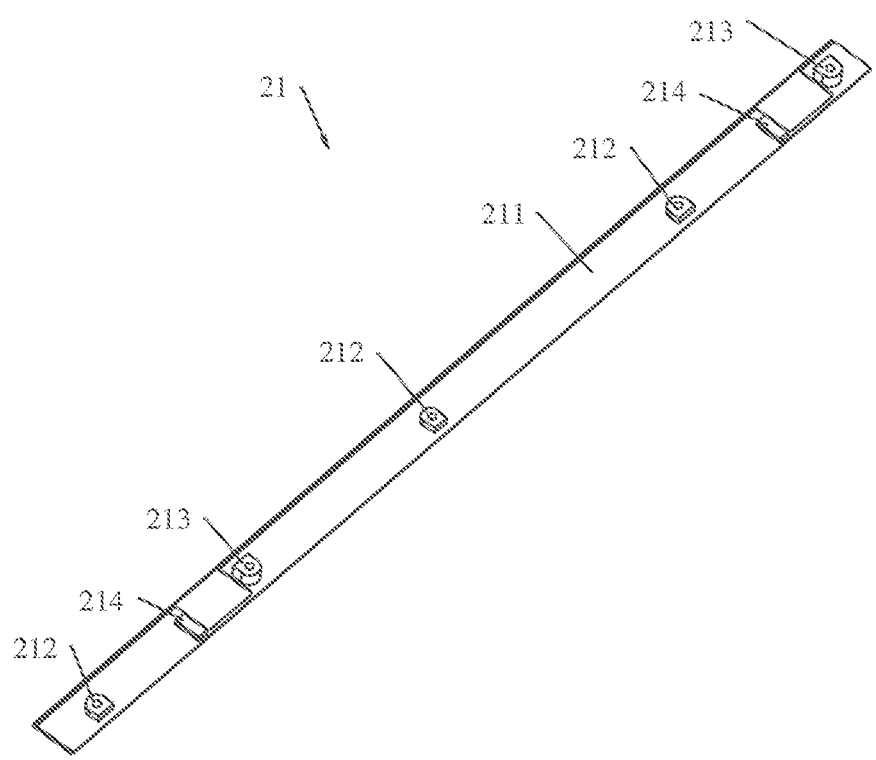
FIG. 24 is a schematic diagram of a structure of a first supporting plate shown in FIG. 8.
Figure 25:
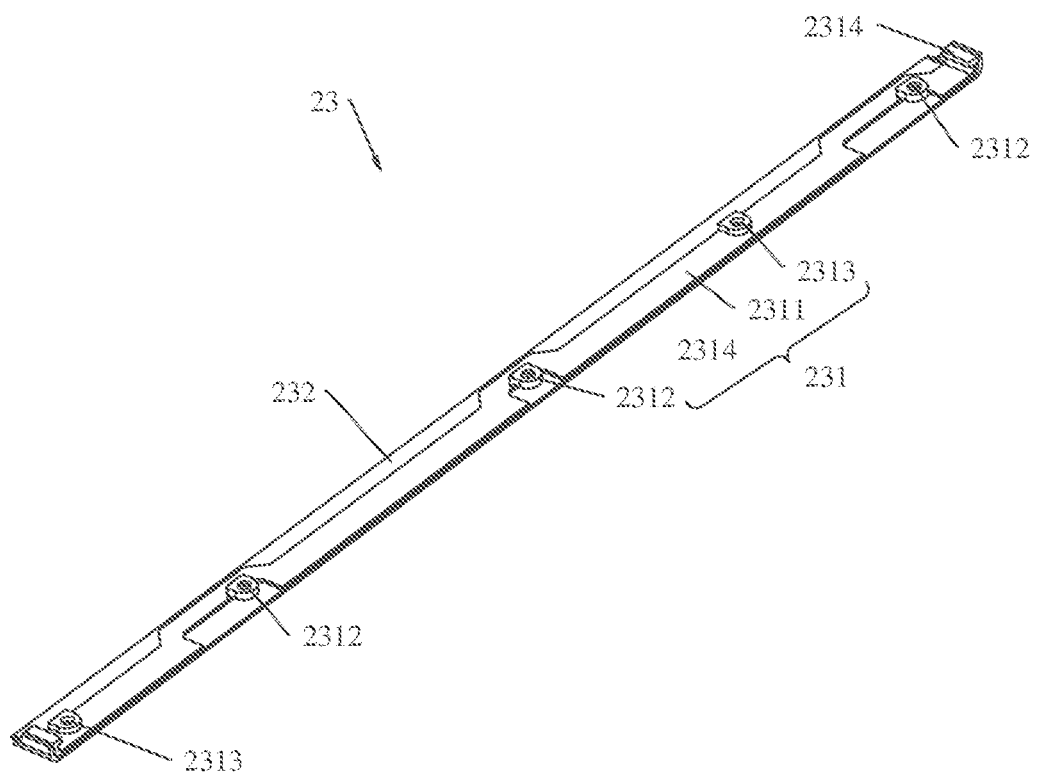
FIG. 25 is a schematic diagram of a structure of a first shielding plate shown in FIG. 8.

For example, FIG. 24 is a schematic diagram of a structure of the first supporting plate 21 shown in FIG. 8, and FIG. 25 is a schematic diagram of a structure of the first shielding plate 23 shown in FIG. 8.

As shown in FIG. 24, the first supporting plate 21 includes a plate body 211 and a plurality of first bulges 212 and a plurality of second bulges 213 that are fastened to the plate body 211, and the plurality of first bulges 212 and the plurality of second bulges 213 are spaced from each other. The plurality of first bulges 212 are configured to respectively clamp sliding ends 61 of the second transmission arms 6 of the two end connecting assemblies 20a and the sliding end 401 of the third transmission arm 40 of the middle connecting assembly 20b. The plurality of second bulges 213 are configured to abut against the first shielding plate 23, to improve support strength between the first supporting plate 21 and the first shielding plate 23. The first supporting plate 21 may be an integrally-formed mechanical part.

The first supporting plate 21 may further include a sliding part 214 fastened to the plate body 211. The sliding part 214 is configured to be slidably connected to the first fixed bracket 31 of the end connecting assembly 20a, so that the first supporting plate 21 can better slide with the second transmission arm 6 relative to the first fixed bracket 31, to improve mechanism reliability of the rotating mechanism 20. For example, there are two first sliding parts 214, and the two first sliding parts 214 are slidably connected to two first fixed brackets 31 respectively.

As shown in FIG. 25, the first shielding plate 23 includes a first plate part 231 and a second plate part 232 that are disposed in a stacked manner. The first plate part 231 is a structural plate part, and includes a body 2311 and a plurality of first projections 2312 and a plurality of second projections 2313 that are fastened to the body 2311. The plurality of first projections 2312 and the plurality of second projections 2313 are spaced from each other. The plurality of first projections 2312 are configured to respectively clamp the sliding ends 61 of the second transmission arms 6 of the two end connecting assemblies 20a and the sliding end 401 of the third transmission arm 40 of the middle connecting assembly 20b. The plurality of second projections 2313 are configured to respectively abut against the plurality of second bulges 213 of the first supporting plate 21, to improve support strength between the first supporting plate 21 and the first shielding plate 23. The second plate part 232 is an appearance plate part, and the second plate part 232 can shield a structure of the first plate part 231, so that appearance integrity of the first shielding plate 23 is better. The first plate part 231 and the second plate part 232 may be fastened to each other in a manner such as bonding.

The first plate part 231 of the first shielding plate 23 may further include a sliding part 2314 fastened to the body 2311. The sliding part 2314 is configured to be slidably connected to the first fixed bracket 31 of the end connecting assembly 20a, so that the first shielding plate 23 can better slide with the second transmission arm 6 relative to the first fixed bracket 31, to improve mechanism reliability of the rotating mechanism 20.

In this embodiment, a structure of the second supporting plate 22 may be the same as a structure of the first supporting plate 21, and a structure of the second shielding plate 24 may be the same as a structure of the first shielding plate 23, to reduce material types of the rotating mechanism 20, and reduce design difficulty and costs of the rotating mechanism 20. Specific structures of the second supporting plate 22 and the second shielding plate 24 are not described in this embodiment of this application.

Figure 26:
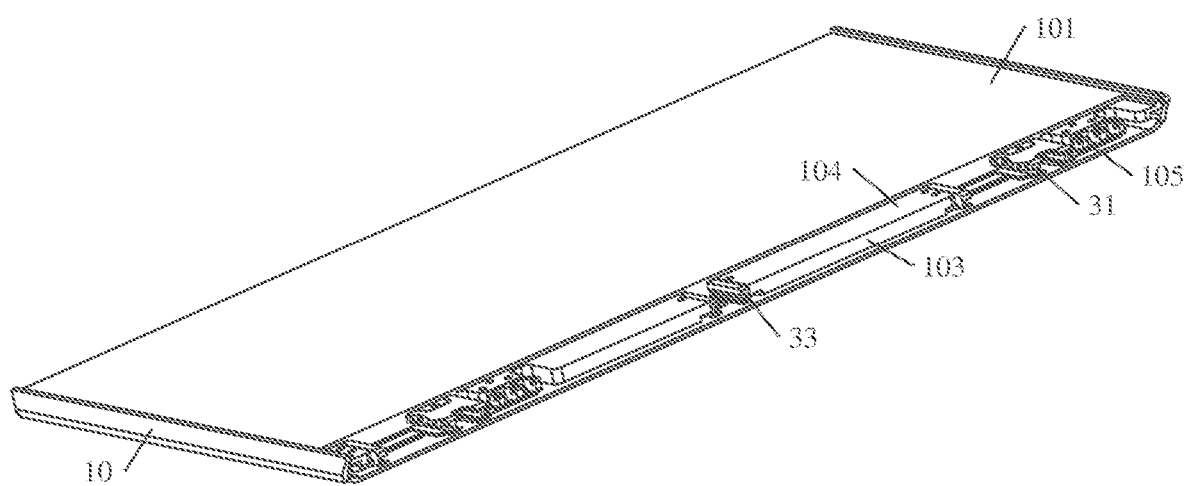
FIG. 26 is a schematic diagram of a partial structure of the folding apparatus shown in FIG. 2.

Refer to FIG. 7 and FIG. 26. FIG. 26 is a schematic diagram of a partial structure of the folding apparatus 100 shown in FIG. 2. The structure shown in FIG. 29 includes the first housing 10, first fixed brackets 31 of the two end connecting assemblies 20a, and the third fixed bracket 33 of the middle connecting assembly 20b.

In some embodiments, there is a first fixed groove 102 on a side that is of the first housing 10 and that is close to the rotating mechanism 20, the first housing 10 includes a first positioning plate 103 located in the first fixed groove 102, the first positioning plate 103 and a groove bottom wall of the first fixed groove 102 are spaced, and the first fixed bracket 31 is located between the first positioning plate 103 and the groove bottom wall of the first fixed groove 102, and is fixedly connected to the first positioning plate 103. In this embodiment, because the first fixed bracket 31 and the first housing 10 are fastened to each other, the first housing 10 and the first fixed bracket 31 move synchronously. The rotating mechanism 20 limits a motion trail of the first fixed bracket 31 during movement, and also limits a motion trail of the first housing 10.

In some embodiments, the first housing 10 has a first supporting surface 101, and the first positioning plate 103 sinks relative to the first supporting surface 101 to form a first accommodating groove 104. The first accommodating groove 104 can provide an accommodation and movement space for the first supporting plate 21. A location at which the first accommodating groove 104 is disposed enables a supporting surface of the first supporting plate 21 disposed in the first accommodating groove 104 to be flush with the first supporting surface 101 of the first housing 10. In this way, the first supporting plate 21 can better support the flexible display 200. A depth of the first accommodating groove 104 is very shallow, and a supporting backplane with high hardness is disposed on a non-display side of the flexible display 200. Therefore, when the first supporting plate 21 partially extends out of the first accommodating groove 104, a part that is of the flexible display 200 and that faces the first accommodating groove 104 does not deform significantly when been pressed by a user. This also ensures reliability of the flexible display 200.

For example, the third fixed bracket 33 is located between the first positioning plate 103 and the groove bottom wall of the first fixed groove 102, and is fixedly connected to the first positioning plate 103. A gap 105 is formed between the two first fixed brackets 31 and the third fixed bracket 33, and the groove bottom wall of the first fixed groove 102, and the gap 105 is used to provide an accommodation and movement space for the first shielding plate 23.

For example, the first positioning plate 103 may include a plurality of structures spaced from each other, or may be a continuous structure. This is not strictly limited in this application. The first fixed brackets 31 and the third fixed bracket 33 may be locked with the first positioning plate 103 by using fasteners. The fastener may be but is not limited to a structure such as a screw, a bolt, or a rivet. In some other embodiments, another connection structure may be alternatively formed between the first fixed brackets 31 and the third fixed bracket 33, and the first housing 10. This is not strictly limited in this application.

Figure 27:
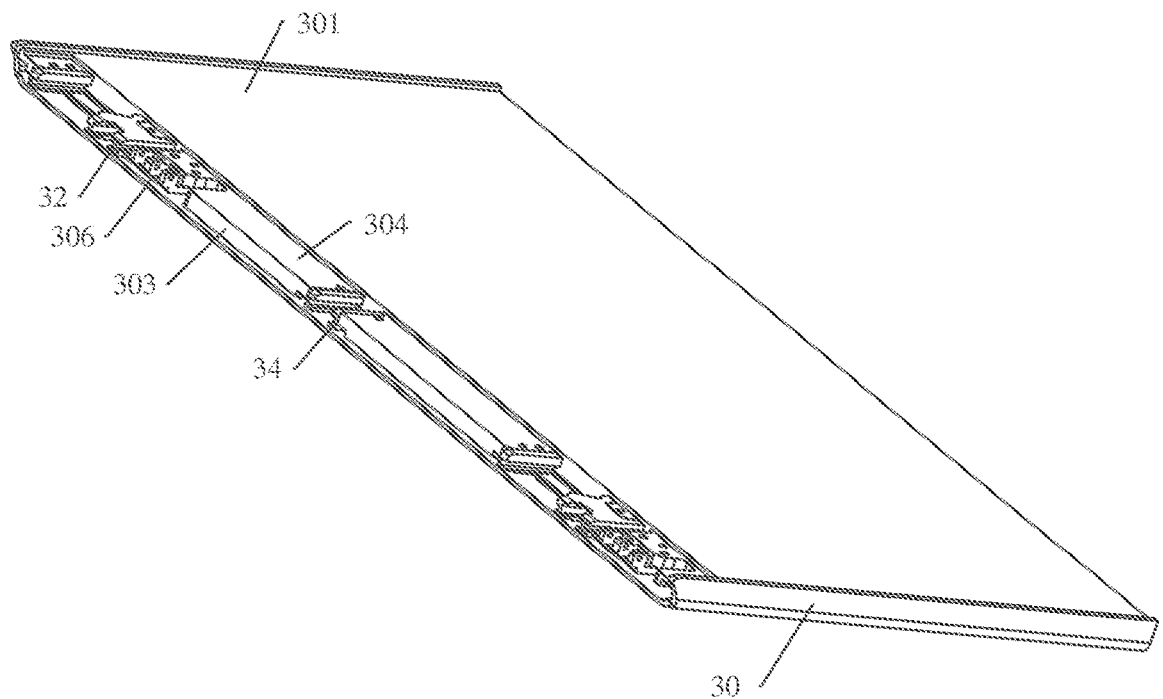
FIG. 27 is a schematic diagram of a partial structure of the folding apparatus shown in FIG. 2.

Refer to FIG. 7 and FIG. 27. FIG. 27 is a schematic diagram of a partial structure of the folding apparatus 100 shown in FIG. 2. The structure shown in FIG. 27 includes the second housing 30, second fixed brackets 32 of the two end connecting assemblies 20a, and the fourth fixed bracket 34 of the middle connecting assembly 20b.

In some embodiments, there is a second fixed groove 302 on a side that is of the second housing 30 and that is close to the rotating mechanism 20, the second housing 30 includes a second positioning plate 303 located in the second fixed groove 302, the second positioning plate 303 and a groove bottom wall of the second fixed groove 302 are spaced, and the second fixed bracket 32 is located between the second positioning plate 303 and the groove bottom wall of the second fixed groove 302, and is fixedly connected to the second positioning plate 303. In this embodiment, because the second fixed bracket 32 and the second housing 30 are fastened to each other, the second housing 30 moves with the second fixed bracket 32, and the rotating mechanism 20 may control a motion trail of the second housing 30 by controlling a motion trail of the second fixed bracket 32.

In some embodiments, the second housing 30 has a second supporting surface 301, and the second positioning plate 303 sinks relative to the second supporting surface 301 to form a second accommodating groove 304. The second accommodating groove 304 can provide an accommodation and movement space for the second supporting plate 22. A location at which the second accommodating groove 304 is disposed enables a supporting surface of the second supporting plate 22 disposed in the second accommodating groove 304 to be flush with the second supporting surface 301 of the second housing 30. In this way, the second supporting plate 22 can better support the flexible display 200. A depth of the second accommodating groove 304 is very shallow, and the supporting backplane with high hardness is disposed on the non-display side of the flexible display 200. Therefore, when the second supporting plate 22 partially extends out of the second accommodating groove 304, a part that is of the flexible display 200 and that faces the second accommodating groove 304 does not deform significantly when been pressed by a user. This also ensures reliability of the flexible display 200.

For example, the fourth fixed bracket 34 is located between the second positioning plate 303 and the groove bottom wall of the second fixed groove 302, and is fixedly connected to the second positioning plate 303. A gap 305 is formed between the two second fixed brackets 32 and the fourth fixed bracket 34, and the groove bottom wall of the second fixed groove 302, and the gap 305 is used to provide an accommodation and movement space for the second shielding plate 24.

For example, the second positioning plate 303 may include a plurality of structures spaced from each other, or may be a continuous structure. This is not strictly limited in this application. The second fixed brackets 32 and the fourth fixed bracket 34 may be locked with the second positioning plate 303 by using fasteners. The fastener may be but is not limited to a structure such as a screw, a bolt, or a rivet. In some other embodiments, another connection structure may be alternatively formed between the second fixed brackets 32 and the fourth fixed bracket 34, and the second housing 30. This is not strictly limited in this application.

The following describes a structure of the folding apparatus 100 with reference to a plurality of diagrams of internal structures obtained when the folding apparatus 100 is in the flattened state, the intermediate state, and the closed state.

Figure 28:
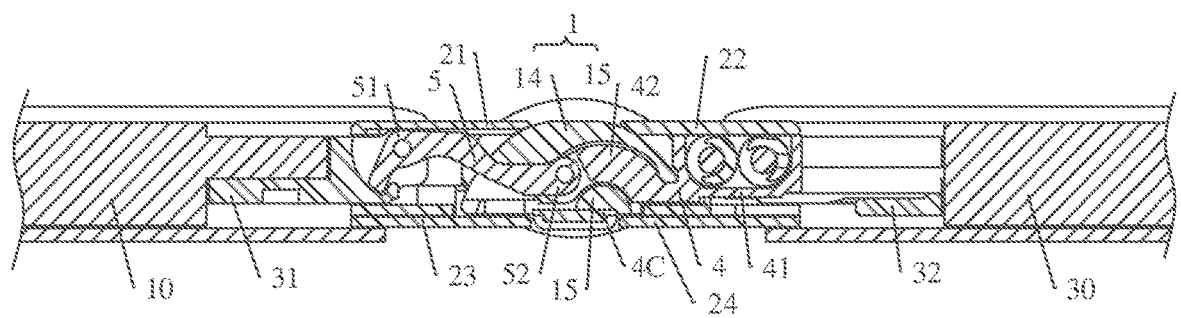
FIG. 28 is a schematic cross-sectional diagram of a structure in which a position of a first transmission arm is corresponding to the folding apparatus shown in FIG. 2.
Figure 29:
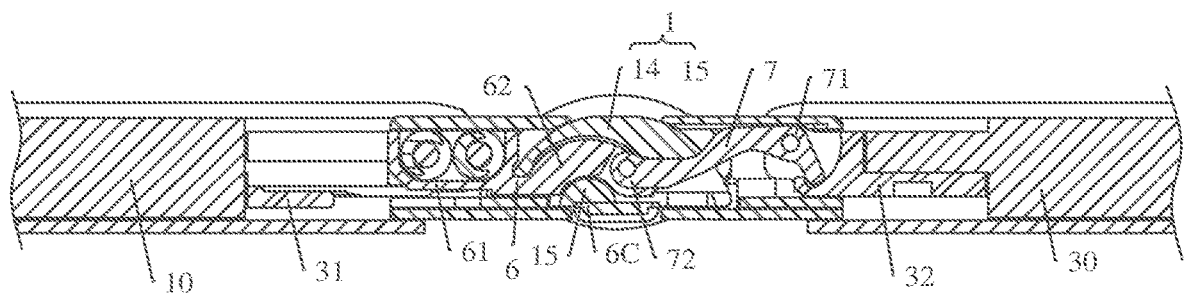
FIG. 29 is a schematic cross-sectional diagram of a structure in which a position of a second transmission arm is corresponding to the folding apparatus shown in FIG. 2.
Figure 30:
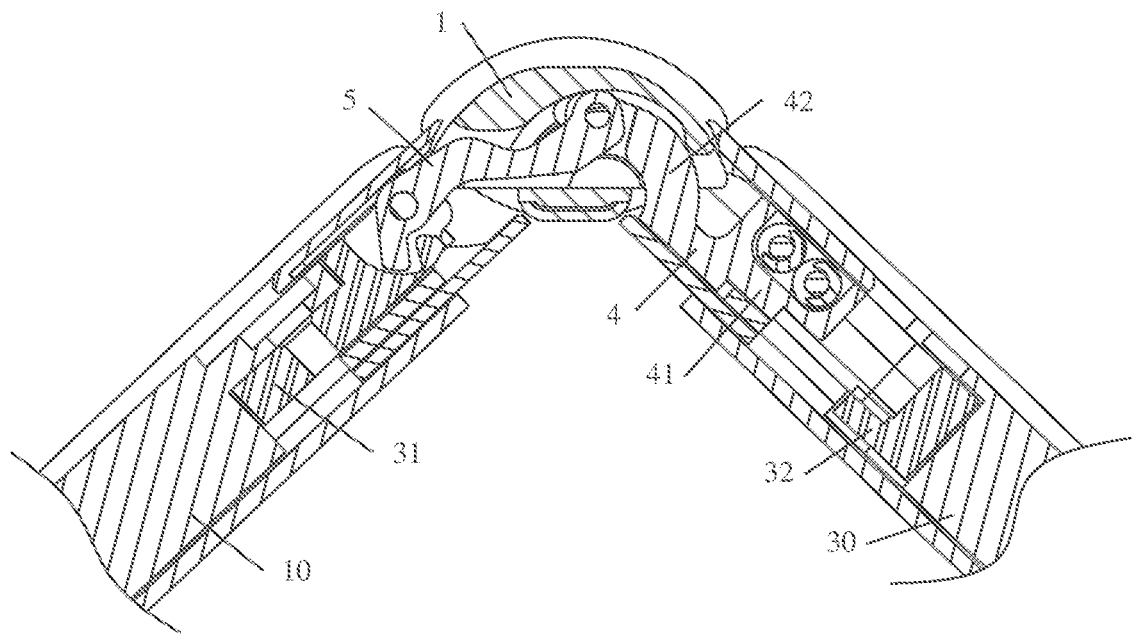
FIG. 30 is a schematic cross-sectional diagram of a structure in which a position of a first transmission arm is corresponding to the folding apparatus shown in FIG. 4.
Figure 31:
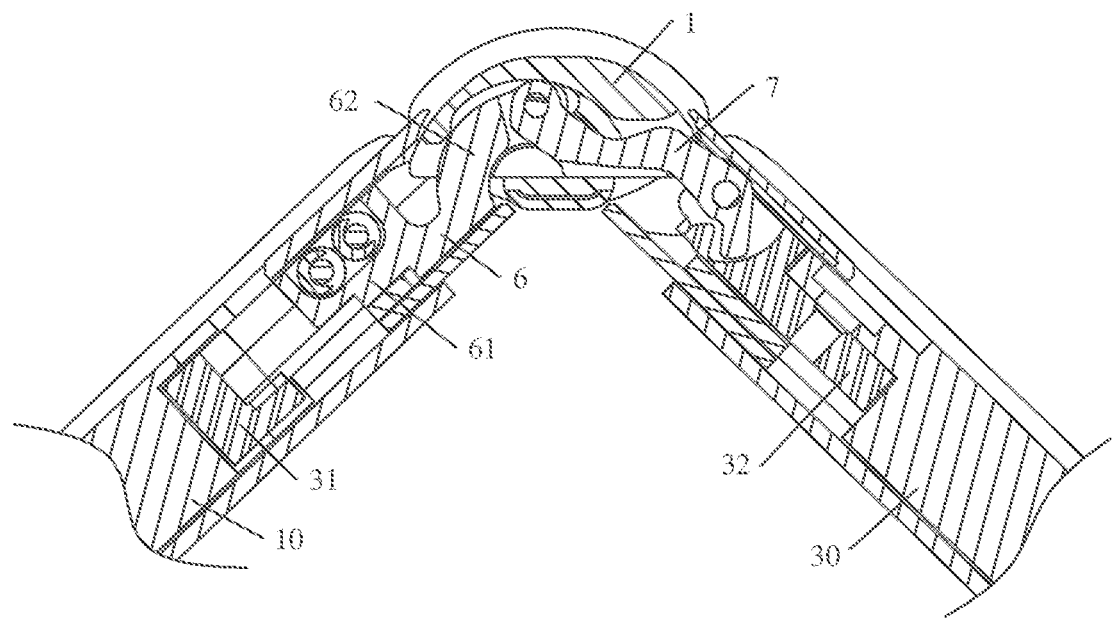
FIG. 31 is a schematic cross-sectional diagram of a structure in which a position of a second transmission arm is corresponding to the folding apparatus shown in FIG. 4.
Figure 32:
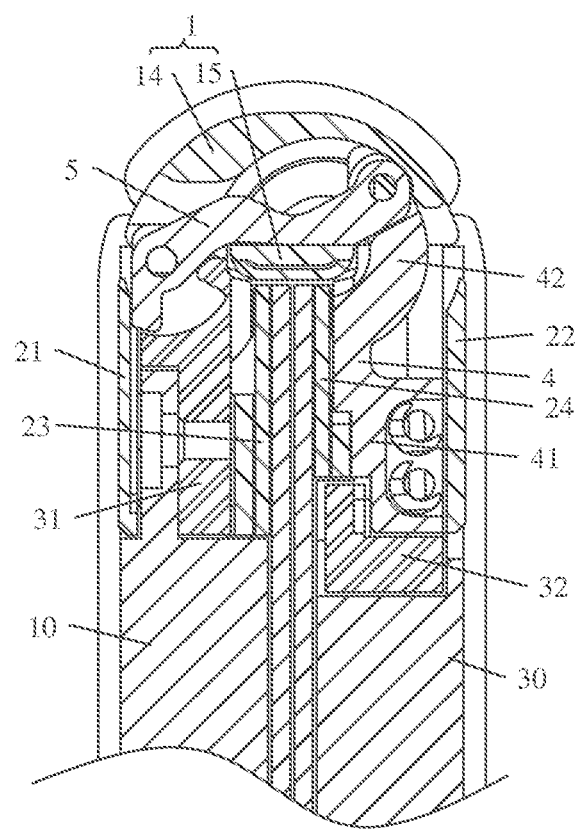
FIG. 32 is a schematic cross-sectional diagram of a structure in which a position of a first transmission arm is corresponding to the folding apparatus shown in FIG. 6.
Figure 33:
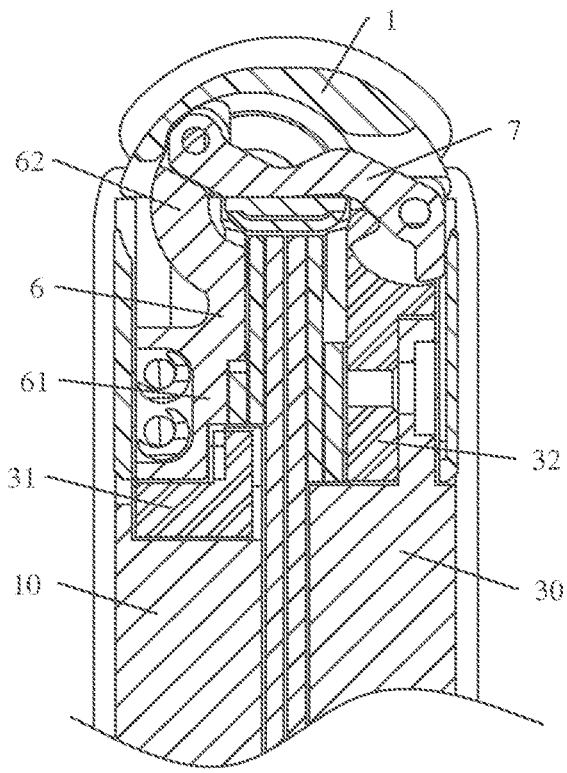
FIG. 33 is a schematic cross-sectional diagram of a structure in which a position of a second transmission arm is corresponding to the folding apparatus shown in FIG. 6.

FIG. 28 is a schematic cross-sectional diagram of a structure in which a position of the first transmission arm 4 is corresponding to the folding apparatus 100 shown in FIG. 2, and FIG. 29 is a schematic cross-sectional diagram of a structure in which a position of the second transmission arm 6 is corresponding to the folding apparatus 100 shown in FIG. 2. FIG. 30 is a schematic cross-sectional diagram of a structure in which a position of the first transmission arm 4 is corresponding to the folding apparatus 100 shown in FIG. 4, and FIG. 31 is a schematic cross-sectional diagram of a structure in which a position of the second transmission arm 6 is corresponding to the folding apparatus 100 shown in FIG. 4. FIG. 32 is a schematic cross-sectional diagram of a structure in which a position of the first transmission arm 4 is corresponding to the folding apparatus 100 shown in FIG. 6, and FIG. 33 is a schematic cross-sectional diagram of a structure in which a position of the second transmission arm 6 is corresponding to the folding apparatus 100 shown in FIG. 6. FIG. 28 to FIG. 33 show position changes of the first transmission arm 4 and the second transmission arm 6 obtained when the folding apparatus 100 is switched from the flattened state to the closed state.

As shown in FIG. 28, when the first housing 10 and the second housing 30 are unfolded relative to each other to the flattened state, the first transmission arm 4 is approximately parallel to the main shaft assembly 1, the rotating end 42 of the first transmission arm 4 is in a rotate-in position relative to the main shaft assembly 1, the sliding end 41 of the first transmission arm 4 is in a slide-out position relative to the second fixed bracket 32, the first transmission arm 4 is away from the second fixed bracket 32 and the second housing 30, and the second fixed bracket 32 and the second housing 20 are away from the main shaft assembly 1. The first rotating arm 5 is associated with the first transmission arm 4. The first rotating arm 5 is in an extend-out position relative to the main shaft assembly 1, and the first rotating arm 5 pushes the first fixed bracket 31 and the first housing 10 away from the main shaft assembly 1.

As shown in FIG. 29, when the first housing 10 and the second housing 30 are unfolded relative to each other to the flattened state, the second transmission arm 6 is approximately parallel to the main shaft assembly 1, the rotating end 62 of the second transmission arm 6 is in a rotate-in position relative to the main shaft assembly 1, the sliding end 61 of the second transmission arm 6 is in a slide-out position relative to the first fixed bracket 31, the second transmission arm 6 is away from the first fixed bracket 31 and the first housing 10, and the first fixed bracket 31 and the first housing 10 are away from the main shaft assembly 1. The second rotating arm 7 is associated with the second transmission arm 6. The second rotating arm 7 is in an extend-out position relative to the main shaft assembly 1, and the second rotating arm 7 pushes the second fixed bracket 32 and the second housing 30 away from the main shaft assembly 1.

That is, when the first housing 10 and the second housing 30 are unfolded relative to each other to the flattened state, the first transmission arm 4 and the second transmission arm 6 each are in the rotate-in position relative to the main shaft assembly 1, and the first rotating arm 5 and the second rotating arm 7 each are in the extend-out position relative to the main shaft assembly 1, and push the first housing 10 and the second housing 30 away from the main shaft assembly 1.

As shown in FIG. 30, when the first housing 10 and the second housing 30 are in the intermediate state, the first transmission arm 4 is inclined relative to the main shaft assembly 1, the rotating end 42 of the first transmission arm 4 is in a partially rotate-out position/partially rotate-in position relative to the main shaft assembly 1, the sliding end 41 of the first transmission arm 4 is in a partially slide-in position/partially slide-out position relative to the second fixed bracket 32, the first transmission arm 4 gradually approaches the second fixed bracket 32 and the second housing 30, and the second fixed bracket 32 and the second housing 30 gradually approach the main shaft assembly 1. The first rotating arm 5 is associated with the first transmission arm 4. The first rotating arm 5 is in a partially extend-in position/partially extend-out position relative to the main shaft assembly 1. The first rotating arm 5 drives the first fixed bracket 31 and the first housing 10 to gradually approach the main shaft assembly 1.

As shown in FIG. 31, when the first housing 10 and the second housing 30 are in the intermediate state, the second transmission arm 6 is inclined relative to the main shaft assembly 1, the rotating end 62 of the second transmission arm 6 is in a partially rotate-out position/partially rotate-in position relative to the main shaft assembly 1, the sliding end 61 of the second transmission arm 6 is in a partially slide-in position/partially slide-out position relative to the first fixed bracket 31, the second transmission arm 6 gradually approaches the first fixed bracket 31 and the first housing 10, and the first fixed bracket 31 and the first housing 10 gradually approach the main shaft assembly 1. The second rotating arm 7 is associated with the second transmission arm 6. The second rotating arm 7 is in a partially extend-in position/partially extend-out position relative to the main shaft assembly 1. The second rotating arm 7 drives the second fixed bracket 32 and the second housing 30 to gradually approach the main shaft assembly 1.

That is, when the first housing 10 and the second housing 30 are in the intermediate state, the first transmission arm 4 and the second transmission arm 6 each are in the partially rotate-out position/partially rotate-in position relative to the main shaft assembly 1, and the first rotating arm 5 and the second rotating arm 7 each are in the partially extend-in position relative to the main shaft assembly 1, and drive the first housing 10 and the second housing 30 to gradually approach the main shaft assembly 1.

As shown in FIG. 32, when the first housing 10 and the second housing 30 are folded relative to each other to the closed state, the first transmission arm 4 is approximately perpendicular to the main shaft assembly 1, the rotating end 42 of the first transmission arm 4 is in a rotate-out position relative to the main shaft assembly 1, the sliding end 41 of the first transmission arm 4 is in a slide-in position relative to the second fixed bracket 32, the first transmission arm 4 approaches the second fixed bracket 32 and the second housing 30, and the second fixed bracket 32 and the second housing 30 approach the main shaft assembly 1. The first rotating arm 5 is in an extend-in position relative to the main shaft assembly 1, and the first rotating arm 5 pulls the first fixed bracket 31 and the first housing 10 close to the main shaft assembly 1.

As shown in FIG. 33, when the first housing 10 and the second housing 30 are folded relative to each other to the closed state, the second transmission arm 6 is approximately perpendicular to the main shaft assembly 1, the rotating end 62 of the second transmission arm 6 is in a rotate-out position relative to the main shaft assembly 1, the sliding end 61 of the second transmission arm 6 is in a slide-in position relative to the first fixed bracket 31, the second transmission arm 6 approaches the first fixed bracket 31 and the first housing 10, and the first fixed bracket 31 and the first housing 10 approach the main shaft assembly 1. The second rotating arm 7 is in an extend-in position relative to the main shaft assembly 1, and the second rotating arm 7 pulls the second fixed bracket 32 and the second housing 30 close to the main shaft assembly 1.

That is, when the first housing 10 and the second housing 30 are folded relative to each other to the closed state, the first transmission arm 4 and the second transmission arm 6 each are in the rotate-out position relative to the main shaft assembly 1, and the first rotating arm 5 and the second rotating arm 7 each are in the extend-in position relative to the main shaft assembly 1, and pull the first housing 10 and the second housing 30 close to the main shaft assembly 1.

In this embodiment of this application, as shown in FIG. 28 to FIG. 33, the rotating end 42 of the first transmission arm 4 is rotatably connected to the main shaft assembly 1, the sliding end 41 of the first transmission arm 4 is slidably connected to the second fixed bracket 32, and the second fixed bracket 32 is fastened to the second housing 30, and the rotating end 62 of the second transmission arm 6 is rotatably connected to the main shaft assembly 1, the sliding end 61 of the second transmission arm 6 is slidably connected to the first fixed bracket 31, and the first fixed bracket 31 is fastened to the first housing 10. Therefore, when the first housing 10 and the second housing 30 are rotated relative to each other, the first housing 10 drives the first fixed bracket 31 to rotate relative to the main shaft assembly 1, the second transmission arm 6 rotates with the first fixed bracket 31 relative to the main shaft assembly 1, and the second transmission arm 6 slides relative to the first fixed bracket 31, and the second housing 30 drives the second fixed bracket 32 to rotate relative to the main shaft assembly 1, the first transmission arm 4 rotates with the second fixed bracket 32 relative to the main shaft assembly 1, and the first transmission arm 4 slides relative to the second fixed bracket 32. In this way, the folding apparatus 100 can be freely switched between the flattened state and the closed state. The first housing 10 and the second housing 30 can be unfolded relative to each other to the flattened state, so that the flexible display 200 is in the flattened form, to implement large-screen display. The first housing 10 and the second housing 30 can also be folded relative to each other to the closed state, so that the electronic device 1000 is easy to place and carry. In addition, when the first housing 10 and the second housing 30 are folded relative to each other to the closed state by using the rotating mechanism 20, the first housing 10 and the second housing 30 can be completely closed, and there is no gap between the first housing 10 and the second housing 30 or a gap between the first housing 10 and the second housing 30 is small. Therefore, appearance integrity of the folding apparatus 100 is implemented, and self-shielding in appearance is implemented. Appearance integrity of the electronic device 1000 to which the folding apparatus 100 is applied is implemented, so that product reliability and user experience are improved.

As shown in FIG. 32, when the first housing 10 and the second housing 30 are folded relative to each other to the closed state, the main inner shaft 15 of the main shaft assembly 1 is located between the main outer shaft 14 and each of the first fixed bracket 31 and the second fixed bracket 32. As shown in FIG. 28, the first transmission arm 4 rotates around a first rotation center 4C. For example, the first rotation center 4C is a circle center that is of an arc-shaped groove 131 of the main shaft assembly 1 and that is corresponding to the rotating end 42 of the first transmission arm 4. The first rotation center 4C around which the first transmission arm 4 rotates relative to the main shaft assembly 1 is close to the main inner shaft 15 and away from the main outer shaft 14, and is close to the second fixed bracket 32 and away from the first fixed bracket 31. As shown in FIG. 29, the second transmission arm 6 rotates around a second rotation center 6C. For example, the second rotation center 6C is a circle center that is of an arc-shaped groove 131 of the main shaft assembly 1 and that is corresponding to the rotating end 62 of the second transmission arm 6. The second rotation center 6C around which the second transmission arm 6 rotates relative to the main shaft assembly 1 is close to the main inner shaft 15 and away from the main outer shaft 14, and is close to the first fixed bracket 31 and away from the second fixed bracket 32.

In this embodiment, locations of the first rotation center 4C and the second rotation center 6C are set, so that the rotating mechanism 20 can more easily implement pulling-in of the housing when the folding apparatus 100 is switched from the flattened state to the closed state and pushing-out of the housing when the folding apparatus 100 is switched from the closed state to the flattened state, to implement deformation by using the flexible display 200 as a neutral surface.

As shown in FIG. 28, because the first end 51 of the first rotating arm 5 is rotatably connected to the first fixed bracket 31, and the second end 52 of the first rotating arm 5 is rotatably connected to the rotating end 42 of the first transmission arm 4, when the first housing 10 and the second housing 30 rotate relative to each other, the rotating end 42 of the first transmission arm 4 drives the second end 52 of the first rotating arm 5 to rotate around the first rotation center 4C, to form a first-level link motion, and the first end 51 of the first rotating arm 5 rotates around the second end 52 of the first rotating arm 5, to form a second-level link motion. Therefore, a link motion of the first rotating arm 5 is equivalent to a two-link motion. The second end 52 of the first rotating arm 5 is rotatably connected to the rotating end 42 of the first transmission arm 4, and the second end 52 of the first rotating arm 5 and the rotating end 42 of the first transmission arm 4 rotate around a fixed point synchronously. Therefore, a rotation angle of the first-level link motion of the first rotating arm 5 and a rotation angle of the first transmission arm 4 are equal in value and opposite in direction. Therefore, the first rotating arm 5 and the first transmission arm 4 form an interlocked structure, the first rotating arm 5 and the first transmission arm 4 form a first-level hinge between the first fixed bracket 31 and the second fixed bracket 32, and a degree of freedom of movement of the first rotating arm 5 is reduced to 1, so that the first rotating arm 5 and the first transmission arm 4 have little gap and do not shake during movement of the rotating mechanism 20. In this way, stretching-resistance strength and reliability of the rotating mechanism 20 is improved.

As shown in FIG. 29, because the first end 71 of the second rotating arm 7 is rotatably connected to the second fixed bracket 32, and the second end of the second rotating arm 7 is rotatably connected to the rotating end 62 of the second transmission arm 6, when the first housing 10 and the second housing 30 rotate relative to each other, the rotating end 62 of the second transmission arm 6 drives the second end 72 of the second rotating arm 7 to rotate around the second rotation center 6C, to form a first-level link motion, and the first end 71 of the second rotating arm 7 rotates around the second end 72 of the second rotating arm 7, to form a second-level link motion. Therefore, a link motion of the second rotating arm 7 is equivalent to a two-link motion. The second end 72 of the second rotating arm 7 is rotatably connected to the rotating end 62 of the second transmission arm 6, and the second end 72 of the second rotating arm 7 and the rotating end 62 of the second transmission arm 6 rotate around a fixed point synchronously. Therefore, a rotation angle of the first-level link motion of the second rotating arm 7 and a rotation angle of the second transmission arm 6 are equal in value and opposite in direction. Therefore, the second rotating arm 7 and the second transmission arm 6 form an interlocked structure, the second rotating arm 7 and the second transmission arm 6 form a first-level hinge between the first fixed bracket 31 and the second fixed bracket 32, and a degree of freedom of movement of the second rotating arm 7 is reduced to 1, so that the second rotating arm 7 and the second transmission arm 6 have little gap and do not shake during movement of the rotating mechanism 20. In this way, stretching-resistance strength and reliability of the rotating mechanism 20 is improved.

As shown in FIG. 28 to FIG. 33, when the first housing 10 and the second housing 30 are unfolded relative to each other to the flattened state, the first transmission arm 4 rotates into the main shaft assembly 1, so that the first rotating arm 5 extends out of the main shaft assembly 1, and the first rotating arm 5 pushes the first housing 10 away from the main shaft assembly 1 by using the first fixed bracket 31, and the second transmission arm 6 rotates into the main shaft assembly 1, so that the second rotating arm 7 extends out of the main shaft assembly 1, and the second rotating arm 7 pushes the second housing 30 away from the main shaft assembly 1 by using the second fixed bracket 32. When the first housing 10 and the second housing 30 are folded relative to each other to the closed state, the first transmission arm 4 rotates out of the main shaft assembly 1, so that the first rotating arm 5 extends into the main shaft assembly 1, and the first rotating arm 5 pulls the first housing 10 close to the main shaft assembly 1 by using the first fixed bracket 31, and the second transmission arm 6 rotates out of the main shaft assembly 1, so that the second rotating arm 7 extends into the main shaft assembly 1, and the second rotating arm 7 pulls the second housing 30 close to the main shaft assembly 1 by using the second fixed bracket 32. Therefore, when the first housing 10 and the second housing 30 are unfolded relative to each other, the rotating mechanism 20 enables the first fixed bracket 31 to drive the first housing 10 to move away from the main shaft assembly 1, and enables the second fixed bracket 32 to drive the second housing 30 to move away from the main shaft assembly 1. When the first housing 10 and the second housing 30 are folded relative to each other, the rotating mechanism 20 enables the first fixed bracket 31 to drive the first housing 10 to move toward the main shaft assembly 1, and enables the second fixed bracket 32 to drive the second housing 30 to move toward the main shaft assembly 1. In other words, the rotating mechanism 20 can implement pulling-in of the housing when the folding apparatus 100 is switched from the flattened state to the closed state and pushing-out of the housing when the folding apparatus 100 is switched from the closed state to the flattened state, so that the folding apparatus 100 can implement deformation by using the flexible display 200 as a neutral surface when being unfolded or folded. In this way, a risk of stretching or squeezing the flexible display 200 is reduced, and the flexible display 200 maintains a constant length, to protect the flexible display 200 and improve reliability of the flexible display 200, so that the flexible display 200 and the electronic device 1000 have long service lives.

As shown in FIG. 28, when the first housing 10 and the second housing 30 are unfolded relative to each other to the flattened state, the first supporting plate 21 is flush with the second supporting plate 22, the first supporting plate 21 is laid between the first fixed bracket 31 and the main shaft assembly 1, and the second supporting plate 22 is laid between the second fixed bracket 32 and the main shaft assembly 1. The first supporting plate 21, the main shaft assembly 1, and the second supporting plate 22 can jointly form complete planar support for the bending part 2002 of the flexible display 200. As shown in FIG. 32, when the first housing 10 and the second housing 30 are folded relative to each other to the closed state, the first supporting plate 21 is stacked on a side that is of the first fixed bracket 31 and that is away from the second fixed bracket 32, and the second supporting plate 22 is stacked on a side that is of the second fixed bracket 32 and that is away from the first fixed bracket 31. The first supporting plate 21 and the second supporting plate 22 can slide and be accommodated relative to the first housing 10 and the second housing 30 respectively, so that the main shaft assembly 1 is exposed to form complete support for the bending part 2002 of the flexible display 200. In other words, when the folding apparatus 100 is in the flattened state or the closed state, the rotating mechanism 20 can completely support the bending part 2002 of the flexible display 200, thereby helping protect the flexible display 200 and improving user experience.

As shown in FIG. 28, when the first housing 10 and the second housing 30 are unfolded relative to each other to the flattened state, the first shielding plate 23 is flush with the second shielding plate 24, the first shielding plate 23 is laid between the first fixed bracket 31 and the main shaft assembly 1, and can shield a gap between the first fixed bracket 31 and the main shaft assembly 1, and the second shielding plate 24 is laid between the second fixed bracket 32 and the main shaft assembly 1, and can shield a gap between the second fixed bracket 32 and the main shaft assembly 1. Therefore, the folding apparatus 100 can implement self-shielding. In this way, appearance integrity is improved, a risk that dust, sundries, and the like enter the rotating mechanism 20 from outside can also be reduced, to ensure reliability of the folding apparatus 100. As shown in FIG. 32, when the first housing 10 and the second housing 30 are folded relative to each other to the closed state, the first shielding plate 23 can be accommodated between the first fixed bracket 31 and the first housing 10, and the second shielding plate 24 can be accommodated between the second fixed bracket 32 and the second housing 30, so that avoidance is achieved. In this way, the folding apparatus 100 can be smoothly folded to the closed form, and mechanism reliability is high.

In addition, the first supporting plate 21 and the first shielding plate 23 are fastened to the sliding end 41 of the first transmission arm 4, and the first supporting plate 21 and the first shielding plate 23 move with the sliding end 41 of the first transmission arm 4, and the second supporting plate 22 and the second shielding plate 24 are fastened to the sliding end 61 of the second transmission arm 6, and the second supporting plate 22 and the second shielding plate 24 move with the sliding end 61 of the second transmission arm 6. Therefore, when the folding apparatus 100 is switched from the closed state to the flattened state or when the folding apparatus 100 is switched from the flattened state to the closed state, the first supporting plate 21 and the second supporting plate 22 gradually approach the main shaft assembly 1 or move away from the main shaft assembly 1, so that the folding apparatus 100 can completely support the flexible display 200 in various forms. In this way, reliability of the flexible display 200 and the electronic device 1000 is improved and service lives of the flexible display 200 and the electronic device 1000 are increased. When the folding apparatus 100 is switched from the closed state to the flattened state or when the folding apparatus 100 is switched from the flattened state to the closed state, the first shielding plate 23 and the second shielding plate 24 gradually approach the main shaft assembly 1 or move away from the main shaft assembly 1, so that the folding apparatus 100 in the various forms can adapt to forms of the rotating mechanism 20, to implement self-shielding. In this way, mechanism reliability is high.

Because both the first supporting plate 21 and the first shielding plate 23 are fastened to the sliding end 41 of the first transmission arm 4, and both the second supporting plate 22 and the second shielding plate 24 are fastened to the sliding end 61 of the second transmission arm 6, the first transmission arm 4 and the second transmission arm 6 not only control rotation actions of the first housing 10 and the second housing 30, but also control extending or retracting of the first supporting plate 21, the first shielding plate 23, the second supporting plate 22, and the second shielding plate 24. Therefore, the rotating mechanism 20 is highly integrated, an overall connection relationship is simple, and mechanism reliability is high.

Figure 34:
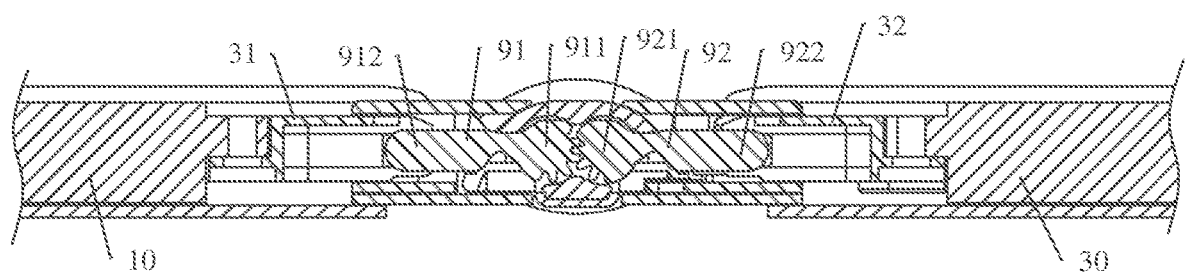
FIG. 34 is a schematic cross-sectional diagram of a structure in which positions of a first synchronous swing arm and a second synchronous swing arm are corresponding to the folding apparatus shown in FIG. 2.
Figure 35:
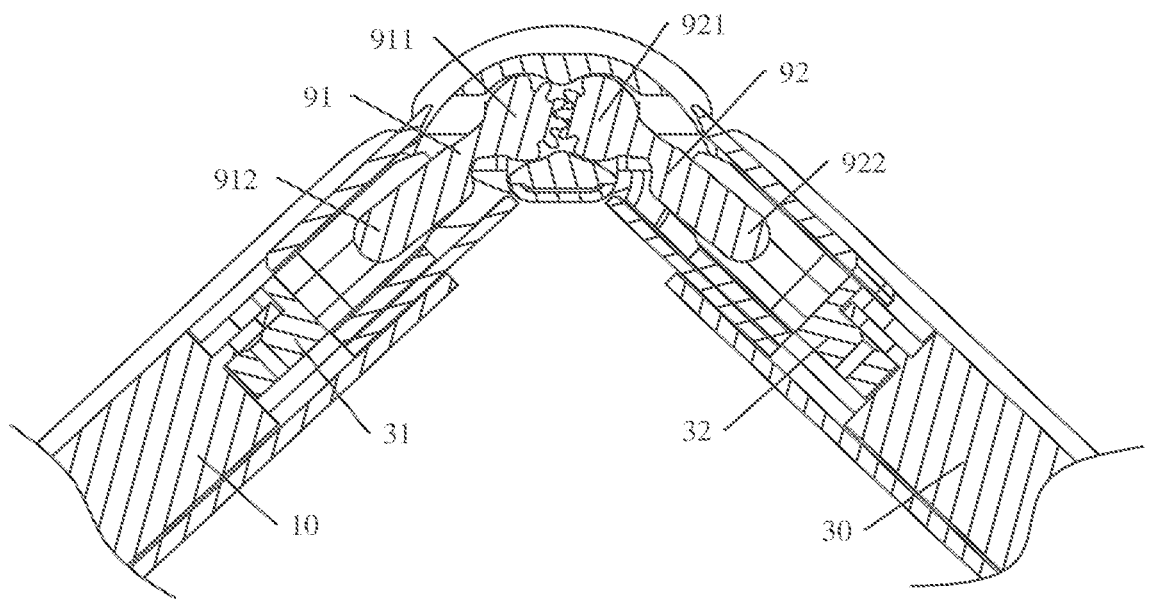
FIG. 35 is a schematic cross-sectional diagram of a structure in which positions of a first synchronous swing arm and a second synchronous swing arm are corresponding to the folding apparatus shown in FIG. 4.
Figure 36:
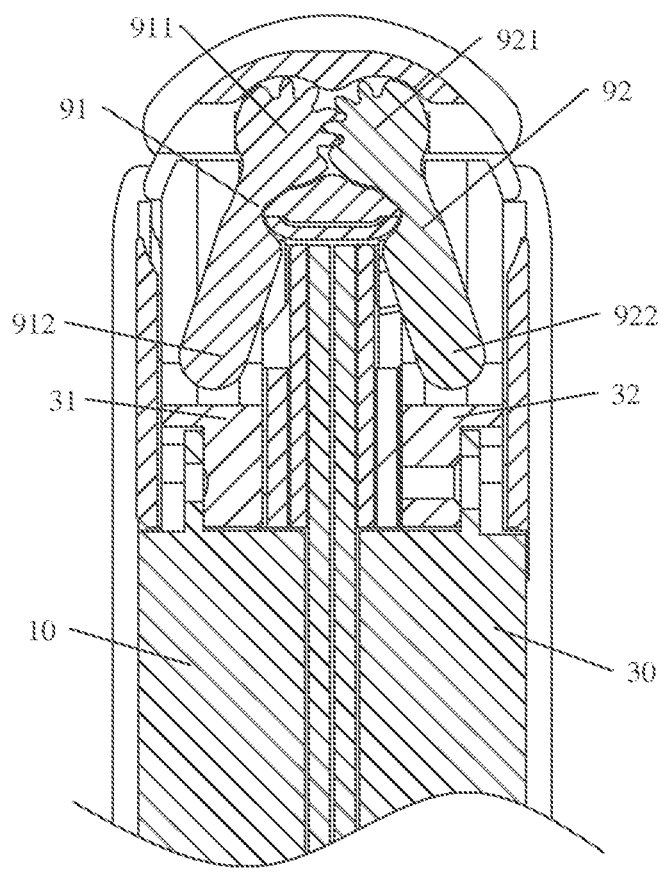
FIG. 36 is a schematic cross-sectional diagram of a structure in which positions of a first synchronous swing arm and a second synchronous swing arm are corresponding to the folding apparatus shown in FIG. 6.

FIG. 34 is a schematic cross-sectional diagram of a structure in which positions of the first synchronous swing arm 91 and the second synchronous swing arm 92 are corresponding to the folding apparatus 100 shown in FIG. 2. FIG. 35 is a schematic cross-sectional diagram of a structure in which positions of the first synchronous swing arm 91 and the second synchronous swing arm 92 are corresponding to the folding apparatus 100 shown in FIG. 4. FIG. 36 is a schematic cross-sectional diagram of a structure in which positions of the first synchronous swing arm 91 and the second synchronous swing arm 92 are corresponding to the folding apparatus 100 shown in FIG. 6. FIG. 34 to FIG. 36 show position changes of the first synchronous swing arm 91 and the second synchronous swing arm 92 obtained when the folding apparatus 100 is switched from the flattened state to the closed state.

As shown in FIG. 34, when the first housing 10 and the second housing 30 are unfolded relative to each other to the flattened state, the first synchronous swing arm 91 and the second synchronous swing arm 92 are in a flattened state, the first synchronous swing arm 91 is in an extend-out position relative to the first fixed bracket 31, and the first synchronous swing arm 91 is away from the first fixed bracket 31 and the first housing 10, and the second synchronous swing arm 92 is in an extend-out position relative to the second fixed bracket 32, and the second synchronous swing arm 92 is away from the second fixed bracket 32 and the second housing 30. As shown in FIG. 35, when the first housing 10 and the second housing 30 are in the intermediate state, the first synchronous swing arm 91 and the second synchronous swing arm 92 are in an intermediate state, and an included angle is formed between the first synchronous swing arm 91 and the second synchronous swing arm 92, the first synchronous swing arm 91 is in a partially extend-out position/partially retracted position relative to the first fixed bracket 31, and the second synchronous swing arm 92 is in a partially extend-out position/partially retracted position relative to the second fixed bracket 32. As shown in FIG. 36, when the first housing 10 and the second housing 30 are folded relative to each other to the closed state, the first synchronous swing arm 91 and the second synchronous swing arm 92 are in a folded state, the first synchronous swing arm 91 is in a retracted position relative to the first fixed bracket 31, and the first synchronous swing arm 91 is close to the first fixed bracket 31 and the first housing 10, and the second synchronous swing arm 92 is in a retracted position relative to the second fixed bracket 32, and the second synchronous swing arm 92 is close to the second fixed bracket 32 and the second housing 30.

In this embodiment, the rotating end 911 of the first synchronous swing arm 91 and the rotating end 921 of the second synchronous swing arm 92 are engaged with each other, and both the rotating end 911 of the first synchronous swing arm 91 and the rotating end 921 of the second synchronous swing arm 92 are rotatably connected to the main shaft assembly 1, the movable end 912 of the first synchronous swing arm 91 is movably connected to the first fixed bracket 31, and the movable end 922 of the second synchronous swing arm 92 is movably connected to the second fixed bracket 32. Therefore, when the first housing 10 and the second housing 30 are unfolded or folded relative to each other, the first synchronous swing arm 91 and the second synchronous swing arm 92 can control rotation angles of the first fixed bracket 31 and the second fixed bracket 32 to be consistent relative to the main shaft assembly 1, so that rotation actions of the first housing 10 and the second housing 30 are synchronous and consistent. Symmetry of folding actions and unfolding actions of the folding apparatus 100 is high. This helps improve user experience.

The first synchronous swing arm 91 is rotatably connected to the main shaft assembly 1, and slidably and rotatably connected to the first fixed bracket 31, so that a link-slider structure is formed. The second synchronous swing arm 92 is rotatably connected to the main shaft assembly 1, and slidably and rotatably connected to the second fixed bracket 32, so that a link-slider structure is formed. The two link-slider structures that are engaged with each other can effectively control the rotation actions of the first housing 10 and the second housing 30 to be synchronous and consistent.

According to embodiments of this application, the folding apparatus 100 can implement pulling-in of the housing when the folding apparatus 100 is switched from the flattened state to the closed state and pushing-out of the housing when the folding apparatus 100 is switched from the closed state to the flattened state, to implement deformation by using the flexible display 200 as a neutral surface when being unfolded or folded. In this way, a risk of stretching or squeezing the flexible display 200 is reduced, to protect the flexible display 200 and improve reliability of the flexible display 200, so that the flexible display 200 and the electronic device 1000 have long service lives.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. In a case that no conflict occurs, embodiments in this application and features in embodiments may be mutually combined. Therefore, the protection scope of this application shall be subject to the protection scope of the claims.

What is claimed is:

1. A rotating mechanism, comprising:
    a main shaft assembly;
    a first fixed bracket;
    a second fixed bracket;
    a first transmission arm, comprising a sliding end and a rotating end, wherein the sliding end of the first transmission arm is slidably connected to the second fixed bracket, the rotating end of the first transmission arm is rotatably connected to the main shaft assembly;
    a first rotating arm, wherein a first end of the first rotating arm is rotatably connected to the rotating end of the first transmission arm, and a second end of the first rotating arm is rotatably connected to the first fixed bracket;
    a second transmission arm, comprising a sliding end and a rotating end, wherein the sliding end of the second transmission arm is slidably connected to the first fixed bracket, and the rotating end of the second transmission arm is rotatably connected to the main shaft assembly; and
    a second rotating arm, wherein a first end of the second rotating arm is rotatably connected to the rotating end of the second transmission arm, and a second end of the second rotating arm is rotatably connected to the second fixed bracket.

2. The rotating mechanism of claim 1, wherein the main shaft assembly comprises a main inner shaft and a main outer shaft that is fastened to the main inner shaft, wherein the main inner shaft and the main outer shaft jointly enclose a plurality of arc-shaped grooves, the rotating end of the first transmission arm is arc-shaped and disposed in an arc-shaped groove of the plurality of arc-shaped grooves, and the rotating end of the second transmission arm is arc-shaped and disposed in another arc-shaped groove of the plurality of arc-shaped grooves.

3. The rotating mechanism of claim 1, further comprising a first supporting plate and a second supporting plate, wherein the first supporting plate is fixedly connected to the sliding end of the second transmission arm, and the second supporting plate is fixedly connected to the sliding end of the first transmission arm; and
    wherein the rotating mechanism is configured in a manner that, when the rotating mechanism is unfolded to a flattened state, the first supporting plate is flush with the second supporting plate.

4. The rotating mechanism of claim 3, wherein the rotating mechanism is further configured in a manner that, when the rotating mechanism is unfolded to the flattened state, the first supporting plate is between the first fixed bracket and the main shaft assembly, and the second supporting plate is between the second fixed bracket and the main shaft assembly.

5. The rotating mechanism of claim 3, wherein the rotating mechanism is further configured in a manner that, when the rotating mechanism is folded to a closed state, the first supporting plate is stacked on a side of the first fixed bracket and that faces away from the second fixed bracket, and the second supporting plate is stacked on a side of the second fixed bracket that faces away from the first fixed bracket.

6. The rotating mechanism of claim 3, wherein the rotating mechanism is further configured in a manner that, when the rotating mechanism is folded to a closed state, a supporting surface of the main shaft assembly is exposed relative to the first supporting plate and the second supporting plate, and wherein the supporting surface of the main shaft assembly is arc-shaped.

7. The rotating mechanism of claim 1, further comprising:
    a first shielding plate and a second shielding plate, wherein the first shielding plate is fixedly connected to the sliding end of the first transmission arm, and the second shielding plate is fixedly connected to the sliding end of the second transmission arm; and
    wherein the rotating mechanism is configured in a manner that, when the rotating mechanism is unfolded to a flattened state, the first shielding plate is flush with the second shielding plate, the first shielding plate is between the first fixed bracket and the main shaft assembly, and the second shielding plate is between the second fixed bracket and the main shaft assembly.

8. The rotating mechanism of claim 1, further comprising:
a first synchronous swing arm and a second synchronous swing arm;
wherein the first synchronous swing arm comprises a rotating end and a movable end, the rotating end of the first synchronous swing arm is rotatably connected to the main shaft assembly, and the movable end of the first synchronous swing arm is movably connected to the first fixed bracket; and
wherein the second synchronous swing arm comprises a rotating end and a movable end, the rotating end of the second synchronous swing arm is rotatably connected to the main shaft assembly, the rotating end of the second synchronous swing arm is engaged with the rotating end of the first synchronous swing arm, and the movable end of the second synchronous swing arm is movably connected to the second fixed bracket.

9. The rotating mechanism of claim 8, wherein the rotating end of the first synchronous swing arm comprises a first rotating body, a first rotating shaft, and a first gear, and wherein the first rotating shaft is rotatably connected to the main shaft assembly; and
wherein the rotating end of the second synchronous swing arm comprises a second rotating body, a second rotating shaft, and a second gear, and wherein the second gear is engaged with the first gear.

10. The rotating mechanism of claim 1, further comprising:
a third fixed bracket, a fourth fixed bracket, a third transmission arm, a fourth transmission arm, and a gear drive assembly;
wherein the third transmission arm comprises a sliding end and a rotating end, the sliding end of the third transmission arm is slidably connected to the third fixed bracket, and the rotating end of the third transmission arm is rotatably connected to the main shaft assembly; and
wherein the fourth transmission arm comprises a sliding end and a rotating end, the sliding end of the fourth transmission arm is slidably connected to the fourth fixed bracket, the rotating end of the fourth transmission arm is rotatably connected to the main shaft assembly, and the rotating end of the fourth transmission arm is engaged with the rotating end of the third transmission arm using the gear drive assembly.

11. An electronic device, comprising:
a flexible display, comprising a first part, a second part, and a third part that are sequentially arranged;
a first housing fastened to the first part;
a second housing fastened to the third part; and
a rotating mechanism, comprising:
a main shaft assembly;
a first fixed bracket fastened to the first housing;
a second fixed bracket fastened to the second housing;
a first transmission arm, comprising a sliding end and a rotating end, wherein the sliding end of the first transmission arm is slidably connected to the second fixed bracket, and the rotating end of the first transmission arm is rotatably connected to the main shaft assembly;
a first rotating arm, wherein a first end of the first rotating arm is rotatably connected to the rotating end of the first transmission arm, and a second end of the first rotating arm is rotatably connected to the first fixed bracket;
a second transmission arm, comprising a sliding end and a rotating end, wherein the sliding end of the second transmission arm is slidably connected to the first fixed bracket, and the rotating end of the second transmission arm is rotatably connected to the main shaft assembly; and
a second rotating arm, wherein a first end of the second rotating arm is rotatably connected to the rotating end of the second transmission arm, and a second end of the second rotating arm is rotatably connected to the second fixed bracket; and
wherein the flexible display is configured in a manner that the second part deforms when the first housing and the second housing are folded or unfolded relative to each other.

12. The electronic device of claim 11, wherein the main shaft assembly comprises a main inner shaft and a main outer shaft that is fastened to the main inner shaft, wherein the main inner shaft and the main outer shaft jointly enclose a plurality of arc-shaped grooves, the rotating end of the first transmission arm is arc-shaped and disposed in an arc-shaped groove of the plurality of arc-shaped grooves, and the rotating end of the second transmission arm is arc-shaped and disposed in another arc-shaped groove of the plurality of arc-shaped grooves.

13. The electronic device of claim 11, wherein the rotating mechanism further comprises a first supporting plate and a second supporting plate, the first supporting plate is fixedly connected to the sliding end of the second transmission arm, and the second supporting plate is fixedly connected to the sliding end of the first transmission arm; and
wherein the rotating mechanism is configured in a manner that, when the rotating mechanism is unfolded to a flattened state, the first supporting plate is flush with the second supporting plate.

14. The electronic device of claim 13, wherein the rotating mechanism is further configured in a manner that, when the rotating mechanism is unfolded to the flattened state, the first supporting plate is between the first fixed bracket and the main shaft assembly, and the second supporting plate is between the second fixed bracket and the main shaft assembly.

15. The electronic device of claim 13, wherein the rotating mechanism is further configured in a manner that, when the rotating mechanism is folded to a closed state, the first supporting plate is stacked on a side of the first fixed bracket that faces away from the second fixed bracket, and the second supporting plate is stacked on a side of the second fixed bracket that faces away from the first fixed bracket.

16. The electronic device of claim 13, wherein the rotating mechanism is further configured in a manner that, when the rotating mechanism is folded to a closed state, a supporting surface of the main shaft assembly is exposed relative to the first supporting plate and the second supporting plate, and wherein the supporting surface of the main shaft assembly is arc-shaped.

17. The electronic device of claim 11, wherein the rotating mechanism further comprises a first shielding plate and a second shielding plate, the first shielding plate is fixedly connected to the sliding end of the first transmission arm, and the second shielding plate is fixedly connected to the sliding end of the second transmission arm; and
wherein the rotating mechanism is configured in a manner that, when the rotating mechanism is unfolded to a flattened state, the first shielding plate is flush with the second shielding plate, the first shielding plate is between the first fixed bracket and the main shaft assembly, and the second shielding plate is between the second fixed bracket and the main shaft assembly.

18. The electronic device of claim 11, wherein the rotating mechanism further comprises a first synchronous swing arm and a second synchronous swing arm;
- wherein the first synchronous swing arm comprises a rotating end and a movable end, the rotating end of the first synchronous swing arm is rotatably connected to the main shaft assembly, and the movable end of the first synchronous swing arm is movably connected to the first fixed bracket; and
- wherein the second synchronous swing arm comprises a rotating end and a movable end, the rotating end of the second synchronous swing arm is rotatably connected to the main shaft assembly, the rotating end of the second synchronous swing arm is engaged with the rotating end of the first synchronous swing arm, and the movable end of the second synchronous swing arm is movably connected to the second fixed bracket.

19. The electronic device of claim 18, wherein the rotating end of the first synchronous swing arm comprises a first rotating body, a first rotating shaft, and a first gear, and the first rotating shaft is rotatably connected to the main shaft assembly; and
wherein the rotating end of the second synchronous swing arm comprises a second rotating body, a second rotating shaft, and a second gear, and the second gear is engaged with the first gear.

20. The electronic device of claim 11, wherein the rotating mechanism further comprises a third fixed bracket, a fourth fixed bracket, a third transmission arm, a fourth transmission arm, and a gear drive assembly;
- wherein the third transmission arm comprises a sliding end and a rotating end, the sliding end of the third transmission arm is slidably connected to the third fixed bracket, and the rotating end of the third transmission arm is rotatably connected to the main shaft assembly; and
- wherein the fourth transmission arm comprises a sliding end and a rotating end, the sliding end of the fourth transmission arm is slidably connected to the fourth fixed bracket, the rotating end of the fourth transmission arm is rotatably connected to the main shaft assembly, and the rotating end of the fourth transmission arm is engaged with the rotating end of the third transmission arm by using the gear drive assembly.

* * * * *